US011887192B2

(12) United States Patent
Decanini et al.

(10) Patent No.: US 11,887,192 B2
(45) Date of Patent: *Jan. 30, 2024

(54) COMPUTERIZED SYSTEM AND METHOD OF NAVIGATING DATA WITH TREE STRUCTURE VISUALIZATION USING SEGMENTED ACCESS RIGHTS

(71) Applicant: MASTTRO HOLDING AG, Stans (CH)

(72) Inventors: Domingo Viesca Decanini, Nuevo Leon (MX); Javier Manuel Gutierrez Rodriguez, Nuevo Leon (MX)

(73) Assignee: Masttro Holding AG, Stans (CH)

(*) Notice: Subject to any disclaimer, the term of this patent is extended or adjusted under 35 U.S.C. 154(b) by 29 days.

This patent is subject to a terminal disclaimer.

(21) Appl. No.: 17/146,081

(22) Filed: Jan. 11, 2021

(65) Prior Publication Data

US 2021/0209689 A1  Jul. 8, 2021

Related U.S. Application Data

(63) Continuation of application No. 15/851,975, filed on Dec. 22, 2017, now Pat. No. 10,909,625, which is a continuation of application No. 14/700,367, filed on Apr. 30, 2015, now abandoned.

(60) Provisional application No. 62/121,797, filed on Feb. 27, 2015.

(51) Int. Cl.
*G06Q 40/06* (2012.01)
*G06Q 40/02* (2023.01)

(52) U.S. Cl.
CPC ............. *G06Q 40/06* (2013.01); *G06Q 40/02* (2013.01)

(58) Field of Classification Search
None
See application file for complete search history.

(56) References Cited

U.S. PATENT DOCUMENTS

| | | | | |
|---|---|---|---|---|
| 7,062,532 | B1* | 6/2006 | Sweat | G06Q 10/10 709/225 |
| 7,080,076 | B1* | 7/2006 | Williamson | G06F 40/166 709/200 |
| 7,571,387 | B1* | 8/2009 | Yehuda | H04L 41/22 715/825 |
| 9,105,064 | B2* | 8/2015 | Posch | G06Q 40/02 |
| 2002/0004755 | A1* | 1/2002 | Balthaser | G06F 40/166 715/240 |
| 2002/0042764 | A1* | 4/2002 | Gardner | G06Q 40/00 705/35 |
| 2002/0152151 | A1* | 10/2002 | Baughman | G06Q 40/06 705/36 R |

(Continued)

*Primary Examiner* — William J Jacob
(74) *Attorney, Agent, or Firm* — Barnes & Thornburg LLP

(57) ABSTRACT

A computer system and method is provided for financial management and estate planning. The system provides data aggregation for both financial and non-financial assets to create a "virtual vault" from which the owner can view all information about his/her portfolio. In some embodiments, the system provides a tree visualization of the portfolio, which allows a structured organization that provides both a high level view and the ability to drill down to an in-depth analysis. In some cases, the system provides segmented permissions in which restricted access could be granted based on module and/or asset in the tree visualization.

21 Claims, 58 Drawing Sheets

(56) References Cited

U.S. PATENT DOCUMENTS

| | | | |
|---|---|---|---|
| 2003/0014345 A1* | 1/2003 | Lim | G06Q 40/06 705/36 R |
| 2003/0028466 A1* | 2/2003 | Jenson | G06Q 40/08 705/36 R |
| 2003/0091017 A1* | 5/2003 | Davenport | H04B 17/318 370/476 |
| 2003/0197895 A1* | 10/2003 | Koppich | G06F 16/93 358/1.18 |
| 2004/0078423 A1* | 4/2004 | Satyavolu | G06Q 10/10 715/234 |
| 2004/0117285 A1* | 6/2004 | Kohler | G06Q 40/06 705/36 R |
| 2004/0162773 A1* | 8/2004 | Del Rey | G06Q 40/02 705/36 R |
| 2005/0027632 A1* | 2/2005 | Zeitoun | G06Q 40/06 705/36 R |
| 2005/0033679 A1* | 2/2005 | Rachev | G06Q 40/00 705/36 R |
| 2005/0187851 A1* | 8/2005 | Sant | G06Q 40/06 705/36 R |
| 2006/0112049 A1* | 5/2006 | Mehrotra | G06F 17/11 706/46 |
| 2007/0055602 A1* | 3/2007 | Mohn | G06Q 40/10 705/36 R |
| 2009/0094170 A1* | 4/2009 | Mohn | G06Q 40/10 705/36 R |
| 2010/0146298 A1* | 6/2010 | Diehl | H04N 21/835 713/189 |
| 2011/0066570 A1* | 3/2011 | Kolo | G06Q 40/06 705/36 R |
| 2014/0101072 A1* | 4/2014 | Calman | G06Q 40/06 705/36 R |
| 2014/0181072 A1* | 6/2014 | Wong | G06F 16/24545 707/713 |

* cited by examiner

COM | CASH ORDER MANAGEMENT

Portfolio: Demo Client 1

Uncategorized cash transactions: 11

View History

| Date | Transaction | Bank/Account | Destinations | Owner | Cash Amount | Currency |
|---|---|---|---|---|---|---|
| 09/01/2014 | Withdrawal | BBVA - 123456789 | | Dharma Off Shore Trust | $201,700 | MXN |
| 18/03/2014 | Withdrawal | BBVA - 123456789 | | Dharma Off Shore Trust | $308,325 | MXN |
| 25/03/2014 | Deposit | BBVA - 123456789 | | Dharma Off Shore Trust | $7,227,289 | MXN |
| 16/05/2014 | Deposit | BBVA - 123456789 | | Dharma Off Shore Trust | $18,102,000 | MXN |
| 17/01/2014 | Withdrawal | Credit Suisse - 9876543210 | | Fargo Corp | $19,565 | USD |
| 21/01/2014 | Withdrawal | Credit Suisse - 123456789001 | | Globex Corporation, Inc. | $353,050 | USD |
| 30/01/2014 | Withdrawal | Citigroup - 9876543322 | | Personal Owner | $5,000 | USD |
| 31/01/2014 | Deposit | Citigroup - 9876543322 | | Personal Owner | $3,423,350 | USD |
| 20/05/2014 | Deposit | Citigroup - 9876543322 | | Personal Owner | $298,419 | USD |
| 23/05/2014 | Withdrawal | Citigroup - 9876543322 | | Personal Owner | $2,850 | USD |

Fig. 56

COMPUTERIZED SYSTEM AND METHOD OF NAVIGATING DATA WITH TREE STRUCTURE VISUALIZATION USING SEGMENTED ACCESS RIGHTS

RELATED APPLICATIONS

This is a continuation of U.S. application Ser. No. 15/851,975 filed Dec. 22, 2017 (now U.S. Pat. No. 10,909,625), which was is a continuation of U.S. application Ser. No. 14/700,367 filed Apr. 30, 2015, which claimed the benefit of U.S. Provisional Application Ser. No. 62/121,797 filed Feb. 27, 2015. Each of these applications are hereby incorporated by reference in their entireties.

TECHNICAL FIELD

This disclosure relates to a computerized system and method in which financial data can be visualized with a tree structure. In some embodiments, access rights to the tree structure can be restricted by node and/or module.

BACKGROUND AND SUMMARY

With high wealth individuals, there is a risk of legacy failure in which it can be difficult to put personal affairs in order and obtain a successful succession. One problem can be information regarding financial and non-financial assets being in disparate locations and subject to potentially different managers. This causes difficulties in complete and transparent visibility of wealth and potentially delays information needed to make informed decisions. Moreover, the number of people involved to manage assets can reduce the desired level of confidentiality.

This disclosure relates to a computer system and method for financial management and estate planning. In some embodiments, the system provides data aggregation for all assets worldwide, regardless of currency and financial institution or type of asset. This provides a centralized location or "virtual vault" from which the owner can view all information about his/her portfolio. In some embodiments, the system provides a tree visualization of the portfolio, which allows a structured organization that provides both a high level view and the ability to drill down to an in-depth analysis. In some cases, the system provides segmented permissions in which restricted access could be granted based on module and/or asset in the tree visualization. This allows the owner to see the entire financial picture while allowing other users to only see the part of wealth to which they have been delegated management responsibility.

According to one aspect, this disclosure provides a storage device coupled to at least one processor. The storage device stores financial portfolio data representing financial and non-financial assets of an owner, node structure data representing a relationship of the assets in a hierarchical tree structure, and a program for controlling the at least one processor. The processor(s) are operative with the program to obtain the financial portfolio data and node structure data. The processor generates a visual representation of the financial portfolio data in a hierarchical tree arrangement based on the node structure data. The hierarchical tree arrangement comprises a plurality of nodes including a root node and a plurality of descendant nodes of the root node in which the root node represents substantially the entire portfolio of the owner as identified in the financial portfolio data and the plurality of descendant nodes represent respective portions of the portfolio. The plurality of descendant nodes typically represent a plurality of asset types, including both financial and non-financial assets.

In some cases, the plurality of asset types represented by the descendant nodes include one or more of an investment structure, financial asset, alternative investment, collection, insurance, memberships, motor vehicle, or real estate in which the owner has a full or partial ownership interest. For example, a descendant node representing an investment structure could identify a personal investment, trust investment, or corporate investment in which the owner has a full or partial ownership interest. By way of another example, a descendant node representing a financial asset could identify one or more of a bank account, a loan receivable or a loan payable in which the owner has a full or partial ownership interest. In some cases, a descendant node representing an alternative investment could identify one or more of a capital participation investment, private equity investment, a venture capital investment, or a private funds investment in which the owner has a full or partial ownership interest. Depending on the circumstances, a descendant node representing a collection could identify one or more of an antique, jewelry, photography, watch, book, painting, sculpture, or wine in which the owner has a full or partial ownership interest. In some embodiments, a descendant node representing insurance could identify one or more of a life insurance policy or an insurance policy concerning an investment in which the owner has a full or partial ownership interest. Embodiments are contemplated in which a descendant node representing motor vehicles could identify one or more of an airplane, helicopter, watercraft, automobile, motorcycle, or yacht in which the owner has a full or partial ownership interest. In some cases, a descendant node representing real estate could identify one or more of commercial real estate, industrial real estate, land or residential real estate in which the owner has a full or partial ownership interest.

This disclosure includes embodiments in which responsive to selection of a node, the processor(s) expand the selected node to identify one or more descendant nodes of the selected node. In some cases, the renewed selection of the node, collapses the selected node to hide one or more descendant nodes of the selected node.

In some embodiments, a variety of flags could be associated with nodes. For example, the processor could generate a count flag associated with one or more nodes that identifies an aggregate count of descendant nodes for each respective node. In some embodiments, the processor(s) could be configured to generate a value flag associated with one or more nodes that identifies an aggregate monetary value of descendant nodes for each respective node.

A user can modify the portfolio of the owner. For example, a user interface could be provided from which additional nodes representing a portion of the financial portfolio of the owner can be added. In some embodiments, the user interface includes an area with a plurality of node types representing a plurality of asset types is presented for insertion into the hierarchical tree arrangement. For example, a new node could be added to the hierarchical tree arrangement by moving a node from the area with node types onto an existing node in the hierarchical tree arrangement. When this happens, in some embodiments, the relationship of the new node is assigned as a child of the existing node and this relationship between the new node and the existing node is stored in the node structure data. When a new node is added, the user could be prompted for input of data regarding the new node and store this data in the financial portfolio data. For example, the user could be prompted to uploading of one or more documents regarding the new node and store these one or more documents in the financial portfolio data.

In some embodiments, the portfolio of the user can be searched. For example, the processor(s) could generate a visual representation of the financial portfolio data that includes the search query in a hierarchical tree arrangement based on the node structure data in which only nodes associated with the search query are identified. In this manner, only nodes responsive to the search are displayed for the user.

Depending on the circumstances, user access rights can be provided for restricting access to the portfolio of the owner. For example, the storage device could include user access rights data and the processor(s) could be configured to hide one or more nodes of the hierarchical tree arrangement based on the access rights data. This allows the user to provided segmented access for delegating management of portions of the assets.

According to another aspect, this disclosure provides a computer-implemented method. Financial portfolio data is stored that represents financial and non-financial assets of an owner. Node structure data representing a relationship of the assets in a hierarchical tree structure is also stored. The computer generates a visual representation of the financial portfolio data in a hierarchical tree arrangement based on the node structure data. The hierarchical tree arrangement comprises a plurality of nodes including a root node and a plurality of descendent nodes of the root node. The root node represents substantially the entire portfolio of the owner based on the financial portfolio data and the one or descendent nodes represent respective portions of the portfolio.

According to yet another aspect, this disclosure provides a tangible, non-transitory computer readable medium storing instructions that, when executed by at least one processor, causes the at least one processor to perform a method. Financial portfolio data is stored that represents financial and non-financial assets of an owner. Node structure data representing a relationship of the assets in a hierarchical tree structure is also stored. The computer generates a visual representation of the financial portfolio data in a hierarchical tree arrangement based on the node structure data. The hierarchical tree arrangement comprises a plurality of nodes including a root node and a plurality of descendent nodes of the root node. The root node represents substantially the entire portfolio of the owner based on the financial portfolio data and the one or descendent nodes represent respective portions of the portfolio.

Additional features and advantages of the invention will become apparent to those skilled in the art upon consideration of the following detailed description of the illustrated embodiment exemplifying the best mode of carrying out the invention as presently perceived. It is intended that all such additional features and advantages be included within this description and be within the scope of the invention.

BRIEF DESCRIPTION OF THE DRAWINGS

The present disclosure will be described hereafter with reference to the attached drawings which are given as non-limiting examples only, in which:

FIGS. 5-9 are screen shots of an example interface for the consolidated portfolio analysis module according to one embodiment;

FIGS. 13-36 are screen shots of an example interface for the global wealth map module according to one embodiment;

FIGS. 37-55 are screen shots of an example interface for the client registration system module according to one embodiment;

FIGS. 56-57 are screen shots of an example interface for the cash order management module according to one embodiment.

Figure 1:
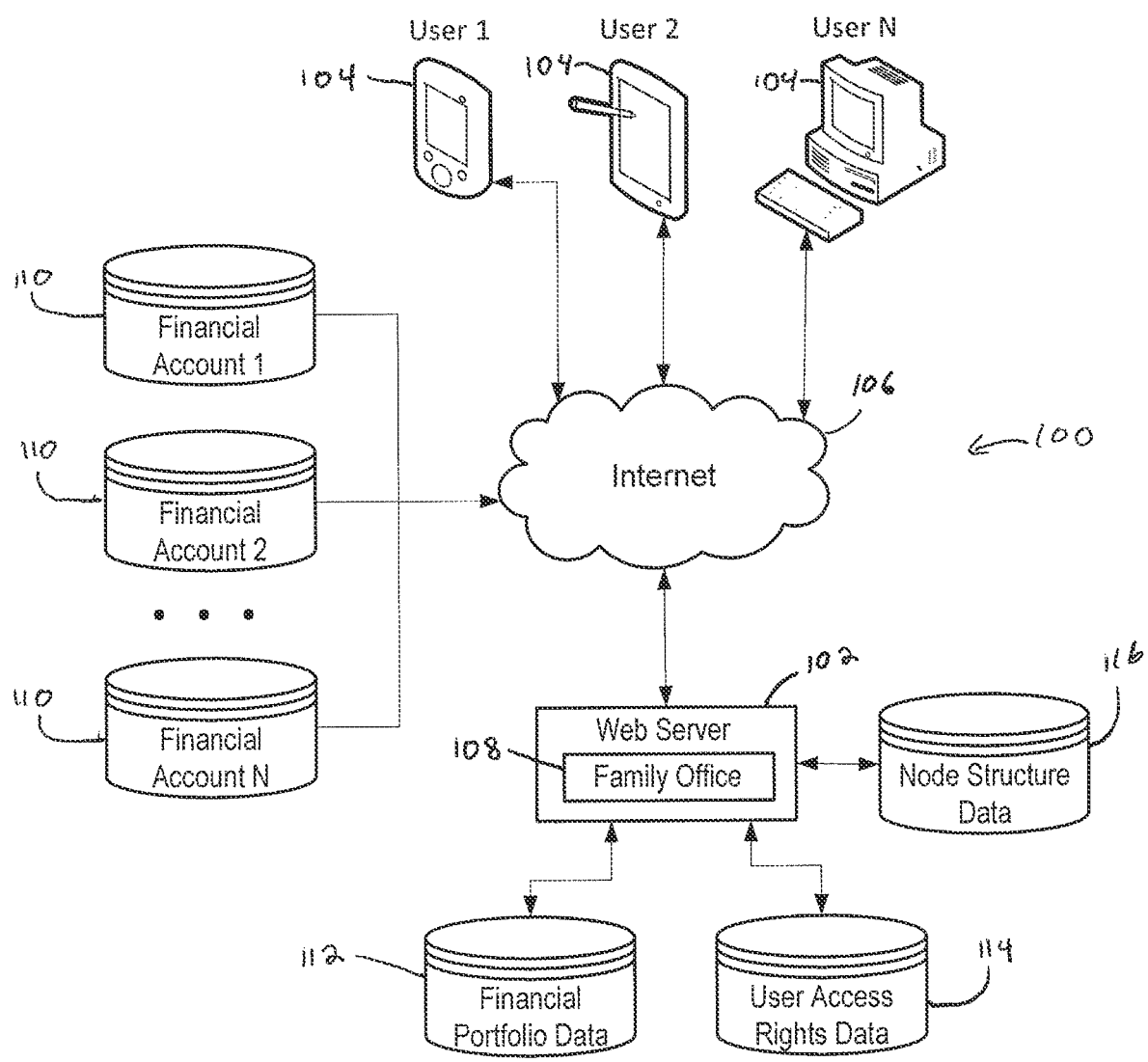
FIG. 1 is a diagrammatic view of an example computing environment in which the family office software could operate according to one embodiment.

Corresponding reference characters indicate corresponding parts throughout the several views. The components in the figures are not necessarily to scale, emphasis instead being placed upon illustrating the principals of the invention. The exemplification set out herein illustrates embodiments of the invention, and such exemplification is not to be construed as limiting the scope of the invention in any manner.

DETAILED DESCRIPTION OF THE DISCLOSURE

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the disclosure.

This disclosure relates generally to a computerized system and method for managing financial portfolios, including both financial and non-financial assets, and estate planning. With regard to financial management, the system provides a "virtual vault" in which financial data can be stored in a structured manner that is organized so the owner can view his/her finances with little effort and provides safeguards to protect the owner from those managing his/her finances. The system can also be used for estate planning purposes by organizing information about the assets in a centralized location. In some embodiments, the system provides a visual view of the financial portfolio that presents information in a tree structure from which a high level view of finances can be determined. In such a view, various financial structures and assets appear as nodes in the tree structure that can be collapsed and expanded. Typically, the nodes are associated with structured data that provides detailed information about the node, including in some cases electronic documents, photographs, and other data about the node.

The detailed description which follows is presented in part in terms of algorithms and symbolic representations of operations on data bits within a computer memory representing alphanumeric characters or other information. An algorithm is here and is generally conceived to be a self-consistent sequence of steps leading to a desired result. These steps are those requiring physical manipulations of physical quantities. Usually, though not necessarily, these quantities take the form of electrical or magnetic pulses or signals capable of being stored, transferred, transformed, combined, compared, and otherwise manipulated. It proves convenient at times, principally for reasons of common usage, to refer to these signals as bits, values, symbols, characters, display data, terms, numbers, or the like as a reference to the physical items or manifestations in which such signals are embodied or expressed. It should be borne in mind, however, that all of these and similar terms are to be associated with the appropriate physical quantities and are merely used here as convenient labels applied to these quantities.

Some algorithms may use data structures for both inputting information and producing the desired result. Data structures greatly facilitate data management by data processing systems, and are not accessible except through sophisticated software systems. Data structures are not the information content of a memory, rather they represent specific electronic structural elements which impart or manifest a physical organization on the information stored in memory. More than mere abstraction, the data structures are specific electrical or magnetic structural elements in memory which simultaneously represent complex data accurately, often data modeling physical characteristics of related items, and provide increased efficiency in computer operation.

Further, the manipulations performed are often referred to in terms, such as comparing or adding, commonly associated with mental operations performed by a human operator. No such capability of a human operator is necessary, or desirable in most cases, in any of the operations described herein which form part of the present invention; the operations are machine operations. Useful machines for performing the operations of the present invention include general purpose digital computers or other similar devices. In all cases the distinction between the method operations in operating a computer and the method of computation itself should be recognized. A method and apparatus are disclosed for operating a computer in processing electrical or other (e.g., mechanical, chemical) physical signals to generate other desired physical manifestations or signals. The computer operates on software modules, which are collections of signals stored on a media that represents a series of machine instructions that enable the computer processor to perform the machine instructions that implement the algorithmic steps. Such machine instructions may be the actual computer code the processor interprets to implement the instructions, or alternatively may be a higher level coding of the instructions that is interpreted to obtain the actual computer code. The software module may also include a hardware component, wherein some aspects of the algorithm are performed by the circuitry itself, rather as a result of an instruction.

An apparatus is disclosed for performing these operations. This apparatus may be specifically constructed for the required purposes, or it may comprise a general purpose computer as selectively activated or reconfigured by a computer program stored in the computer. The algorithms presented herein are not inherently related to any particular computer or other apparatus unless explicitly indicated as requiring particular hardware. In some cases, the computer programs may communicate or relate to other programs or equipment through signals configured to particular protocols which may or may not require specific hardware or programming to interact. In particular, various general purpose machines may be used with programs written in accordance with the teachings herein, or it may prove more convenient to construct more specialized apparatus to perform the required method steps. The required structure for a variety of these machines will appear from the description below.

In the following description several terms which are used frequently have specialized meanings in the present context. The term "network" means two or more computers which are connected in such a manner that messages may be transmitted between the computers. In such computer networks, typically one or more computers operate as a "server," a computer with large storage devices such as hard disk drives and communication hardware to operate peripheral devices such as printers or modems. The term "browser" refers to a program which is not necessarily apparent to the user, but which is responsible for transmitting messages between the user's computer and the network server and for displaying and interacting with network resources.

Browsers are designed to utilize a communications protocol for transmission of text and graphic information over a worldwide network of computers, namely the "World Wide Web" or simply the "Web." Examples of browsers compatible with the present invention include the Internet Explorer browser program offered by Microsoft Corporation (Internet Explorer is a trademark of Microsoft Corporation), the Chrome browser program offered by Google Inc. (Chrome is a trademark of Google Inc.), the Safari browser program offered by Apple Inc. (Safari is a trademark of Apple Inc.) or the Firefox browser program distributed by the Mozilla Foundation (Firefox is a registered trademark of the Mozilla Foundation). The browser could operate on a desktop operating system, such as Windows by Microsoft Corporation (Windows is a trademark of Microsoft Corporation) or OS X by Apple Inc. (OS X is a trademark of Apple Inc.). In some cases, the browser could operate on mobile operating systems, such as iOS by Apple Inc. (iOS is a trademark of Apple Inc.) or Android by Google Inc. (Android is a trademark of Google Inc.). Browsers display information which is formatted in a Standard Generalized Markup Language ("SGML") or a Hyper Text Markup Language ("HTML"), both being scripting languages which embed non-visual codes in a text document through the use of special ASCII text codes. Files in these formats may be easily transmitted across computer networks, including global information networks like the Internet, and allow the Browsers to display text, images, and play audio and video recordings.

FIG. 1 is a high-level block diagram of a computing environment 100 according to one embodiment. FIG. 1 illustrates server 102 and three clients 104 connected by network 106. Only three clients 104 are shown in FIG. 1 in order to simplify and clarify the description. Likewise, a single server 102 is shown for purposes of simplicity, but multiple servers could be used. Embodiments of the computing environment 100 may have thousands or millions of clients 104 connected to network 106, for example, the Internet. Users (not shown) may operate software, such as a browser, on clients 104 to both send and receive messages over network 106 via server 102 and its associated communications equipment and software (not shown). For example, family office software 108 could be accessed via server 102 using a browser. Typically, clients 104 would be able to access the family office software 108 over the network 106 by entering a web address, such as an IP address, URL, or domain name (web address generally referred to as a "Destination") into browser software. In some embodiments, clients 104 could include a dedicated application that connects with the family office software 108 instead of using a web browser.

In the example computing environment 100 shown in FIG. 1, there is shown a plurality of financial accounts 110 that are accessible by the family office software 108 via the network 106. Financial data from these accounts 110 could be downloaded into a financial portfolio database 112 of the family office software 108 via the network 106 using one of many secure protocols known to those skilled in the art. There are three financial accounts 110 shown in FIG. 1 for purposes of simplicity, but more or less accounts could be accessible via the network 106.

The example in FIG. 1 also shows user access rights data 114 to which the family office software 108 has access. As discussed below, the users' rights to access certain features and data in the family office software 108 can be restricted to only the areas that the owner wants to grant access. This segmented access allows the owner to monitor the complete financial picture while only allowing certain users access to see or manage a designated part of the financial portfolio.

As shown, the family office software 108 has access to node structure data 116. As discussed below, the node structure data 116 allows the family office software 108 to generate a tree visualization of financial information. This visualization allows an organized view of the portfolio that is intuitive and provides high level information in which users can drill down to obtain additional information.

Figure 2:
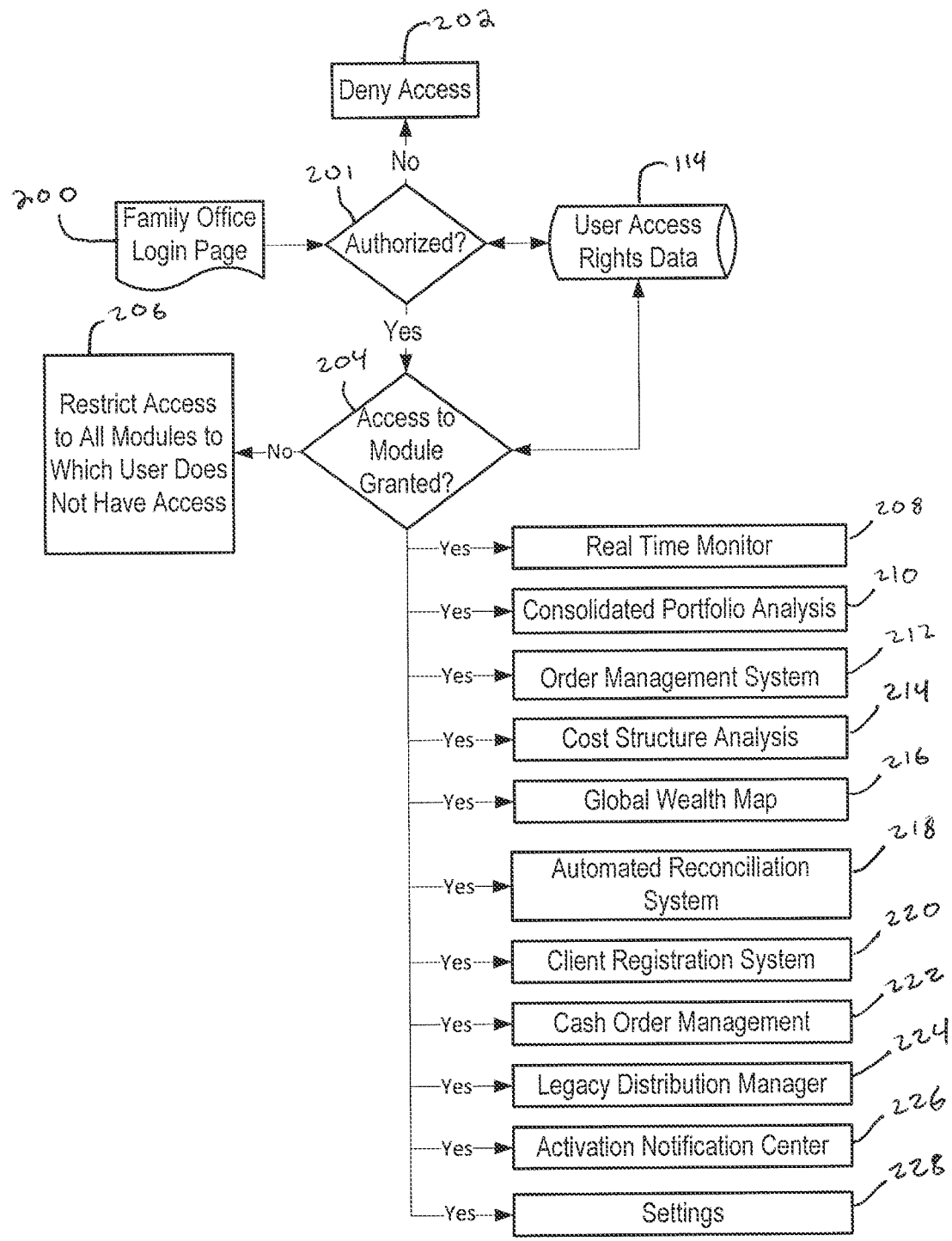
FIG. 2 is a flow chart showing example operations of the family office software according to one embodiment.
Figure 3:
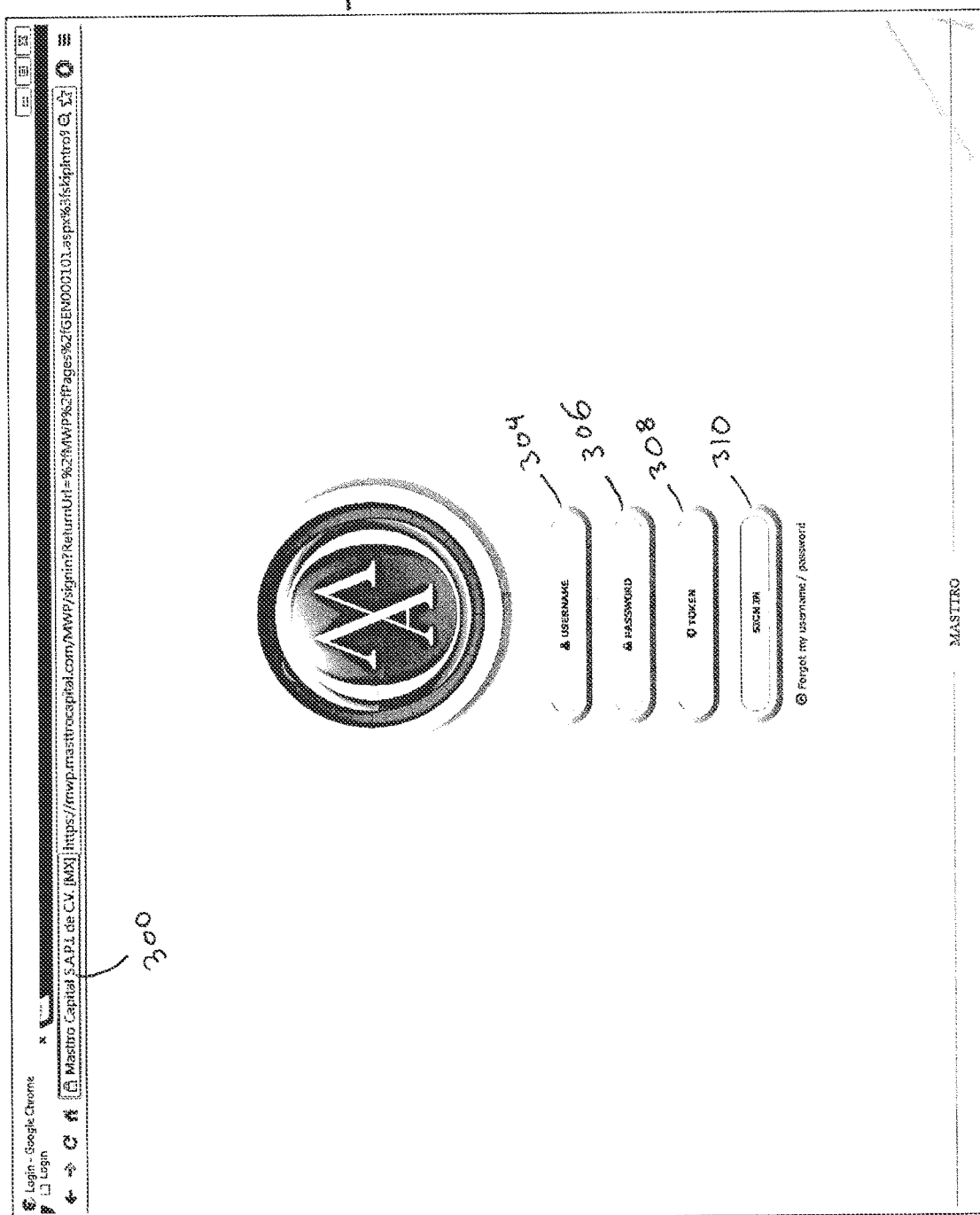
FIG. 3 is an example login screen shot for the family office software according to one embodiment.

FIG. 2 is a flow chart showing example steps that a user may perform to access various modules in the family office software 108. In the example shown, the user would go to the family office login page, such as entering a URL into a web browser (Step 200). FIG. 3 shows an example login page for the family office software 108. In this example, the user went to the login page by entering a URL 300 into a browser window 302. In this example, the login page includes a place for the user to type in a user name 304, password 306, and token 308. Although this example shows two-factor authentication using a security token, those skilled in the art should understand that various security techniques could be used to provide secure access to the family office software 108. Upon entering the user name 304, password 306, and token 308, the user would select the sign in button 310 in the example shown to access the family office software 108.

Figure 58:
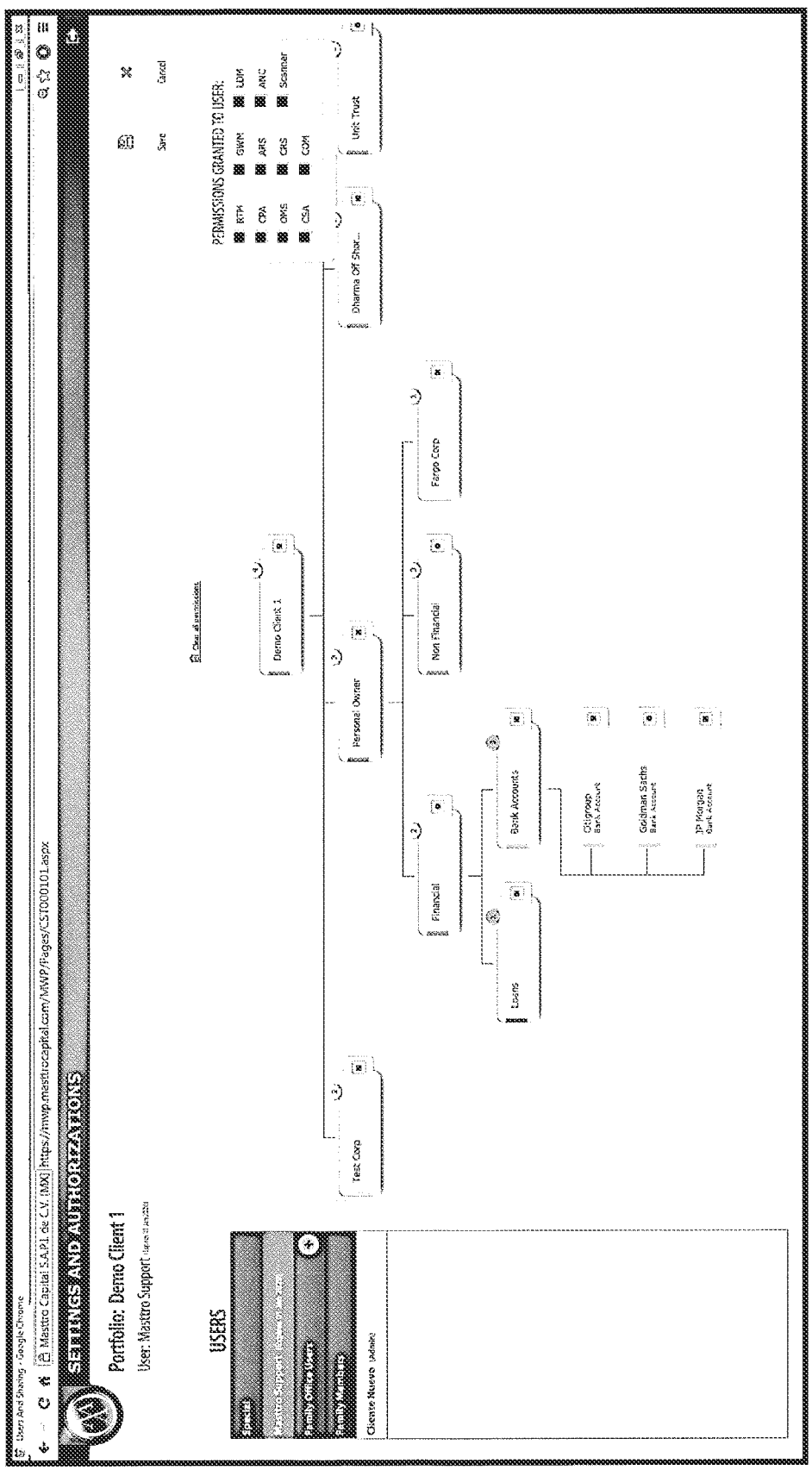
FIG. 58 is screen shot of an example interface for setting access rights to various modules and/or nodes in a tree structure representing a portfolio according to one embodiment.

Referring again to FIG. 2, a determination is made as to whether the credentials entered by the user are authorized (Step 201). If the credentials are not authorized, access to the family office software 108 will be denied (Step 202). If the credentials are authorized, a determination will be made as to which modules of the family office software 108 the user has been granted (Step 204). Any modules to which the user has been restricted access in the security settings will not be available to the user (Step 206). However, all of the other modules for which the user has been granted access will be available. An example interface for establishing and/or modifying user access rights is shown in FIG. 58.

Figure 4:
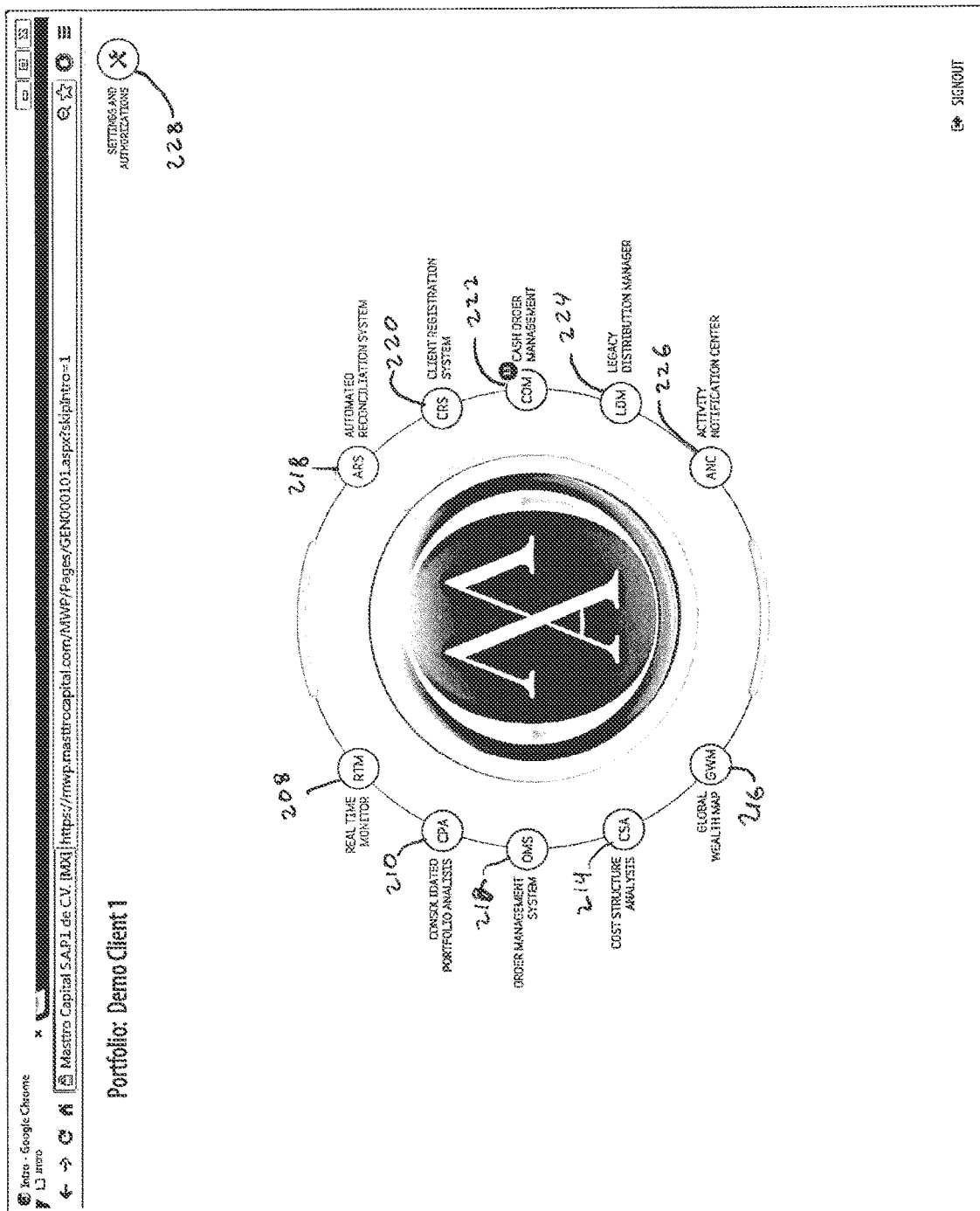
FIG. 4 is a screen shot of an example interface from which a user could select one or more modules of the family office software according to one embodiment.
Figure 5:
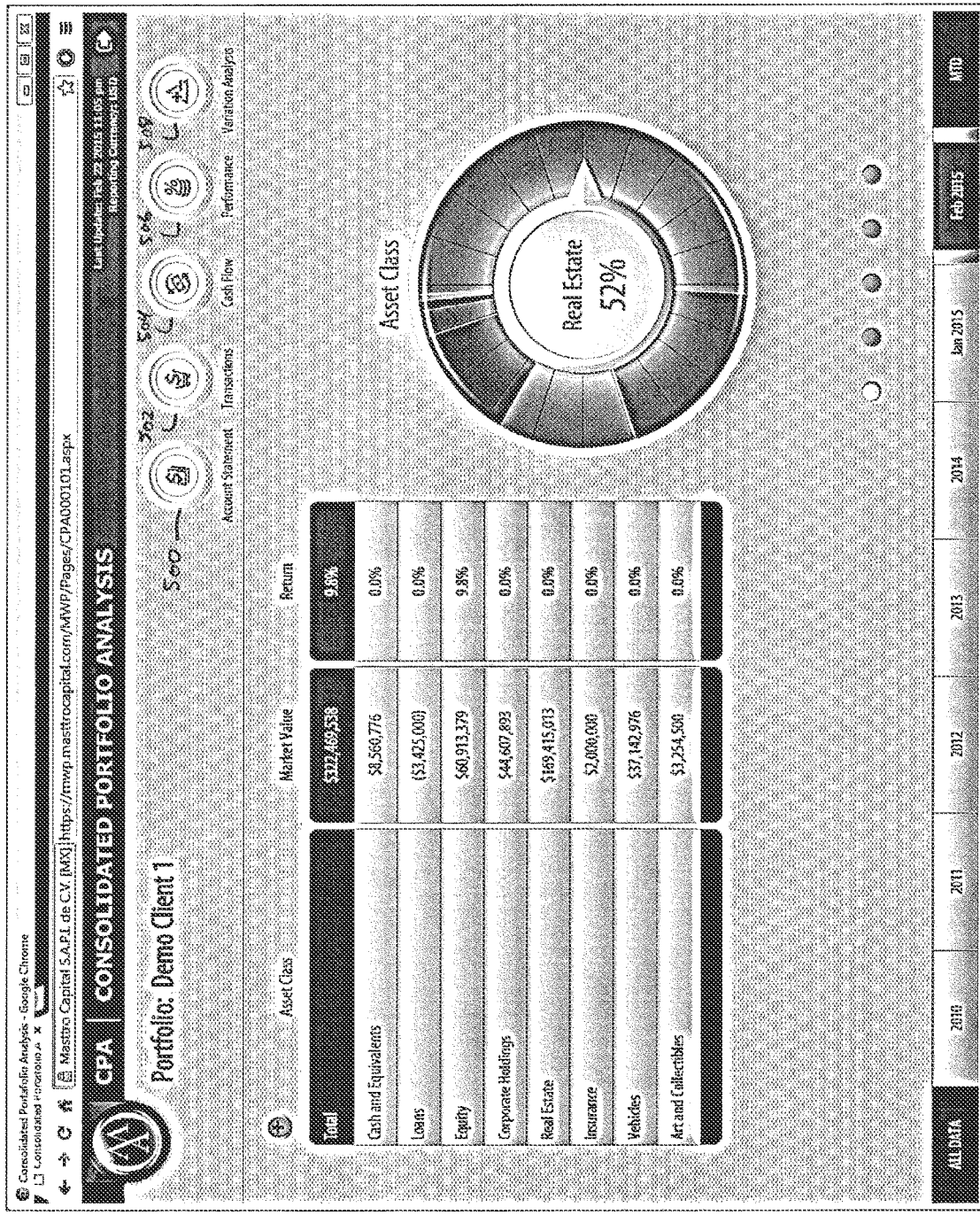

In the example shown, the family office software 108 includes a real time monitor 208, consolidated portfolio analysis 210, order management system 212, cost structure analysis 214, global wealth map 216, automated reconciliation system 218, client registration system 220, cash order management 222, legacy distribution manager 224, activation notifications center 226, and settings 228. An example user interface from which a user can access these various modules is shown in FIG. 4. The term "module" includes an identifiable portion of computer code, computational or executable instructions, data, or computational object to achieve a particular function, operation, processing, or procedure. A module may be implemented in software, hardware/circuitry, or a combination of software and hardware. An identified module of executable code, for example, may comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Indeed, a module of executable code could be a single instruction, or many instructions, and may even be distributed over several different code segments, among different programs, and across several memory devices. Similarly, modules representing data may be embodied in any suitable form and organized within any suitable type of data structure. The data may be collected as a single data set, or may be distributed over different locations including over different storage devices.

The real time monitor 208 allows the owner to view transactions occurring in one or more of his/her accounts in approximately real time. This can be done, for example, by downloading financial data from one or more of the accounts 110 via a network 106.

Figure 6:
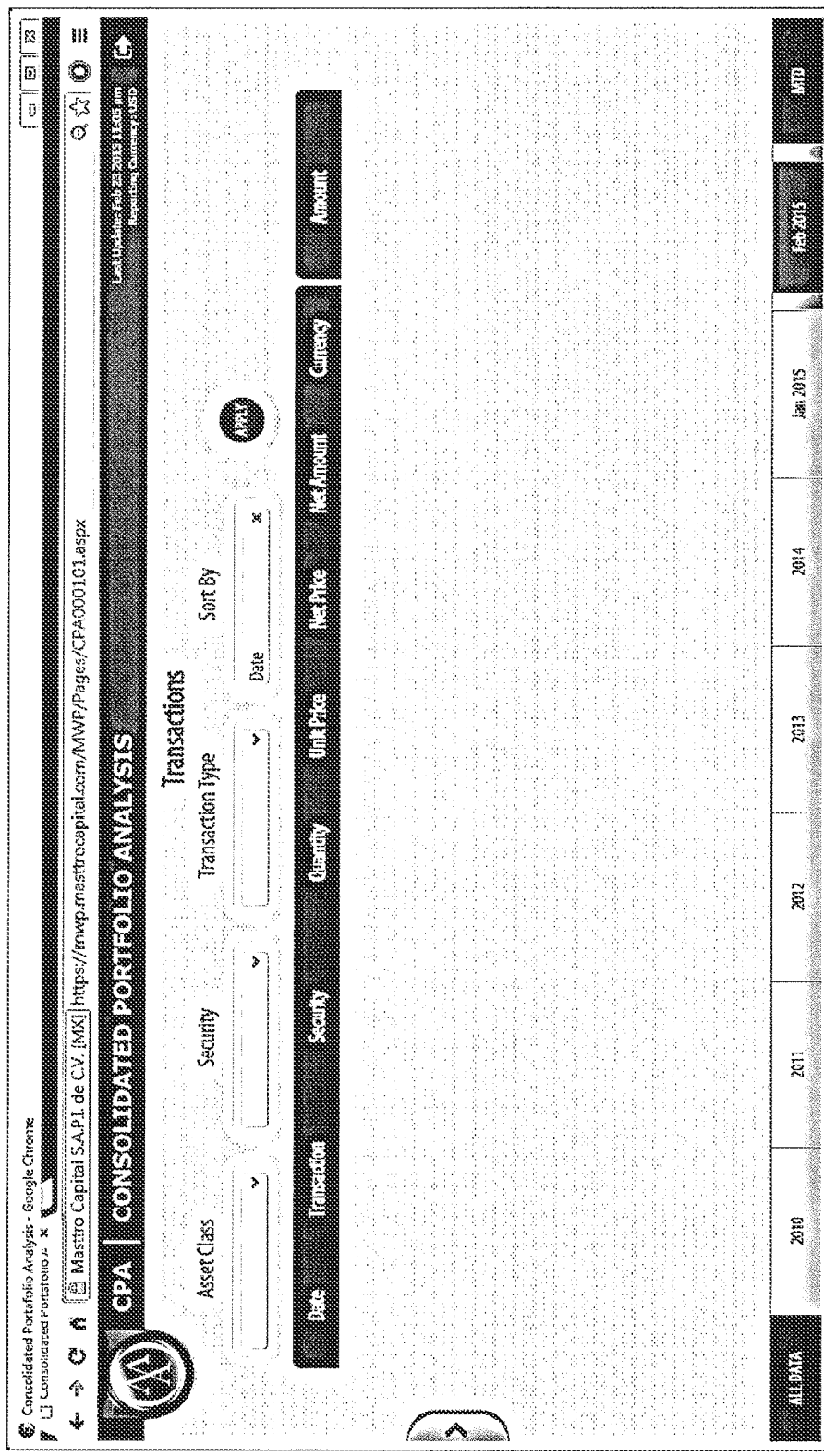
Figure 7:
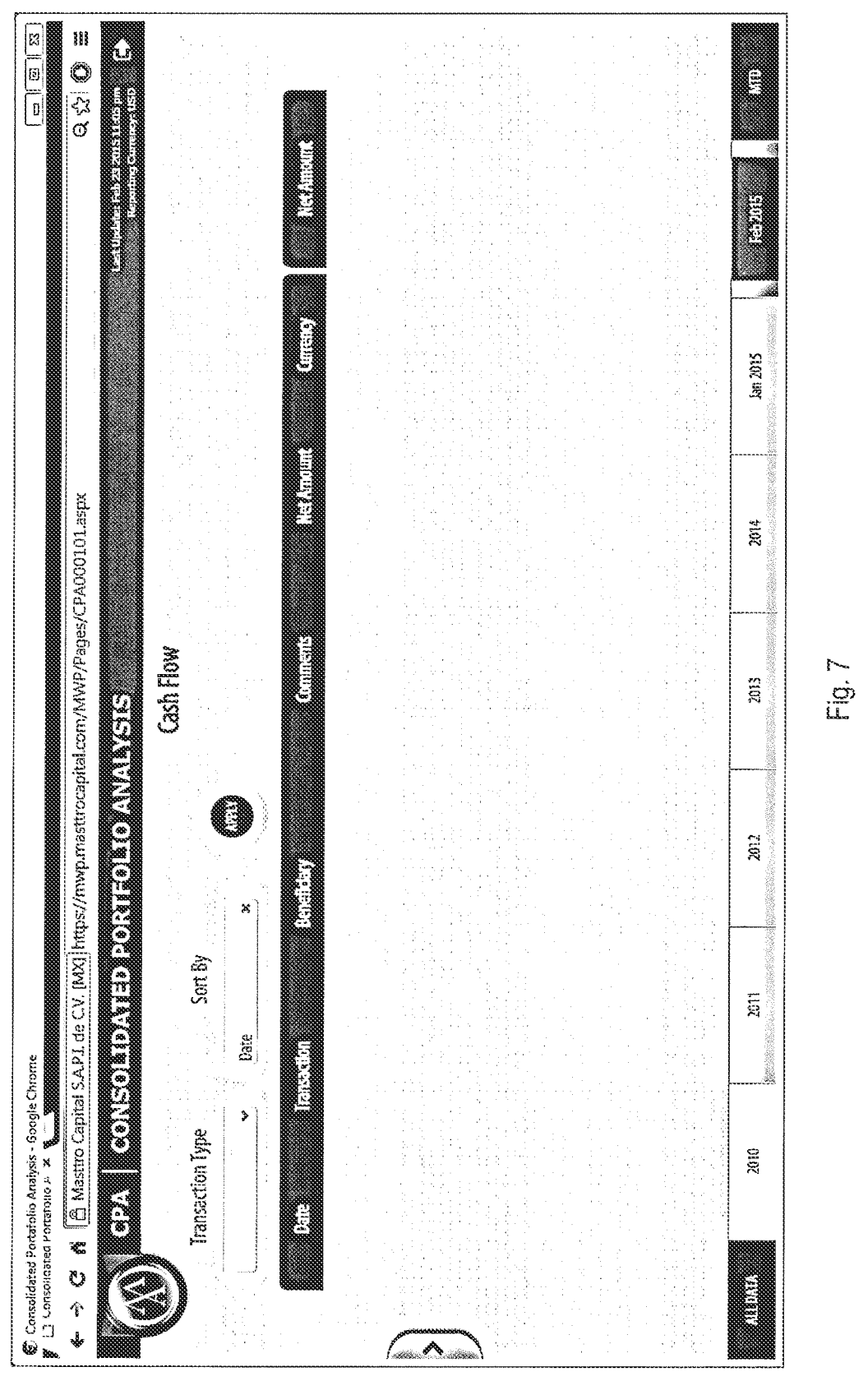
Figure 8:
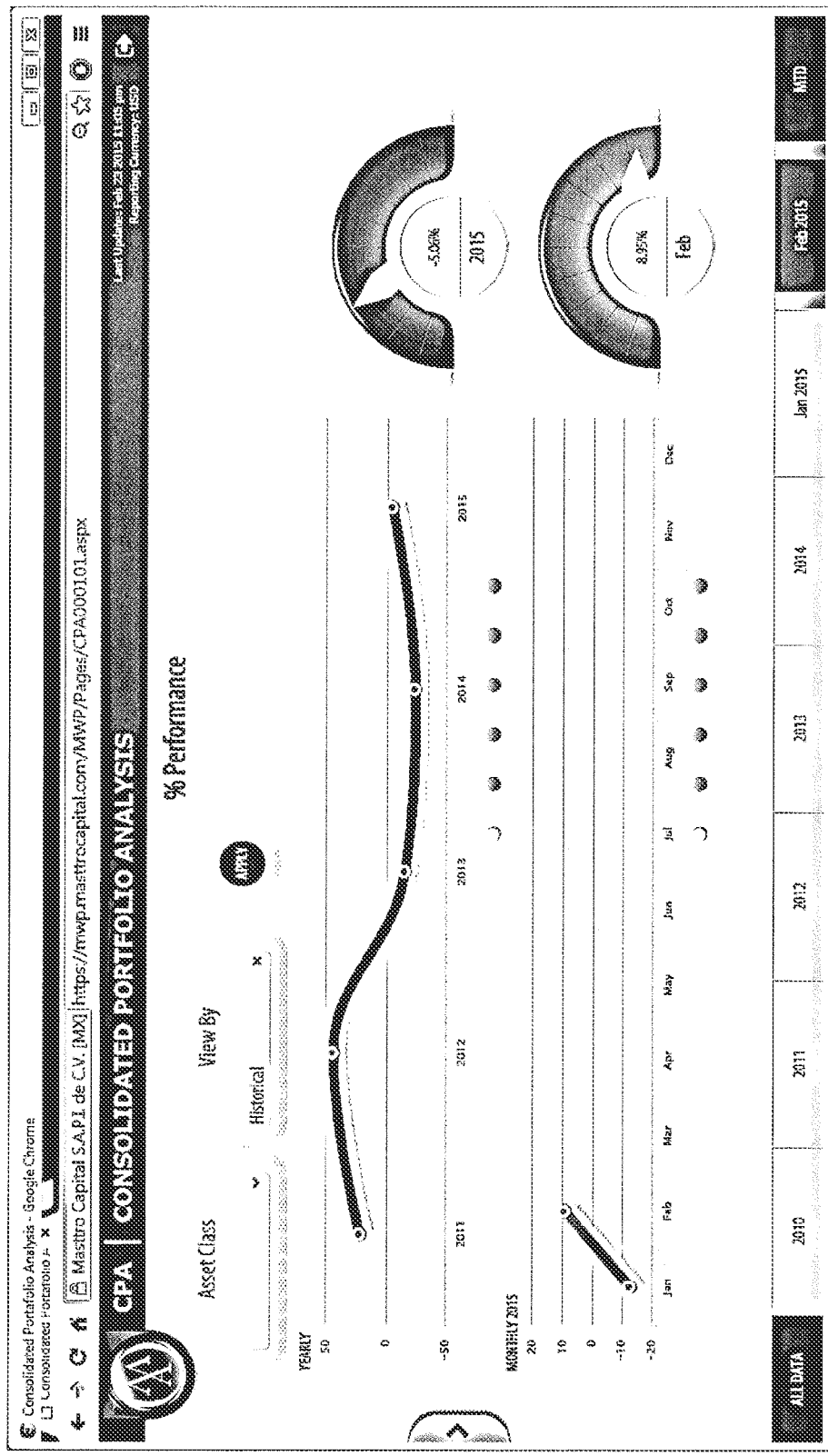
Figure 9:
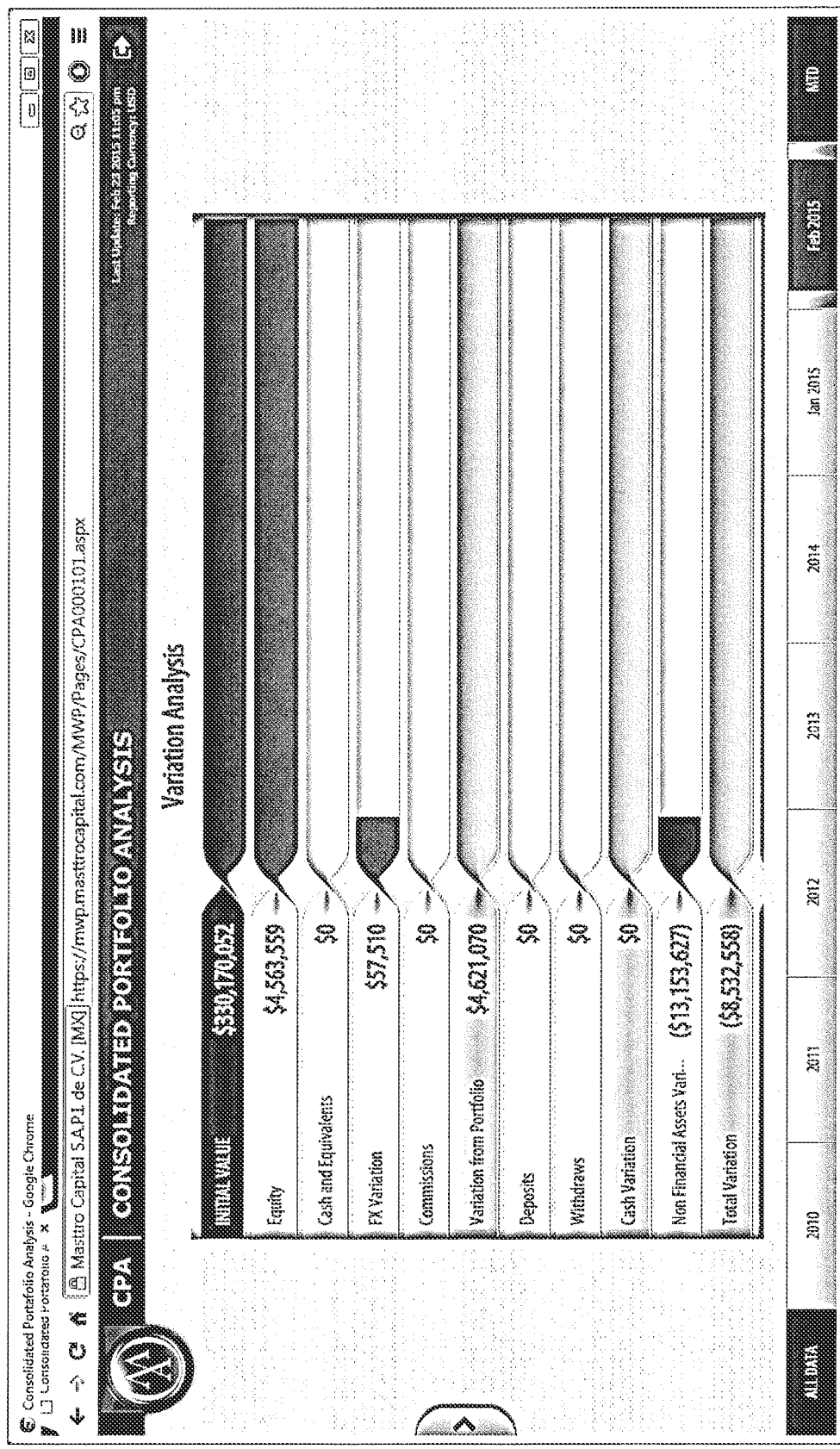

The consolidated portfolio analysis 210 allows the user to perform analysis on the financial portfolio of the owner. FIGS. 5-9 show example screenshots of an interface that allows analysis of the owner's portfolio. In the example shown in FIG. 5, the user may select from an account statement 500, transactions 502, cash flow 504, performance 506, and variation analysis 508. If the user selects the account statement 500, a table showing an account statement that can be sorted by asset class or other criteria is presented to the user. If the user selects transactions 502, the user is likewise presented with a table showing various transactions that have occurred. An example interface for transactions 502 is shown in FIG. 6. If the user selects cash flow 504, the user may be presented with a table, such as shown in FIG. 7, presenting various transactions from which the user can determine cash flow. If the user selects performance 508, the user may view various charts demonstrating performance of various assets, such as the interface shown in FIG. 8. If the user selects variation analysis 508, the user is presented with a variation analysis similar to that shown in FIG. 9. Referring again to FIG. 5, the summary page of the consolidated portfolio analysis 210 allows the user to see a graph and information about various types of asset classes. The user may select a time range (in this example 2010 through February 2015) in which to perform the analysis.

The order management system 212 allows the user to manage orders regarding various assets. The cost structure analysis 214 allows the user to perform an analysis regarding the cost of various assets of the owner.

Figure 10:
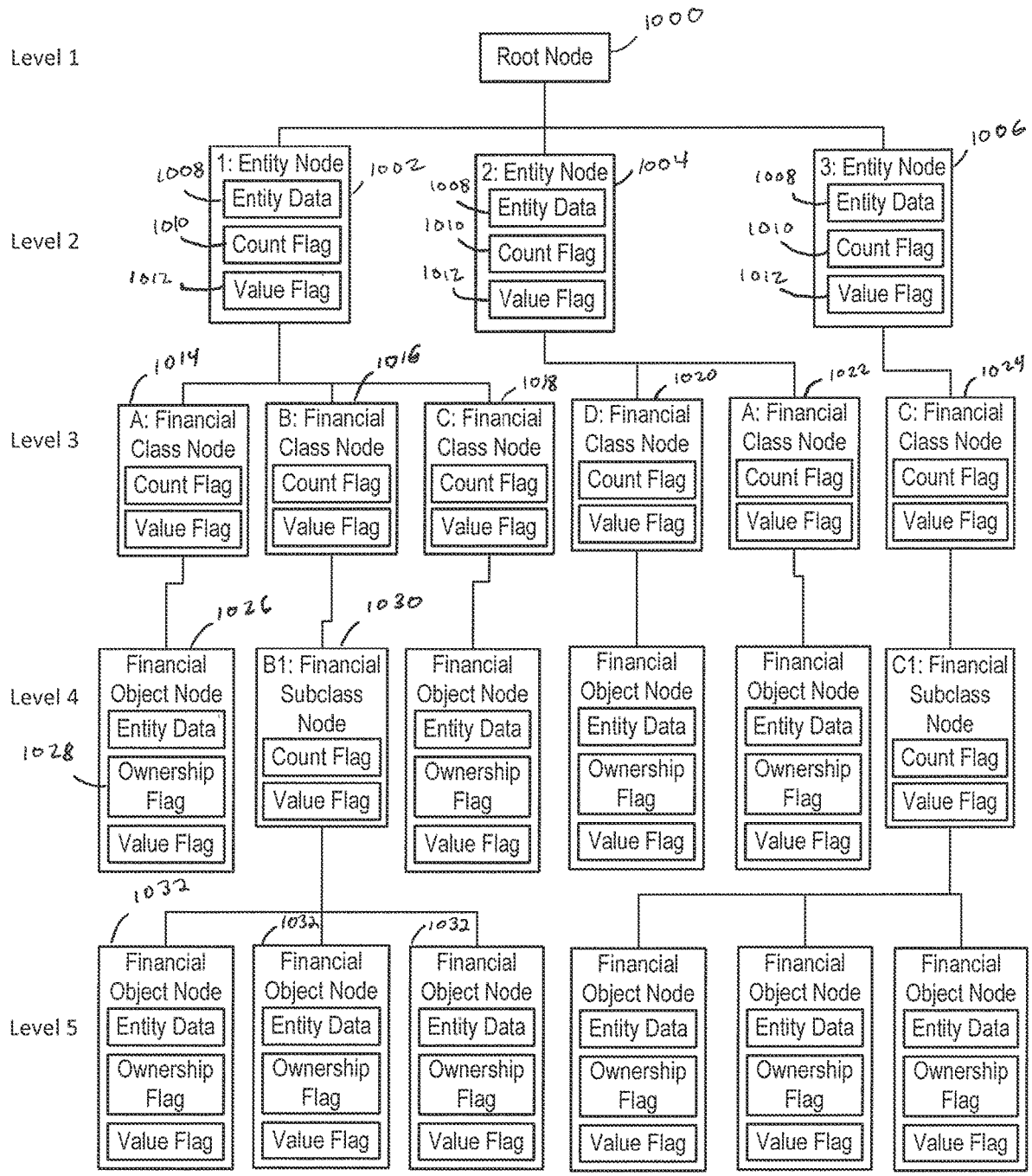
FIG. 10 is a block diagram showing an example tree structure for visualizing information concerning a portfolio according to one embodiment.

The global wealth map 216 provides a tree structure visualization of the various financial structures and assets of the owner. FIG. 10 shows an example tree structure that provides a visual format for the user to view various financial structures and other financial assets of the owner. In the example shown, the tree structure includes a root node 1000. Each of the nodes under the root node 1000 represents various assets, both financial and nonfinancial, along with other investment structures of the owner. In this example, the child nodes of the root node 1000 are entity nodes representing investment structures of the owner. For example, the investment structures could be personal investments, trust investments, corporation investments in which the owner has a full or partial ownership interest, or other entities in which the owner has a full or partial ownership interest. In the example shown in FIG. 10, there is a first entity node 1002, a second entity node 1004, and a third entity node 1006. In this example, the entity nodes 1002, 1004, and 1006 each include entity data 1008, a count flag 1010, and a value flag 1012. The entity data 1008 for each node could be information regarding the entity along with any documents, photos, or other information regarding the entity. The count flag 1010 is the count of descendant nodes of that entity node, which provides a high level view of the number of assets or other structures within that particular entity. The value flag 1012 is the aggregate monetary value of the descendant nodes from that entity node. In some cases, the entity node or other nodes may include other values, such as ownership interest which could be displayed to the user.

Figure 13:
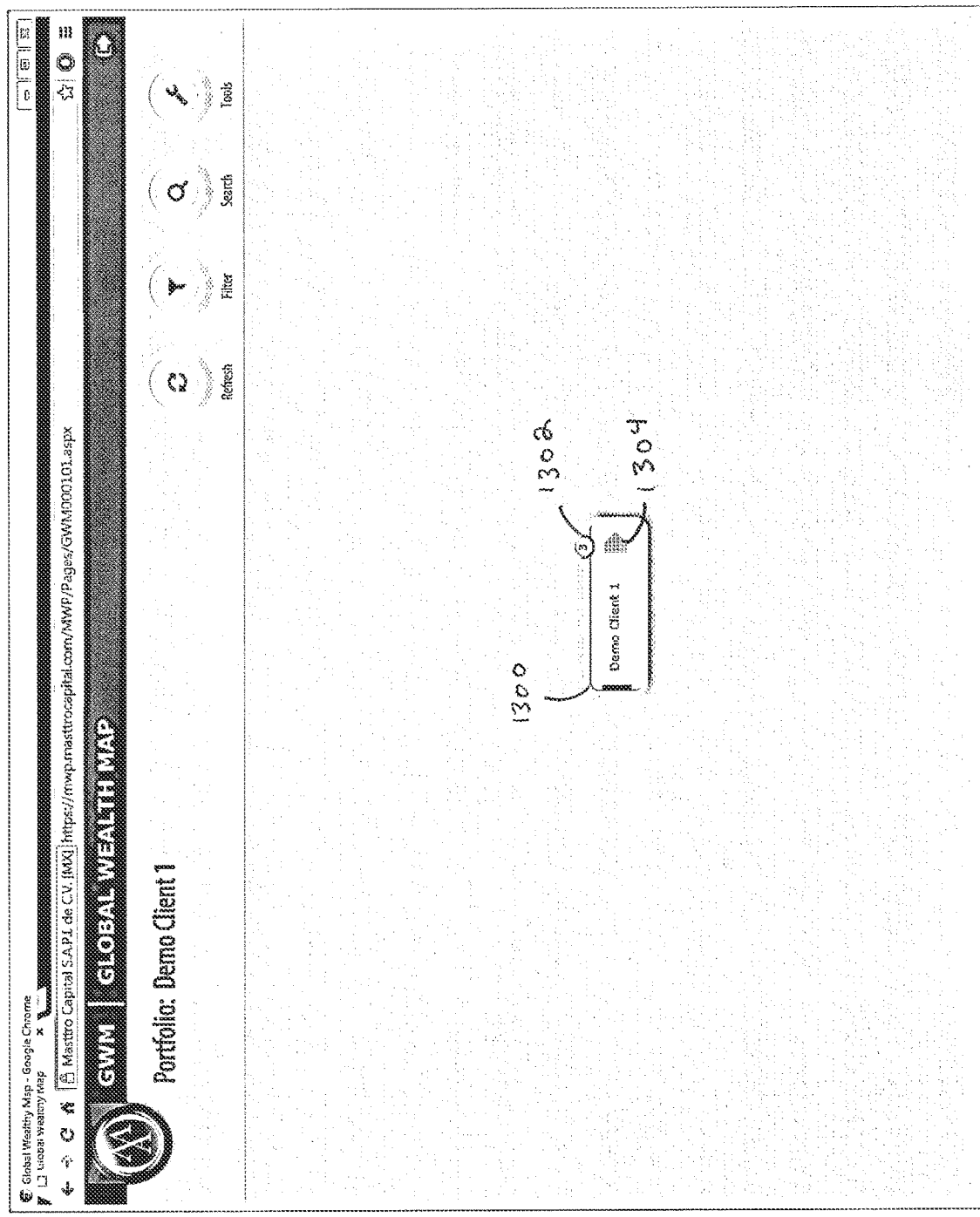
Figure 14:
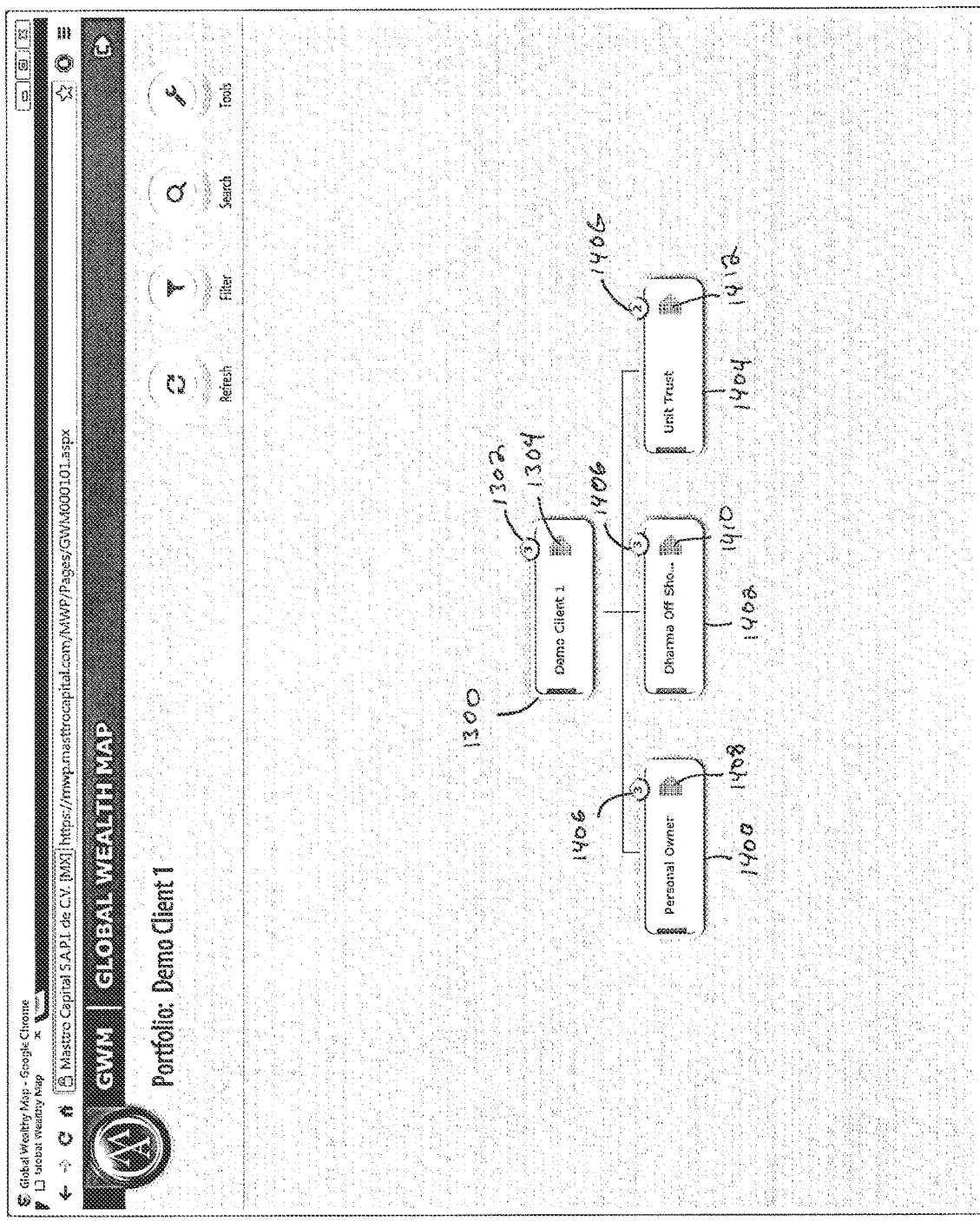

Referring to FIGS. 13 and 14, there is shown a user interface in which an example root node and entity nodes are shown. In FIG. 13, the tree structure is entirely collapsed into a root node 1300 and includes a count flag 1302 representing the number of child nodes to the root node 1300, which is 3 in this example. As shown, the root node 1300 includes an area 1304 that may be selected to display the data concerning the root node 1300. For example, the data accessible through 1304 could be the owner's address, phone number, and other information. By selecting the root node 1000 (in an area other than 1304), this expands the tree structure to show the child nodes, which in this example is a first entity node 1400, second entity node 1402, and a third entity node 1404. The entity nodes in this example 1400, 1402, and 1404 each include a count flag 1406 and a portion 1408 to access the entity data concerning the respective entity nodes 1400, 1402, and 1404.

Figure 15:
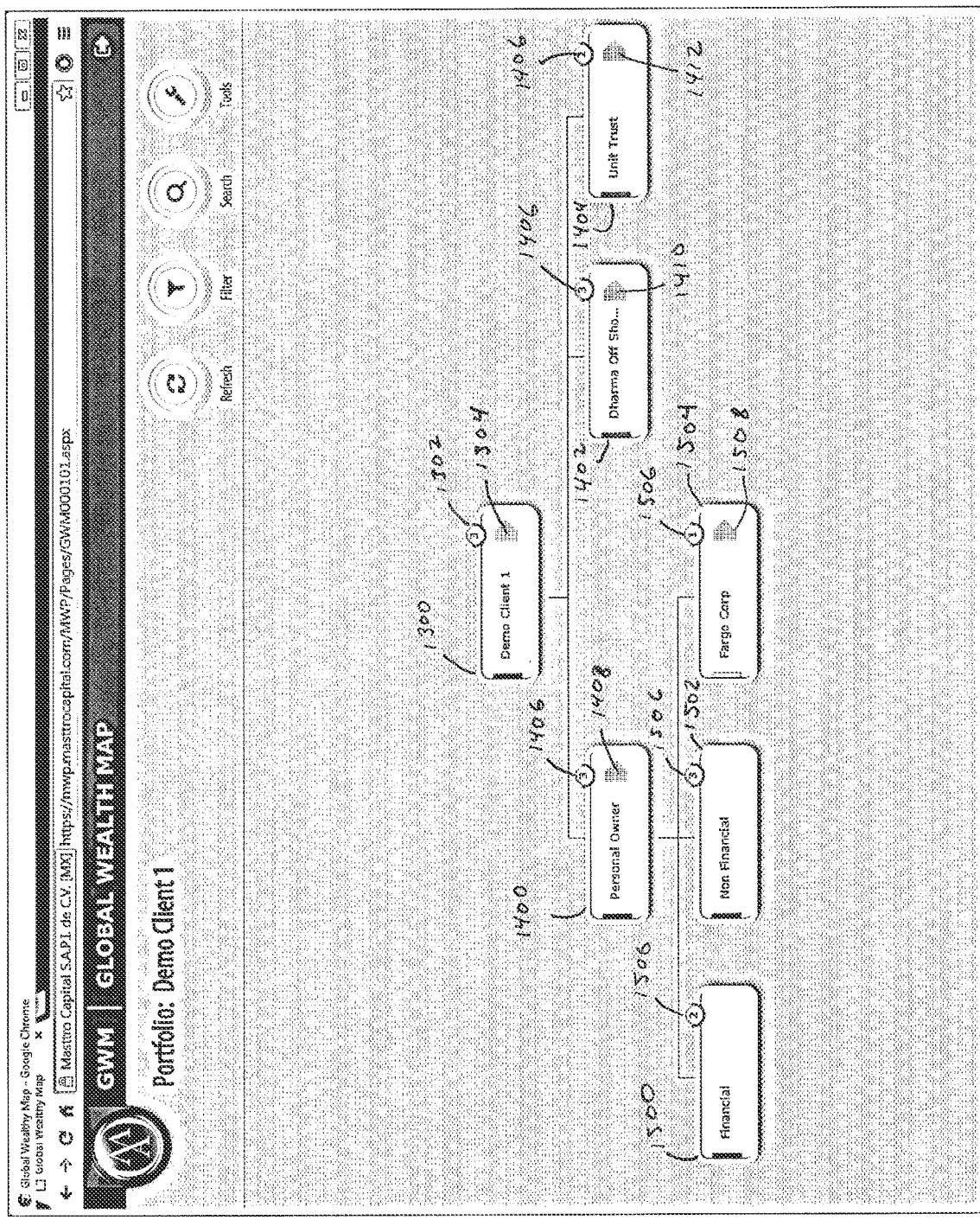

Referring again to FIG. 10, the entity nodes 1002, 1004, 1006 each include child nodes in this example. As shown, these child nodes are financial class nodes, which could represent a type of financial structure, asset, or liability of the owner. In the example shown, there is a first financial class node 1014, and second financial class node 1016, a third financial class node 1018, a fourth financial class node 1020, a fifth financial class node 1022, and a sixth financial class node 1024. As shown, the first financial class node 1014, second financial class node 1016, and third financial class node 1018 are children nodes of the first entity node 1002. The second entity node 1004 has the fourth financial class node 1020 and fifth financial class node 1022 as child nodes. Finally, in this example, the third entity node 1016 as the sixth financial class node 1024 is a child node. These financial class nodes 1014, 1016, 1018, 1020, 1022, and 1024 in this example include a count flag 1010 and a value flag 1012. They serve the same function described above with respect to the entity nodes. Examples of possible financial class nodes include financial, alternative investments, collections, insurance, memberships, motor vehicles, and real estate. These nodes provide categorization of various types of financial assets or investments. FIG. 15 shows an example interface with financial class nodes. In this example, the tree structure includes a first financial class node 1500 (labeled "financial"), a second financial class node 1502 (labeled "non-financial"), and an entity node 1504 (labeled "Fargo Corp"). Each of these nodes 1500, 1502, and 1504 include a count flag 1506 indicating the number of children of each respective node. In this example, the entity node 1504 includes a portion 1508 from which information about the entity can be accessed.

Figure 16:
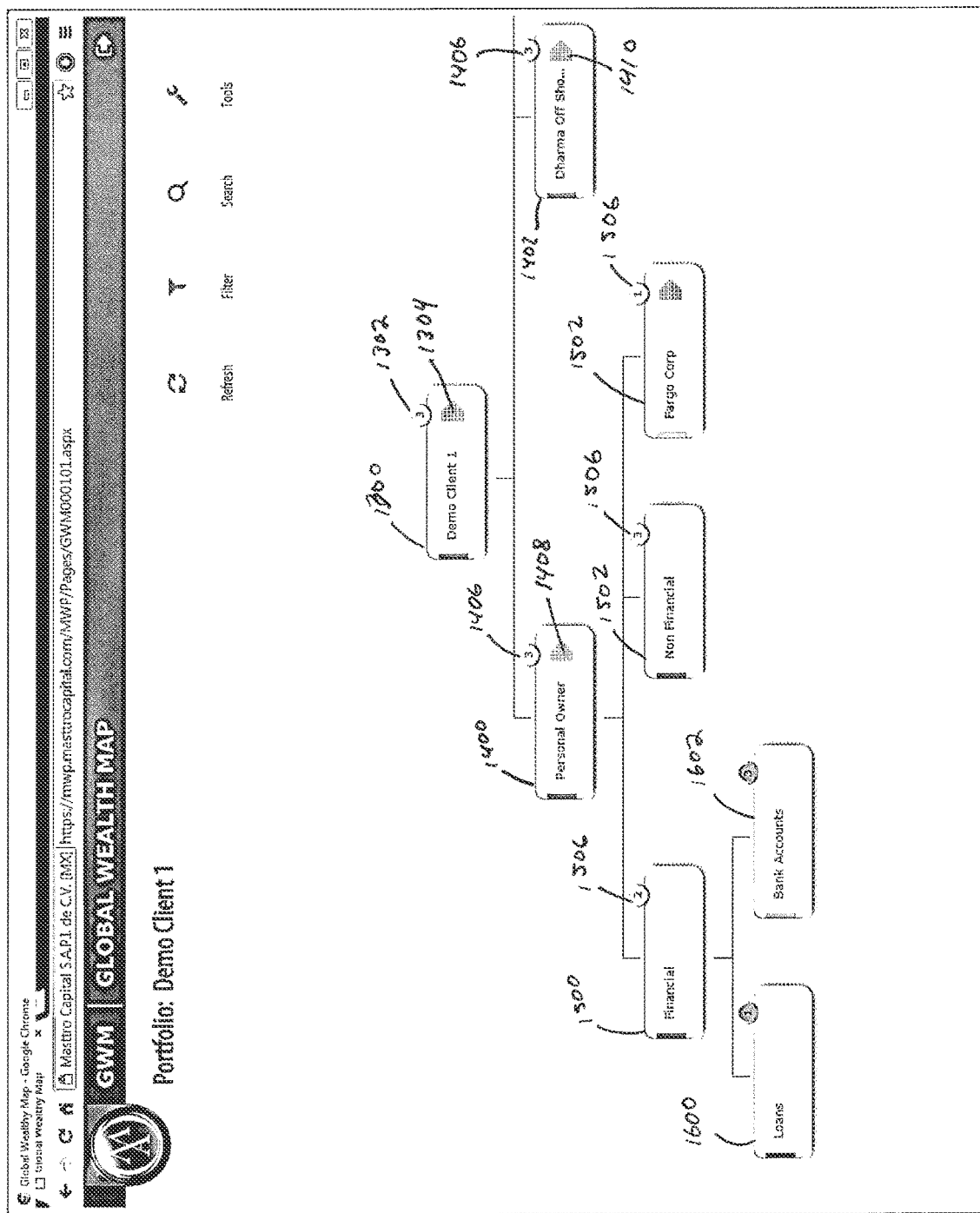
Figure 17:
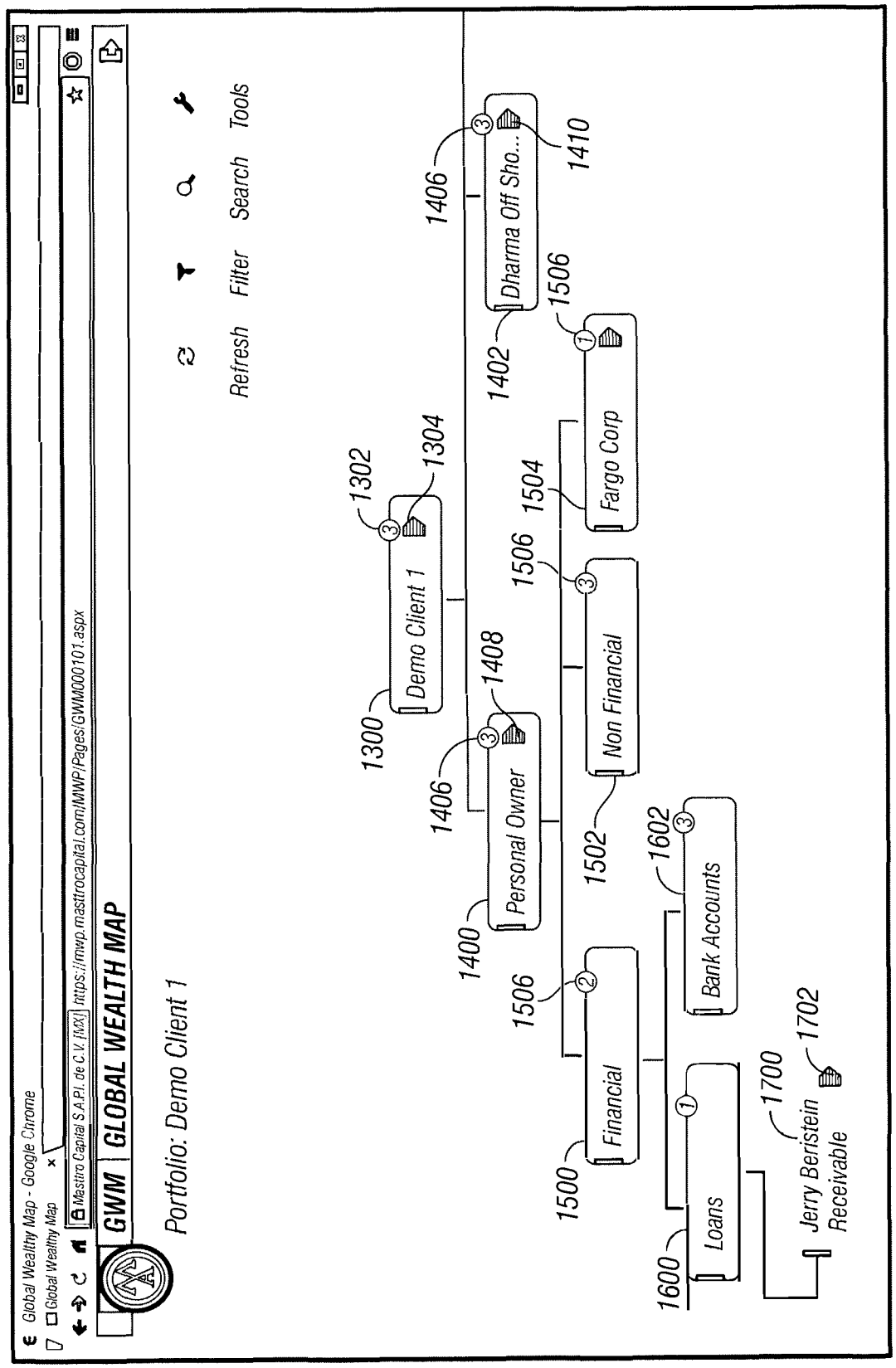
Figure 18:
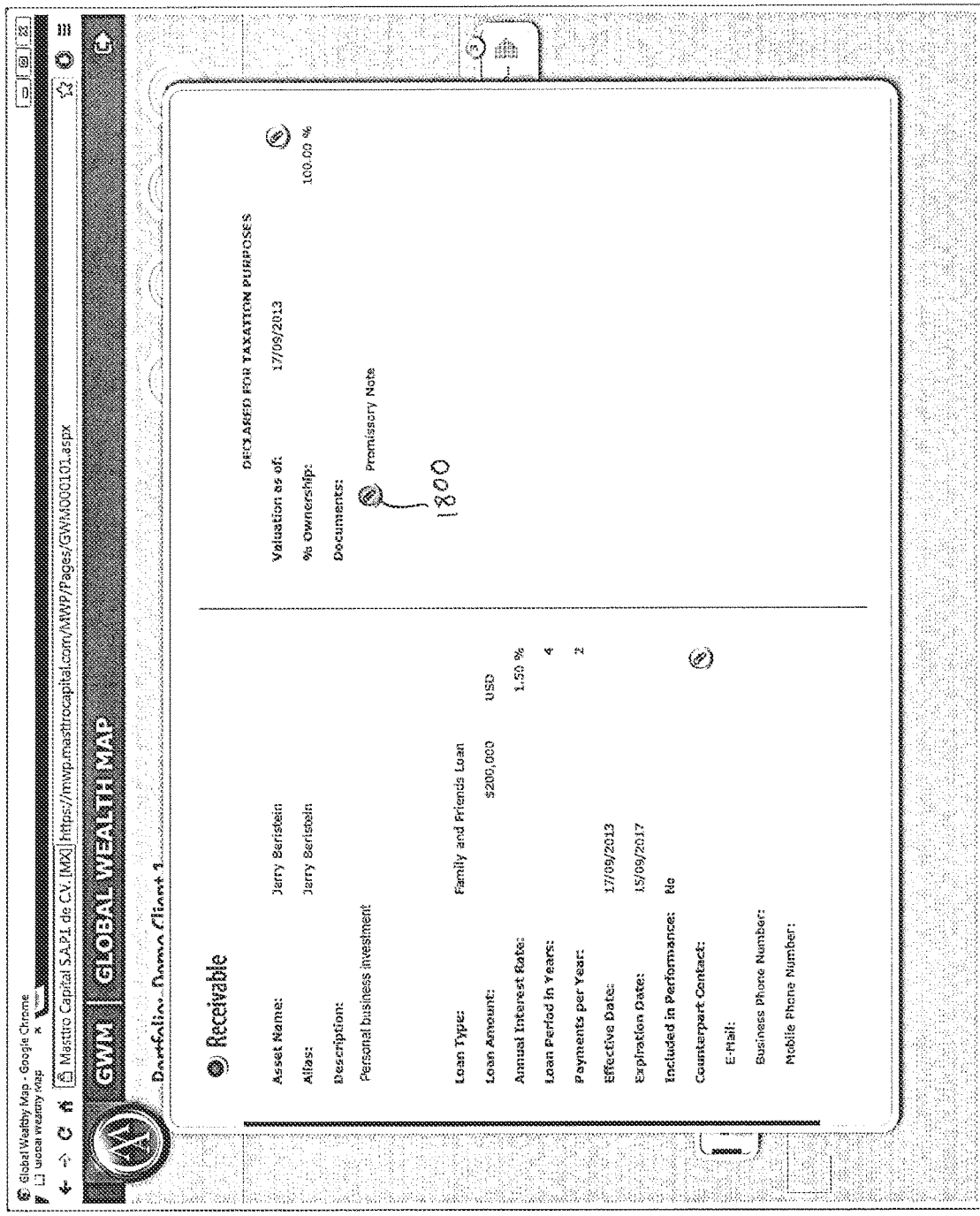
Figure 19:
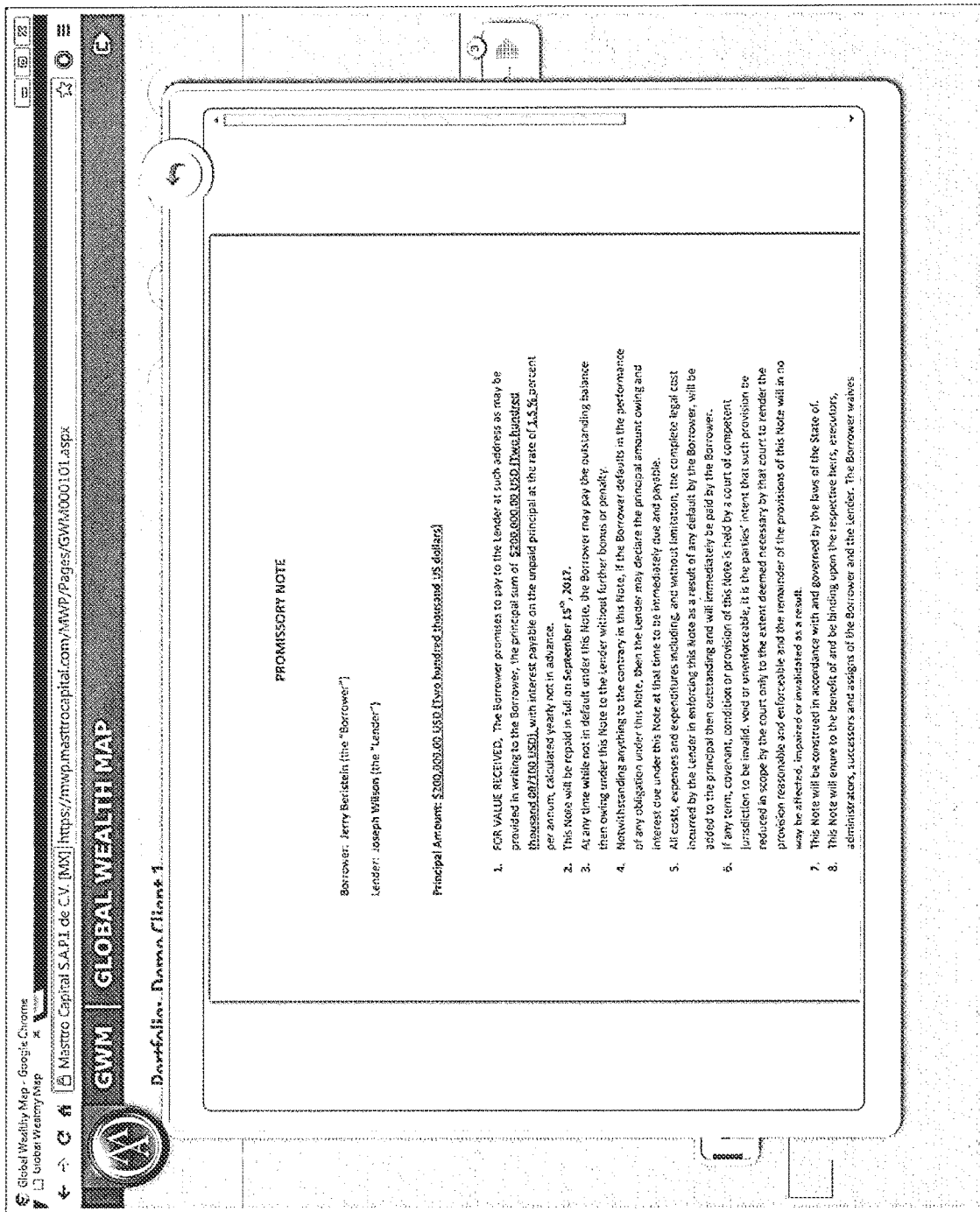

Referring again to FIG. 10, the first financial class node 1014 includes a child node which is a first financial object node 1026. The first financial object node 1026 includes an ownership flag 1028 from which a percentage of ownership in the financial object can be determined. The second financial class node 1016 has a child node as a financial subclass node 1030 as shown. The financial subclass node 1030 includes three child nodes that are financial object nodes 1032. FIG. 16 shows an example of a financial subclass node. As shown, a first financial subclass node 1600, which is labeled "loans," and a second financial subclass node 1602, which is labeled "bank accounts," are both subclasses of "financial" node 1500. FIG. 17 shows an example after selecting the "loans" node 1600 to reveal its child node 1700, which is labeled "Jerry Beristein Receivable." There is a portion 1702 to access data regarding the child node 1700. FIG. 18 shows an example interface from which data regarding the child node 1700 can be accessed by selecting the portion 1702. This interface shows information regarding the node, including a link 1800 that can be used to retrieve a document, which is shown in FIG. 19.

Figure 20:
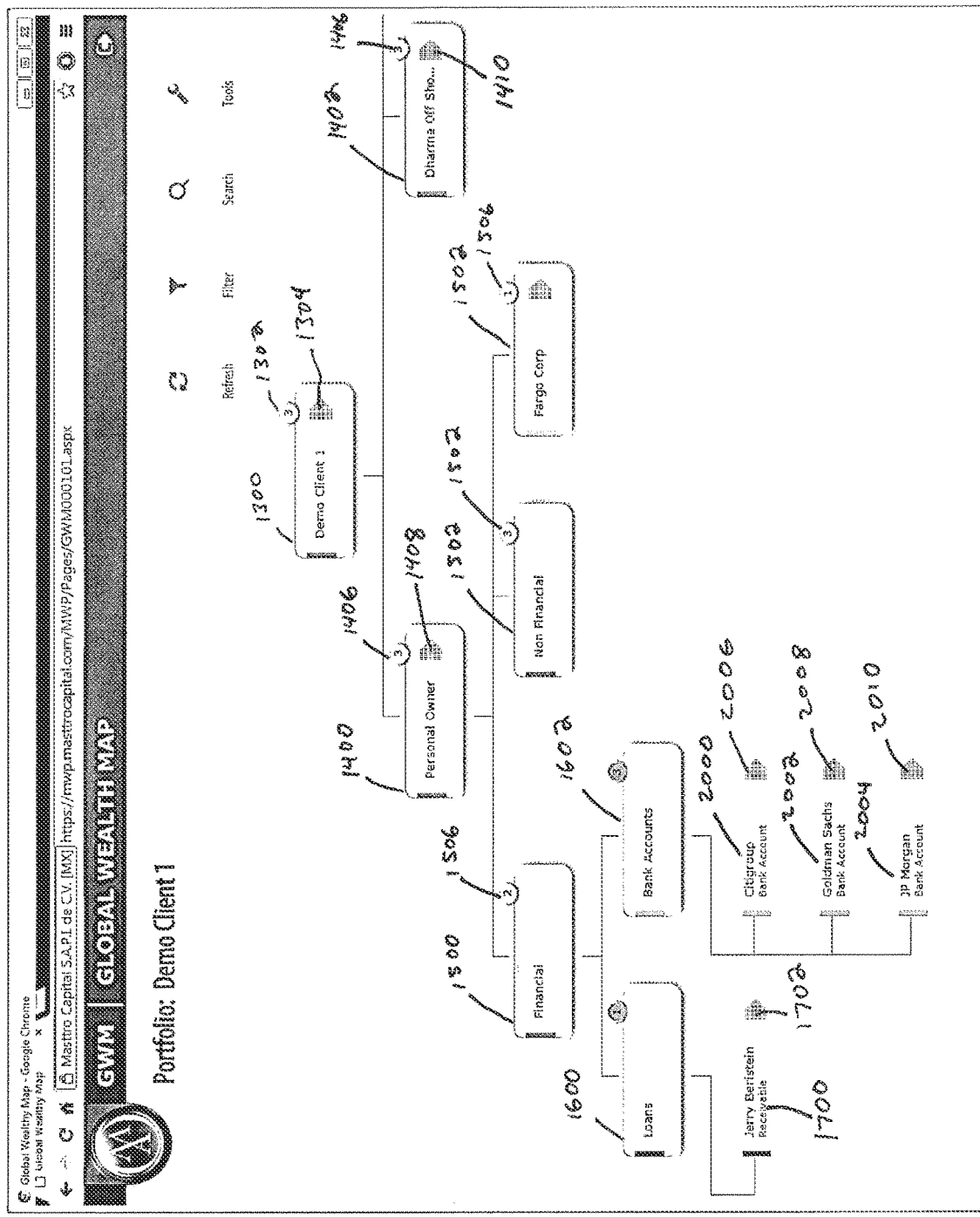
Figure 21:
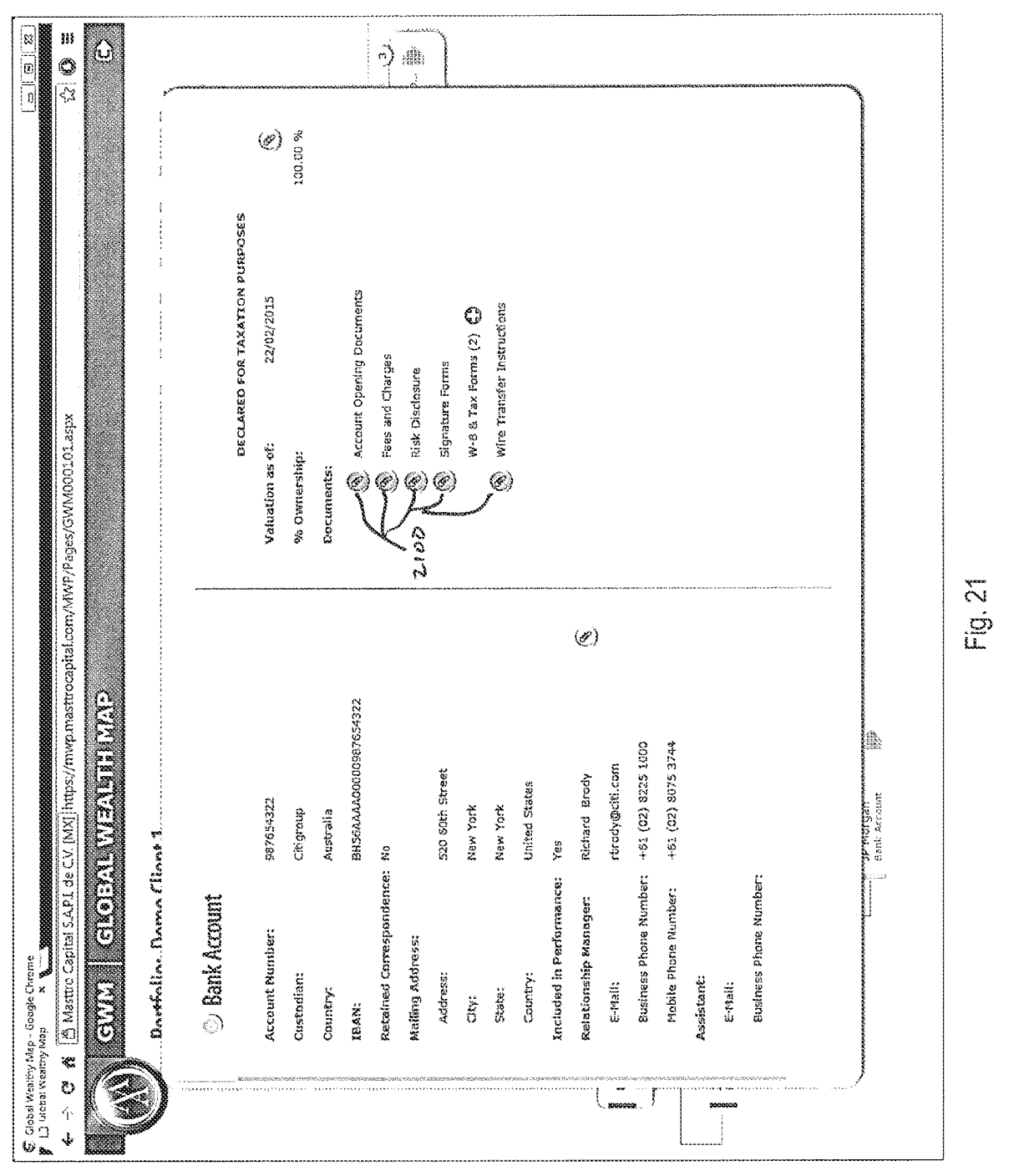

FIG. 20 shows the example tree structure, previously discussed in FIGS. 13-19 after the user has selected the "bank accounts" node 1602. This reveals the children nodes from the "bank accounts" node 1602, which are a first financial object node 2000 (labeled "Citigroup"), a second financial object node 2002 (labeled "Goldman Sachs"), and a third financial object node 2004 (labeled "JP Morgan"). Each of these nodes, 2000, 2002, and 2004 includes a respective portion 2006, 2008, and 2010 to obtain additional information regarding the node. FIG. 21 is a screen shot showing the additional information that can be viewed by the user upon selecting the portion 2006 of the first financial object node 2000. In this screen, the user can select hyperlinks 2100 to access various documents concerning this bank account.

Figure 22:
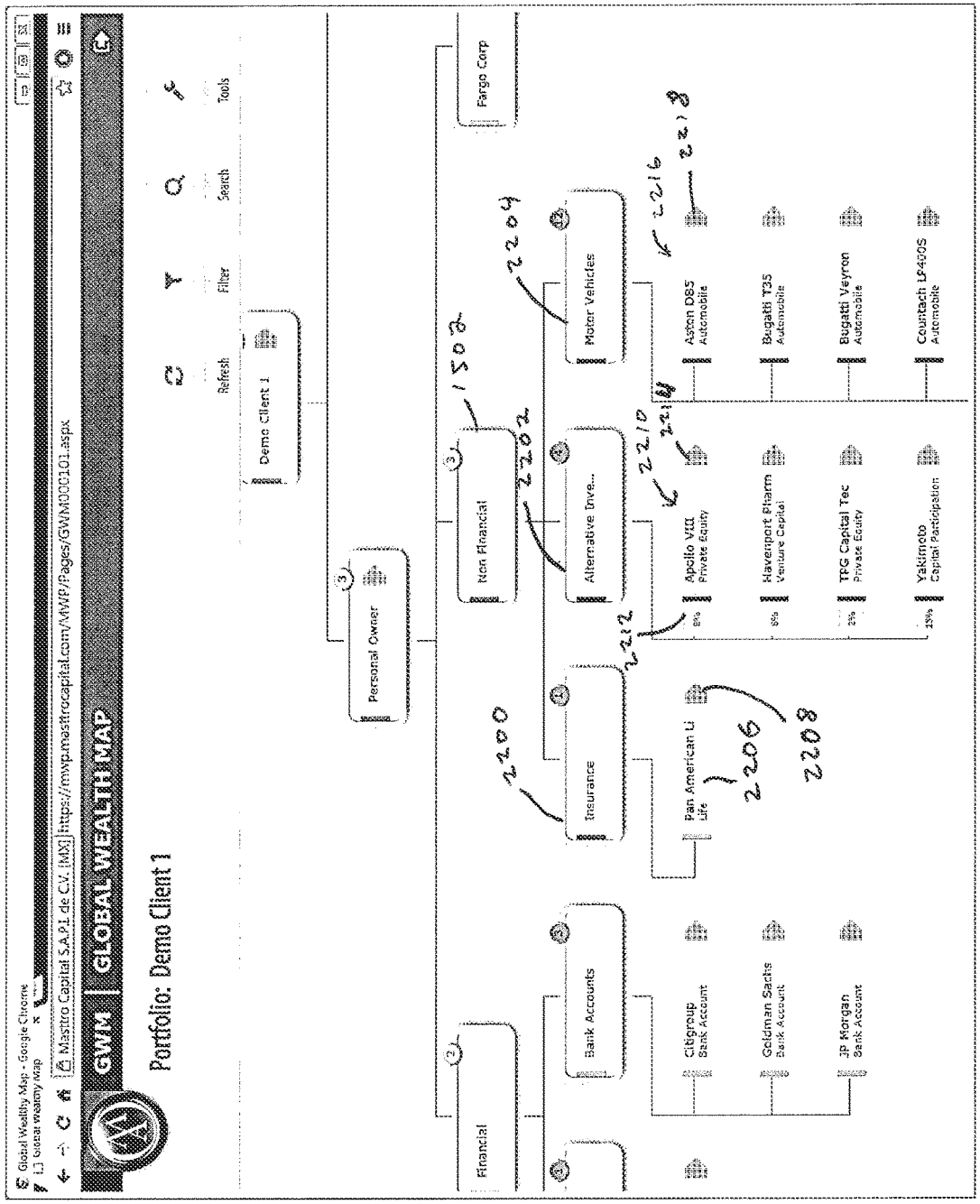
Figure 23:
Figure 24:
Figure 25:
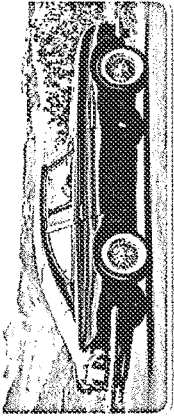

FIG. 22 is a screen shot showing the tree structure upon selecting the non-financial node 1502 to reveal its child nodes, which are in this example an insurance node 2200, an alternative investments node 2202, and a motor vehicles node 2204. Additionally, this tree structure shows the view after selection of each of these nodes 2200, 2202, and 2204 to reveal each of its child nodes. As shown, there is an insurance child node 2206 from which additional information can be obtained by selecting portion 2208, which is shown in FIG. 23. In the child nodes to the alternative investments node 2202, which are represented by reference number 2210, each includes an ownership flag 2212 representative of the percentage of ownership in each respective investment by the owner. For example, the owner has approximately 8% ownership interest in the Apollo VIII Private Equity node, which is shown when the more info portion 2214 is selected, as shown in FIG. 24. Referring again to FIG. 22, a portion of the child nodes 2216 represent vehicles owned by the user. Each of these nodes 2216 includes a portion 2218 from which the user can obtain additional information, such as shown in the screen shot on FIG. 25. In some embodiments, assets that are movable, such as motor vehicles and collectibles, could be equipped with a GPS sensor with the GPS location data stored in the family office software 108 so the location of each object could be automatically determined and tracked.

Figure 26:
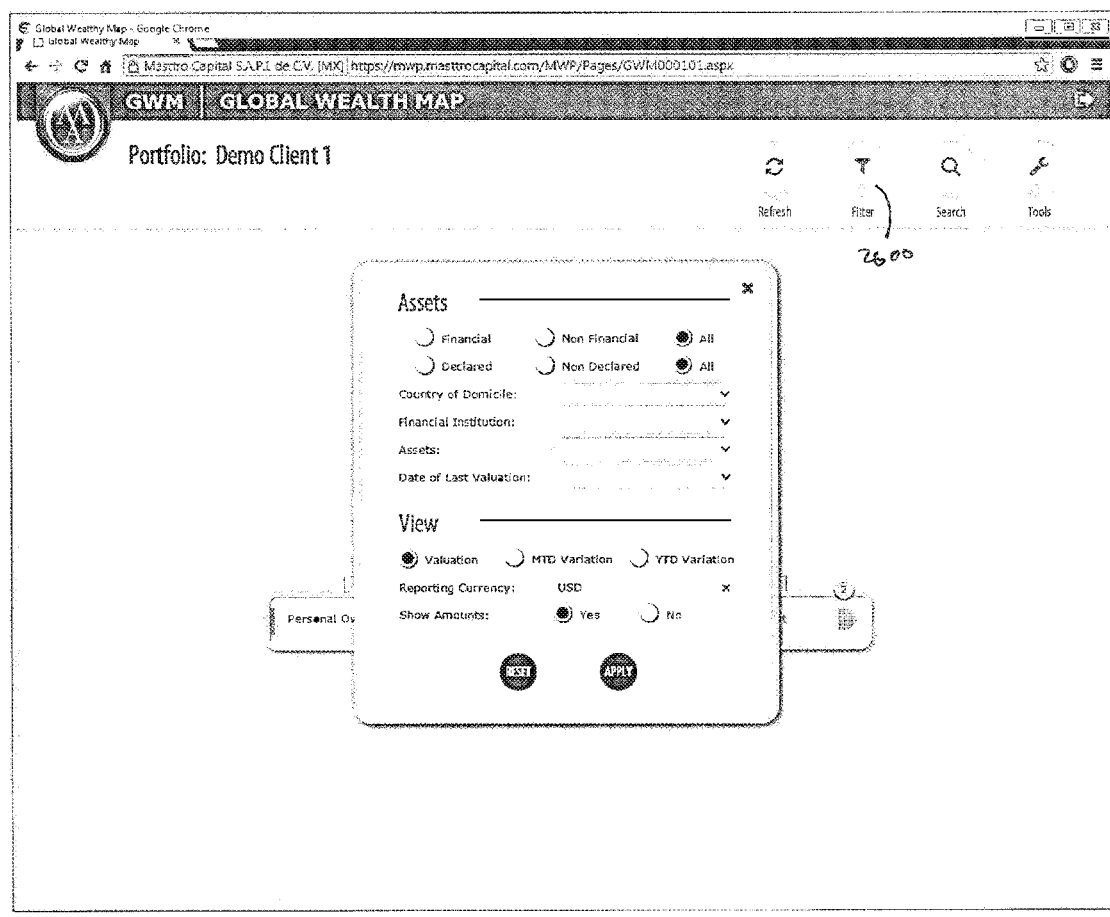
Figure 27:
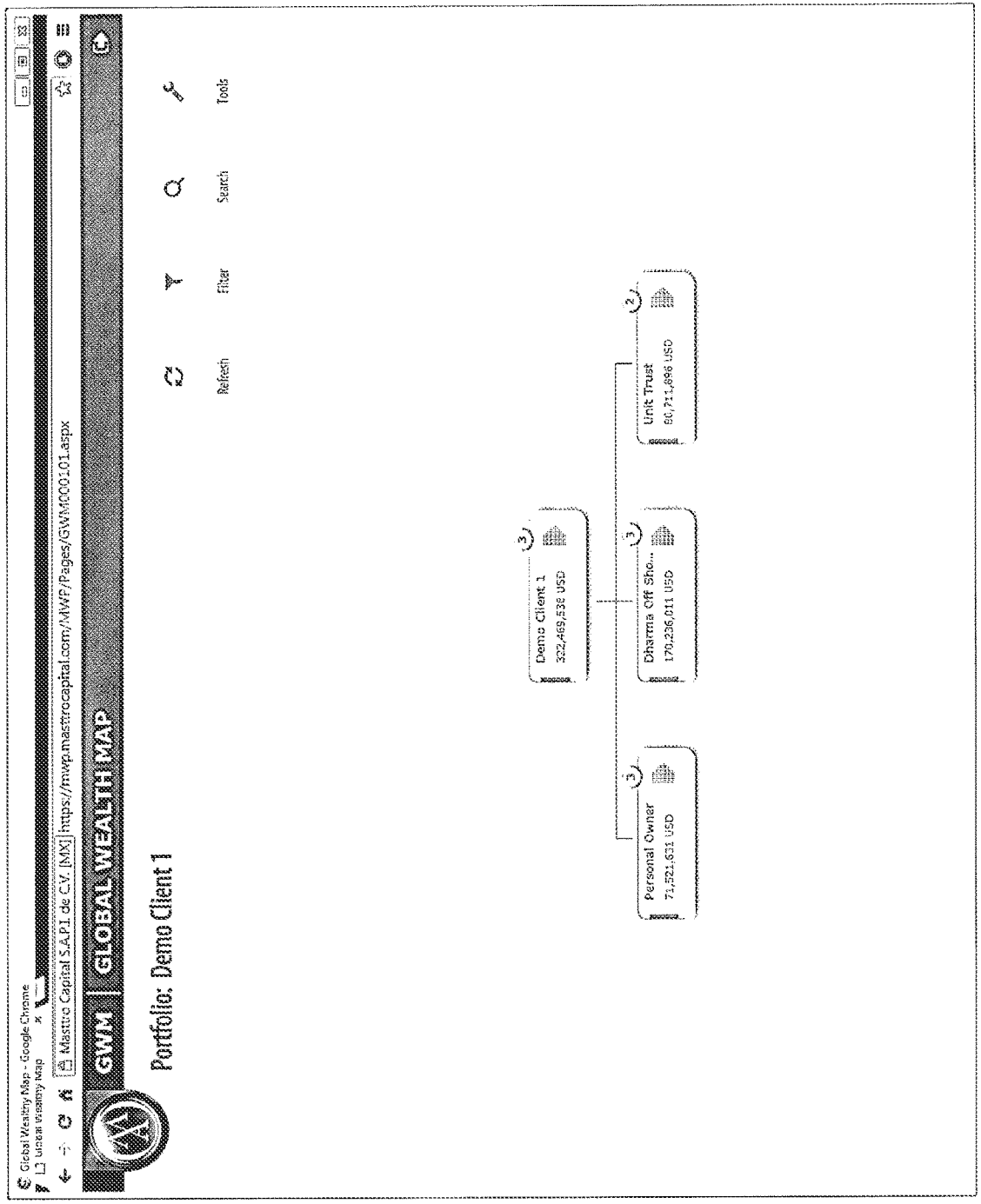
Figure 28:
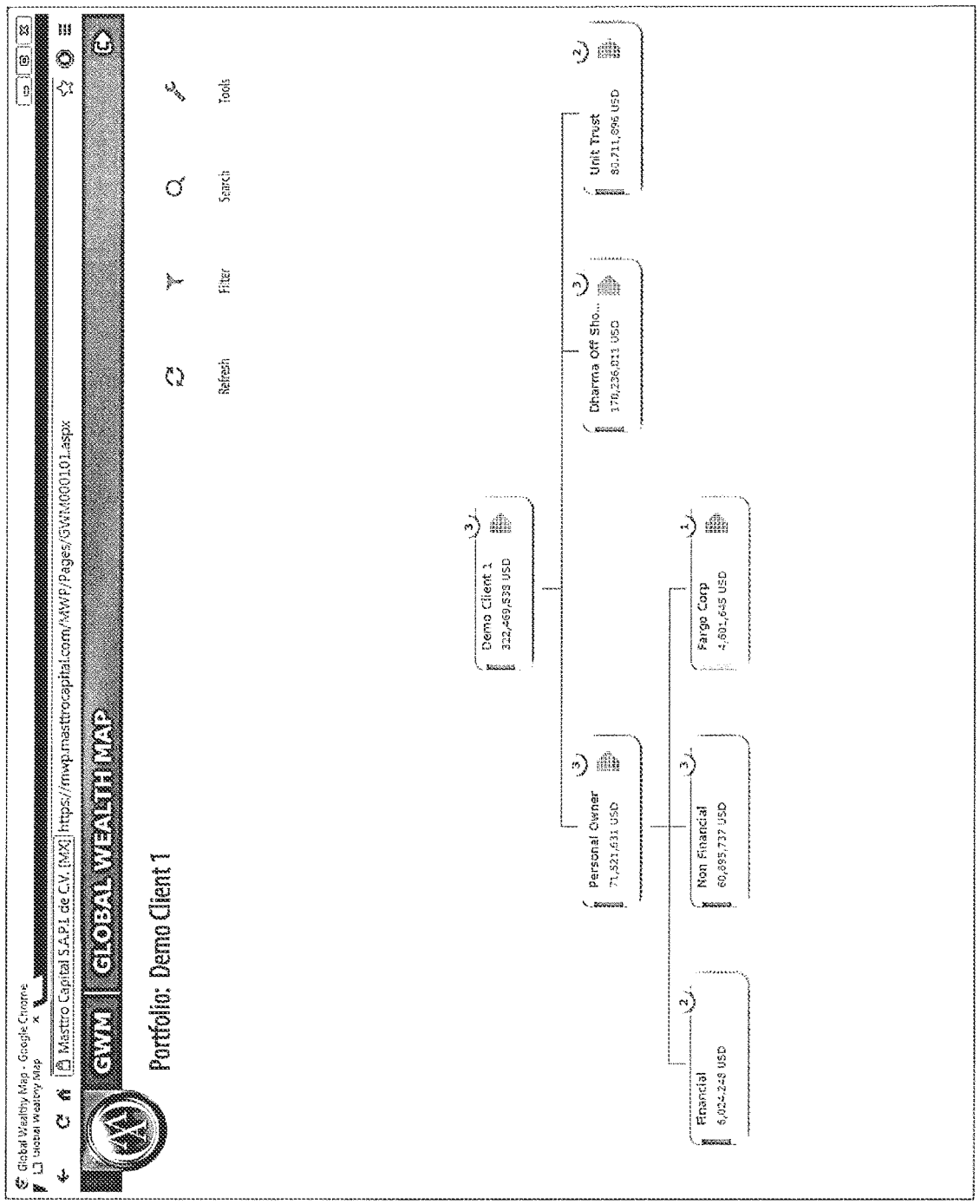

FIG. 26 is a screen shot upon the user selecting a filter 2600. This allows the user to change the manner by which nodes are shown. For example, the "show amounts" in this example is selected as "yes," which means that the aggregate value of each node including descendant nodes are displayed as a flag on the nodes, which allows a high level view showing the value of various assets and investments. FIGS. 27 and 28 are screen shots showing example monetary values for each of the nodes with the "show amounts" valuation selected. This filter allows a user to disable the showing valuations in the event that the user is showing a third party and does not want to reveal the monetary value of the portfolio.

Figure 29:
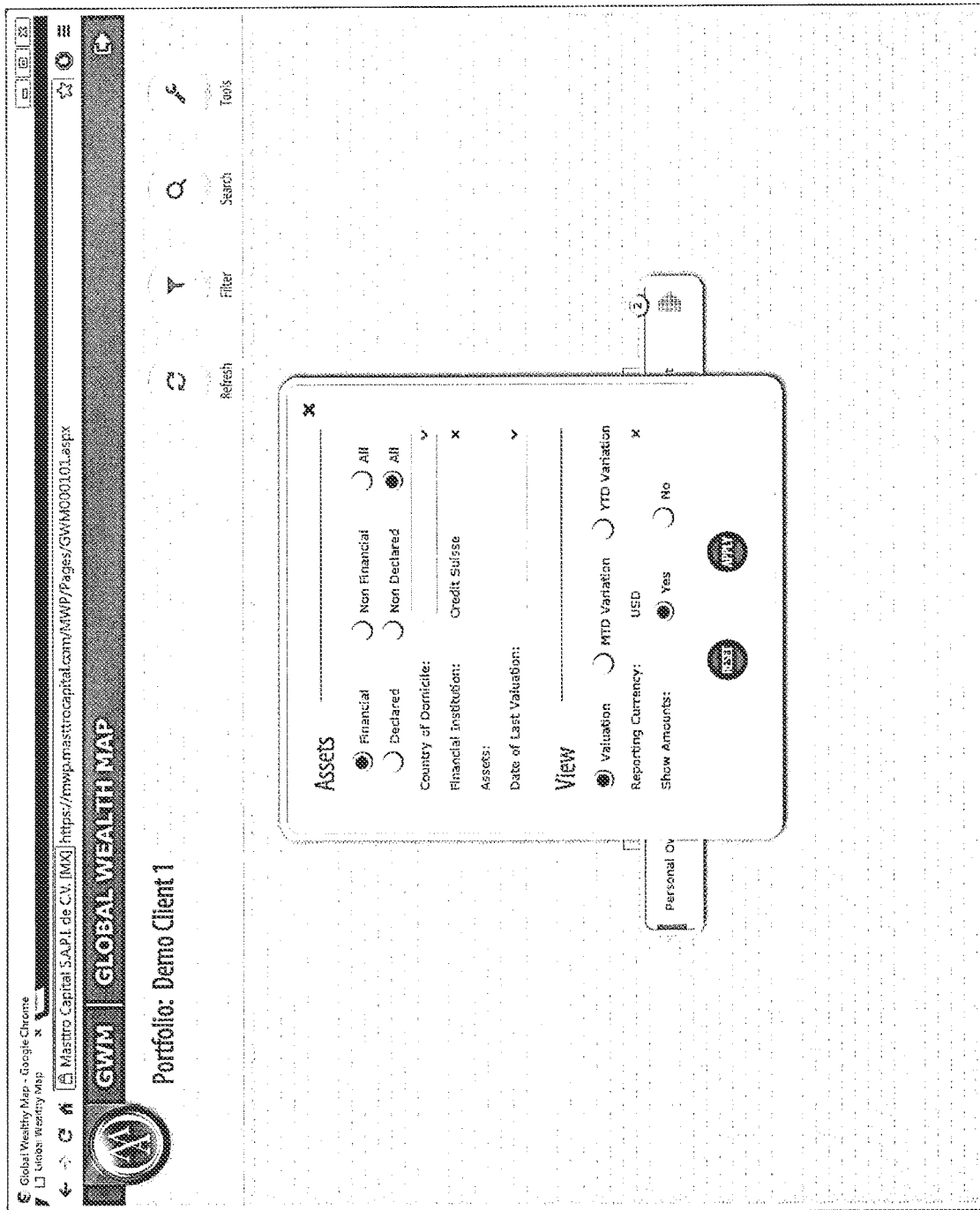
Figure 30:
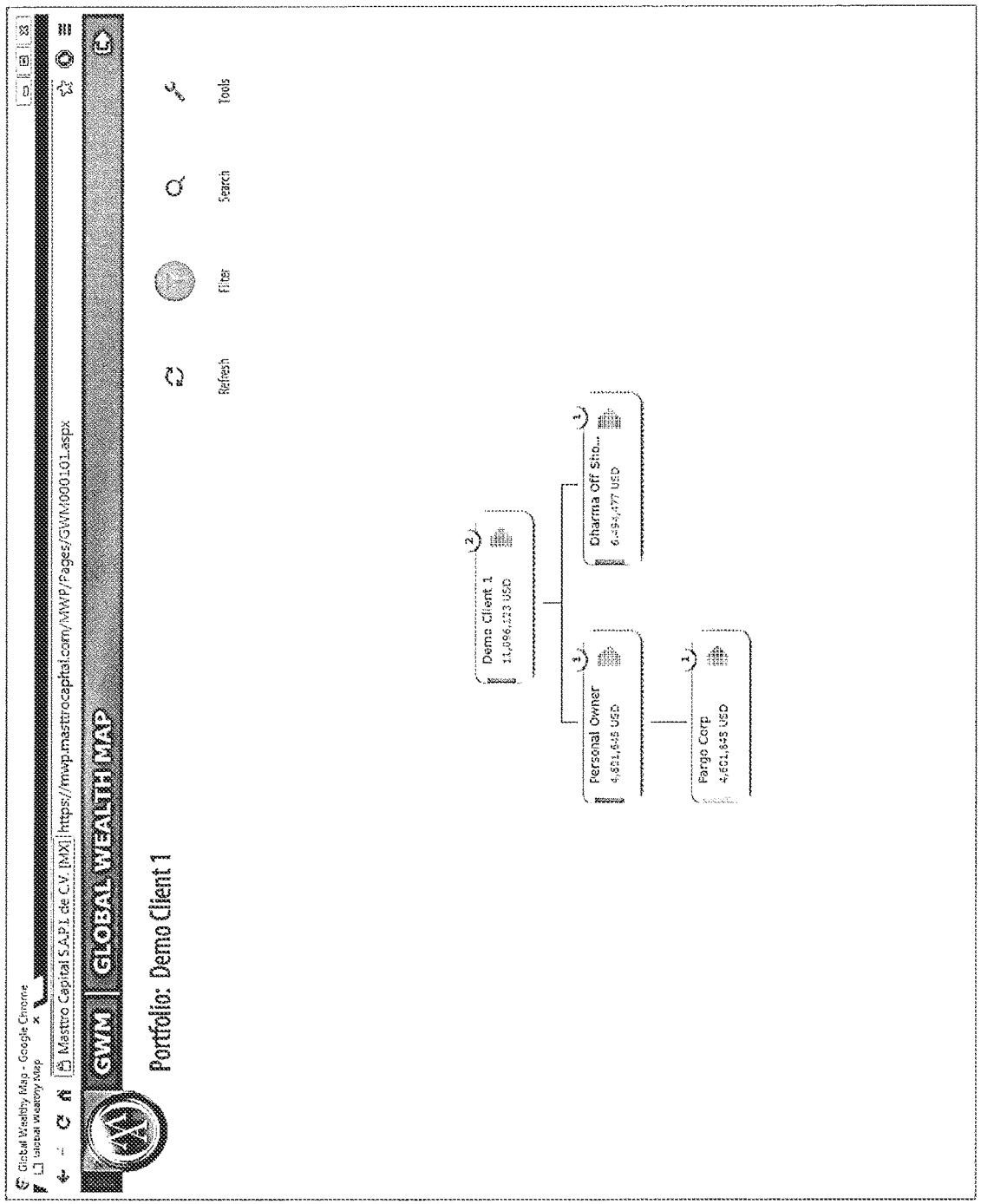

FIG. 29 is an example showing filtering by financial institution, which in this example is limited to Credit Suisse. The screen shot shown in FIG. 30 illustrates the filtering of the portfolio solely to assets at Credit Suisse. In other words, the only nodes that are displayed with this filter are those associated with Credit Suisse.

Figure 31:
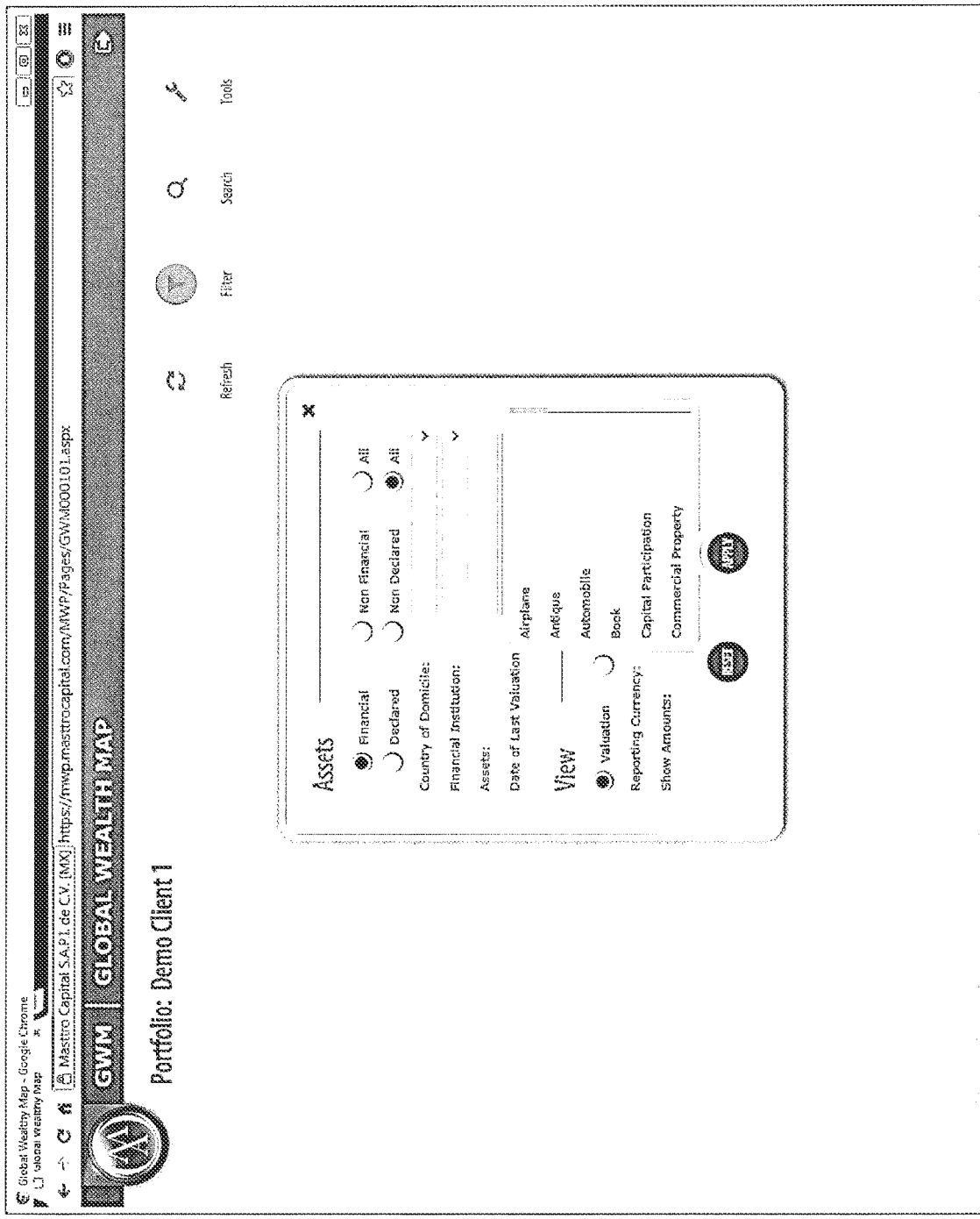
Figure 32:
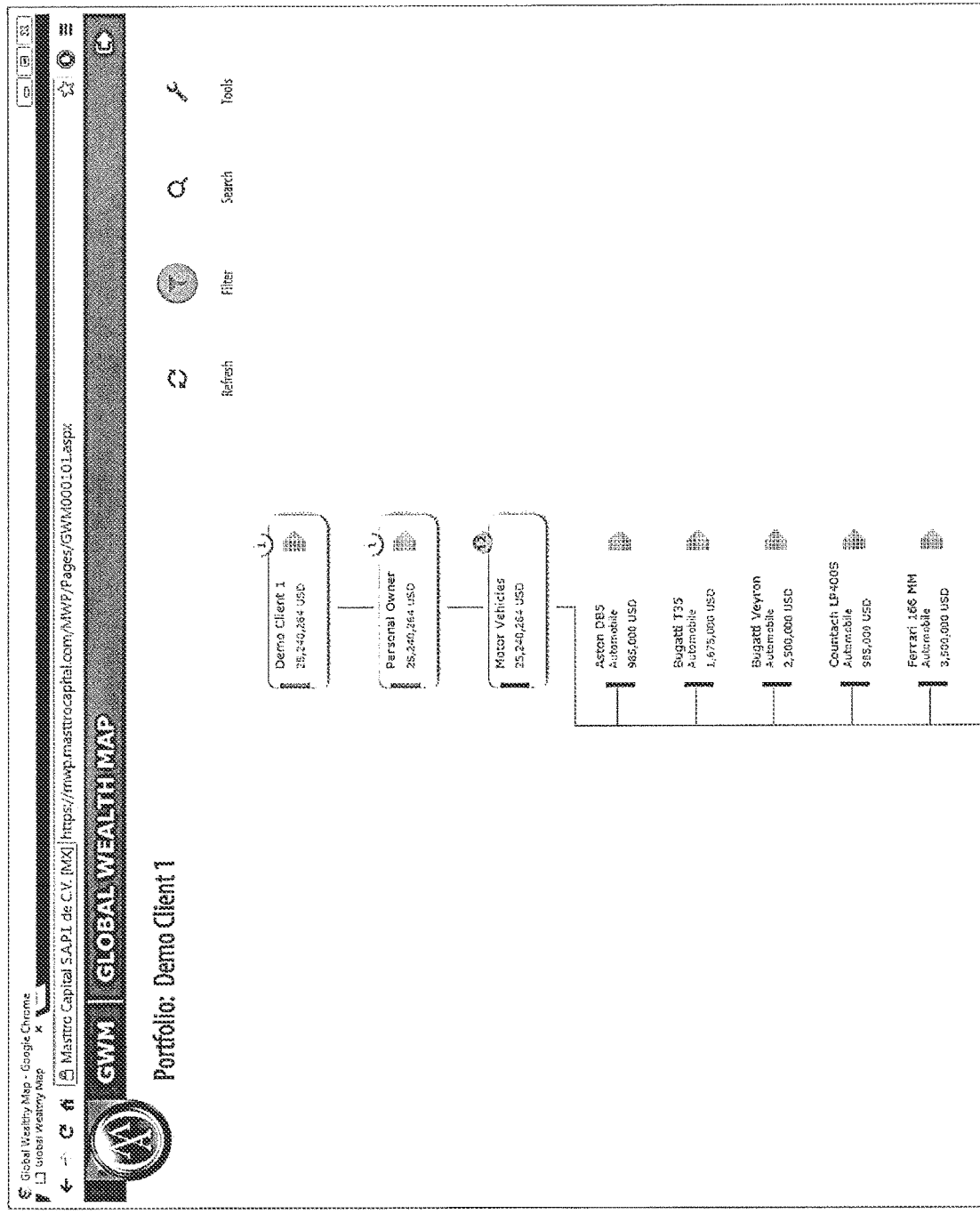

FIG. 31 shows filtering by asset type, which allows the user to view the tree structure based on the type of assets desired to be seen. FIG. 32 shows an example in which motor vehicles are the asset class selected in the filtering function. With this filter, the nodes for other types of assets are not shown in the tree structure.

Figure 33:
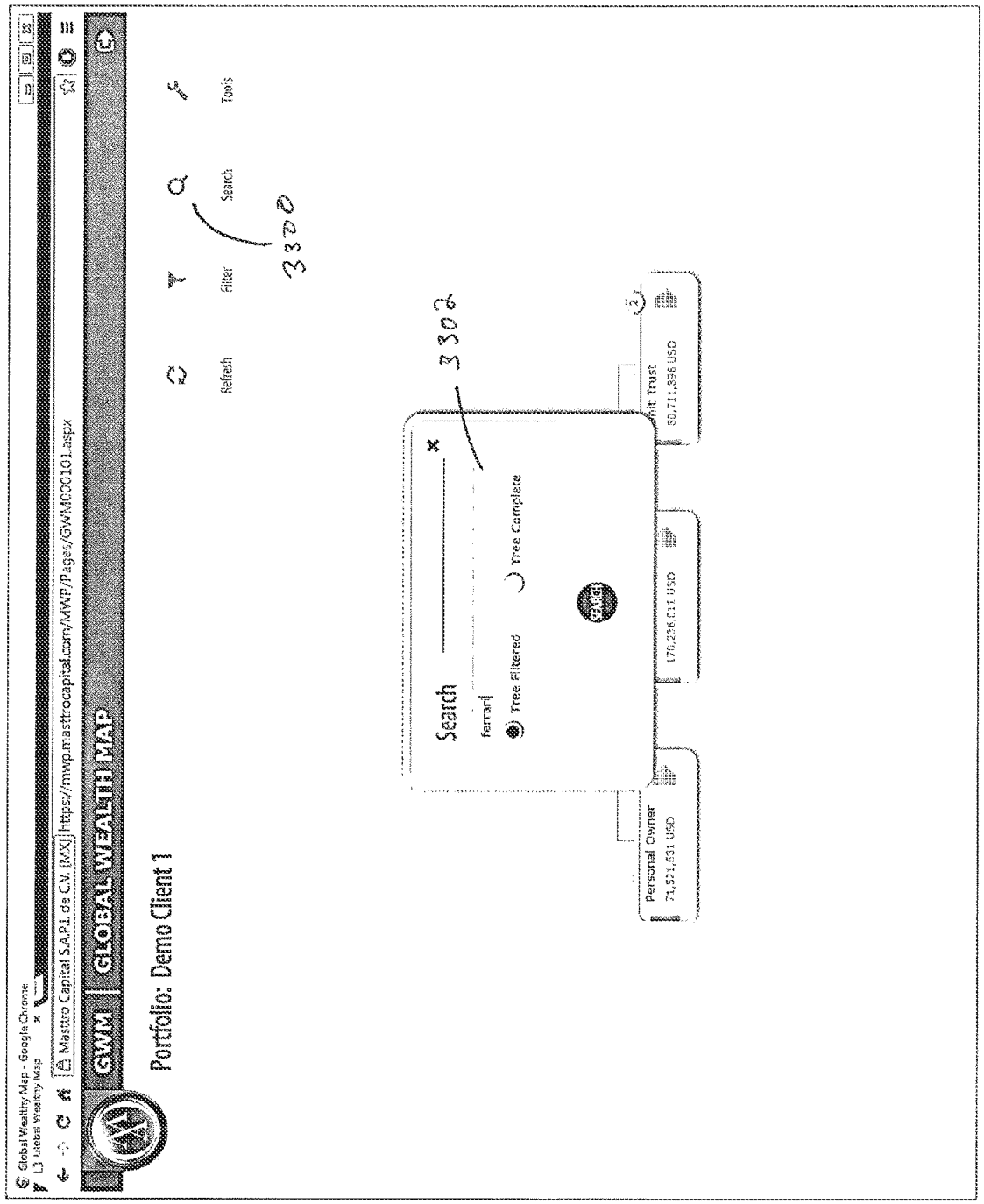
Figure 34:
Figure 35:
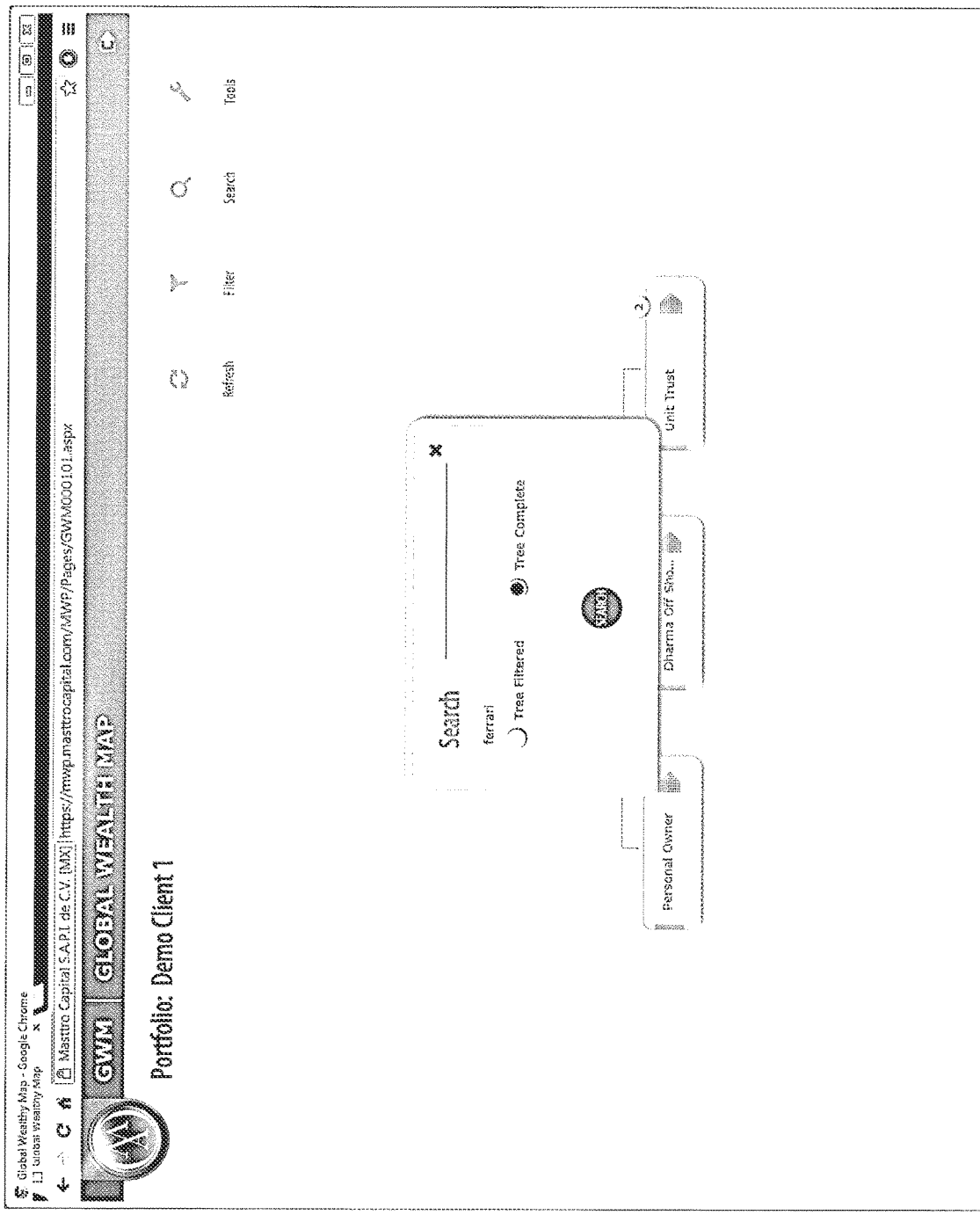
Figure 36:
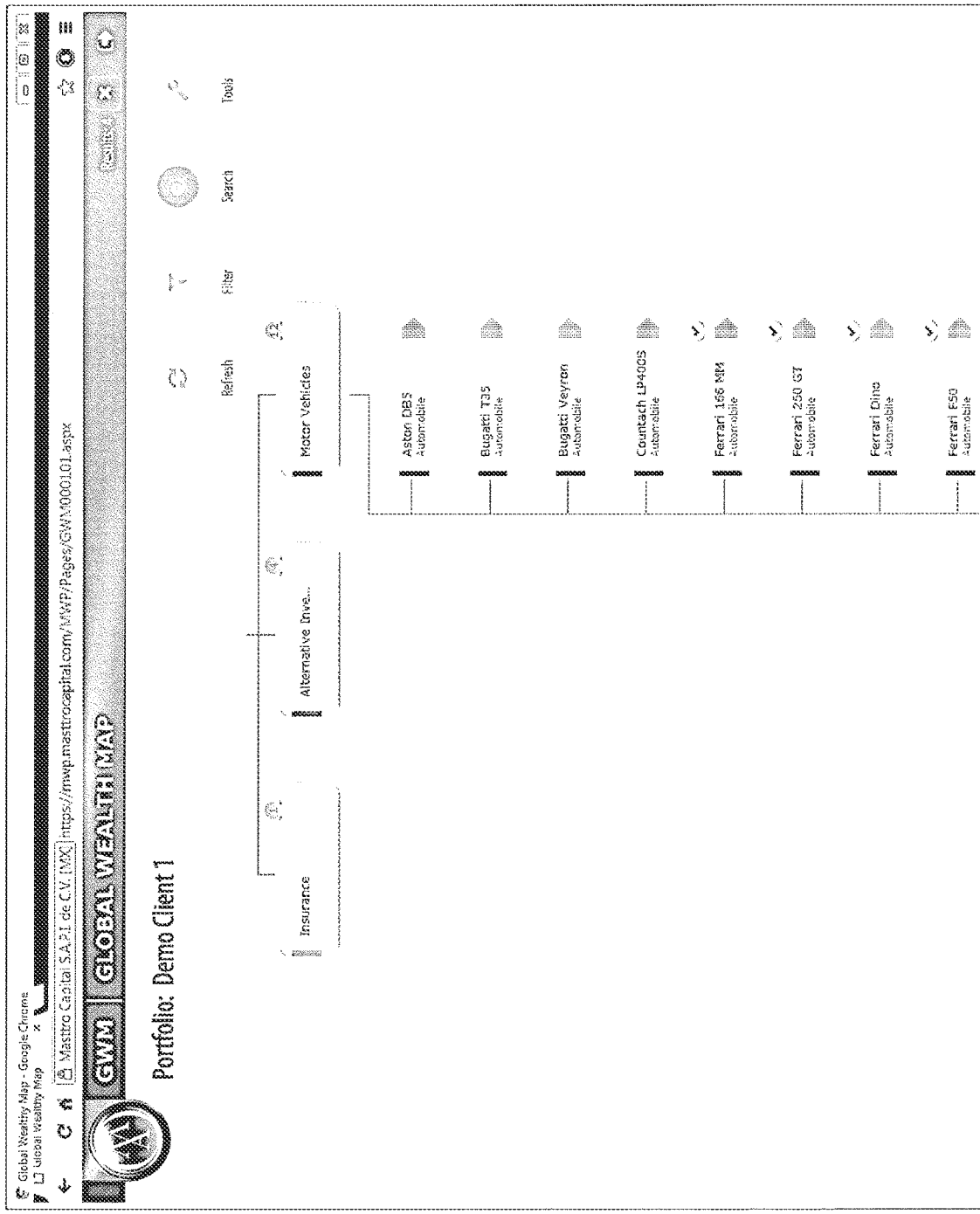

FIG. 33 is a screen shot showing a search function that is actuated by selecting a search button 3300. In this example, the user can type a search term into a text box 3302, which for purposes of illustration has a search term "ferrari." FIG. 34 shows the search results that filters the nodes in the tree structures solely to those that are Ferraris under the motor vehicle node, including ancestor nodes. In this example, the "tree filter" radio button is selected which filters out other nodes in the tree structure so they are not displayed. FIGS. 35 and 36 show examples in which a "tree complete" radio button is selected which shows other nodes on the tree, but highlights those nodes that include the search term, as shown in FIG. 36.

Referring back to FIGS. 11 and 12, there is shown an example process by which the global wealth map module 216 could operate. In this example, upon selection of the global wealth map module 216, the module determines the node structure for the client (Step 1100). The module next determines whether the show valuation is active (Step 1102). If not, the module displays the root node with a count flag (Step 1104). If the show valuation is active, the module determines the total aggregate monetary value of the nodes descendant from the root node (Step 1106) and displays the root node with a count flag and the value that is determined (Step 1108). Upon selection of the root node (Step 1110), a determination is made whether the show valuation is active (Step 1112). If not, the root node is expanded to display each child node in the tree structure with a count flag (Step 1114). If showing a valuation is active, the total monetary value of the nodes descendant from the child nodes is determined (Step 1116) and the root node is expanded to display each child node in a tree structure with a count flag and determined valuation (Step 1118). If the more information portion about a node is selected (Step 1120), the data regarding the node is retrieved and displayed in a structured manner (Step 1122).

Figure 11:
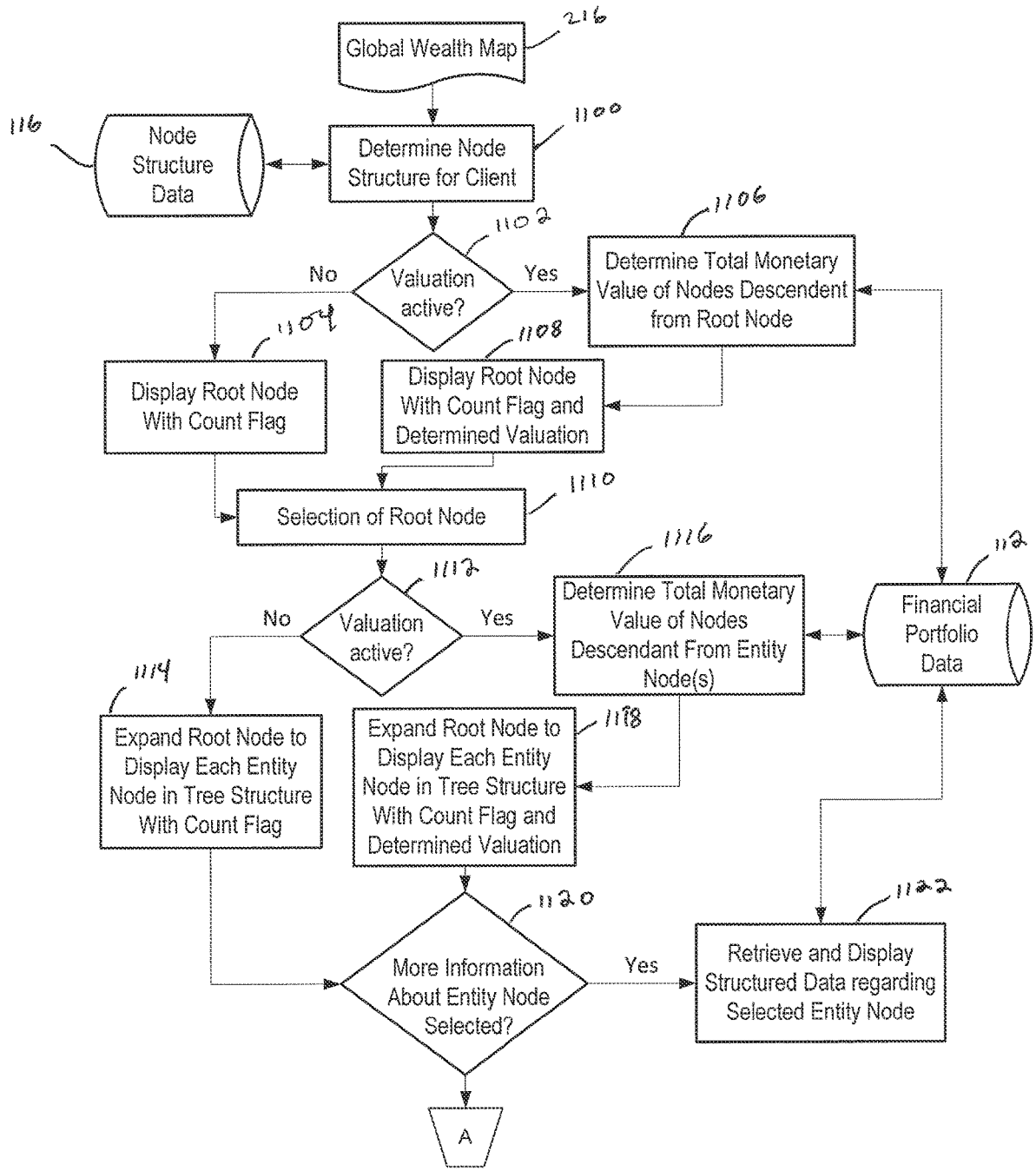
FIGS. 11-12 are flow charts showing example operations that could be performed by the global wealth map module according to one embodiment.
Figure 12:
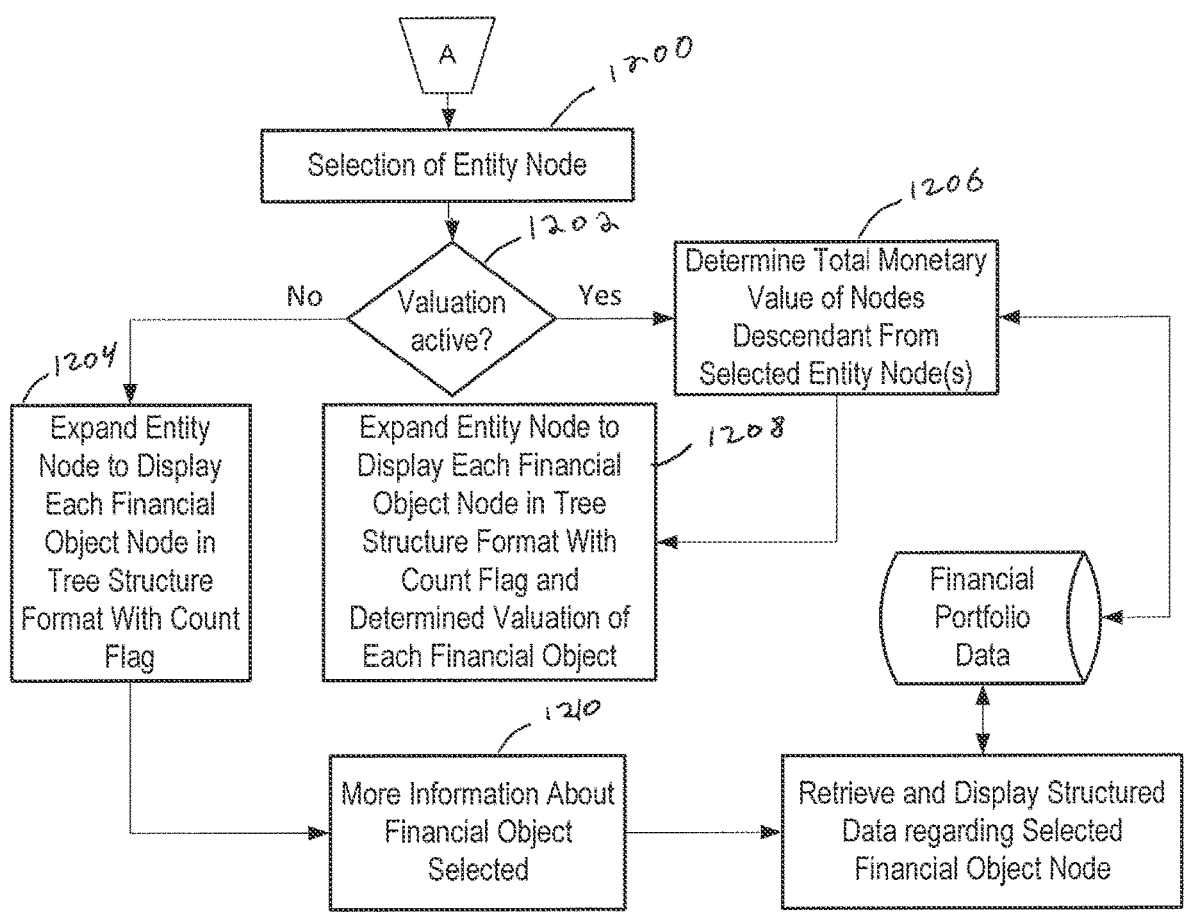

Referring to FIG. 12, which continues the process in FIG. 11, upon selection of an entity node (Step 1200), a determination is made as to whether the show valuation is active (Step 1202). If not, the entity node is expanded to display each financial object node in the tree structure with a count flag (Step 1204). If the show valuation is active, the total monetary value of the nodes descendent from the selected nodes are determined (Step 1206) and the node is expanded to display each child node in a tree structure format with count flag and determined valuation of each financial object (Step 1208). If a user selects more information about a financial object node (Step 1210), the data regarding the selected node is retrieved and displayed in a structured format for the user to view. This process in FIGS. 11 and 12 is shown merely for example purposes and would change based on the tree structure specific for a financial portfolio.

Referring again to FIG. 2, the automated reconciliation system 218 allows accounts in the portfolio to be reconciled automatically.

Figure 37:
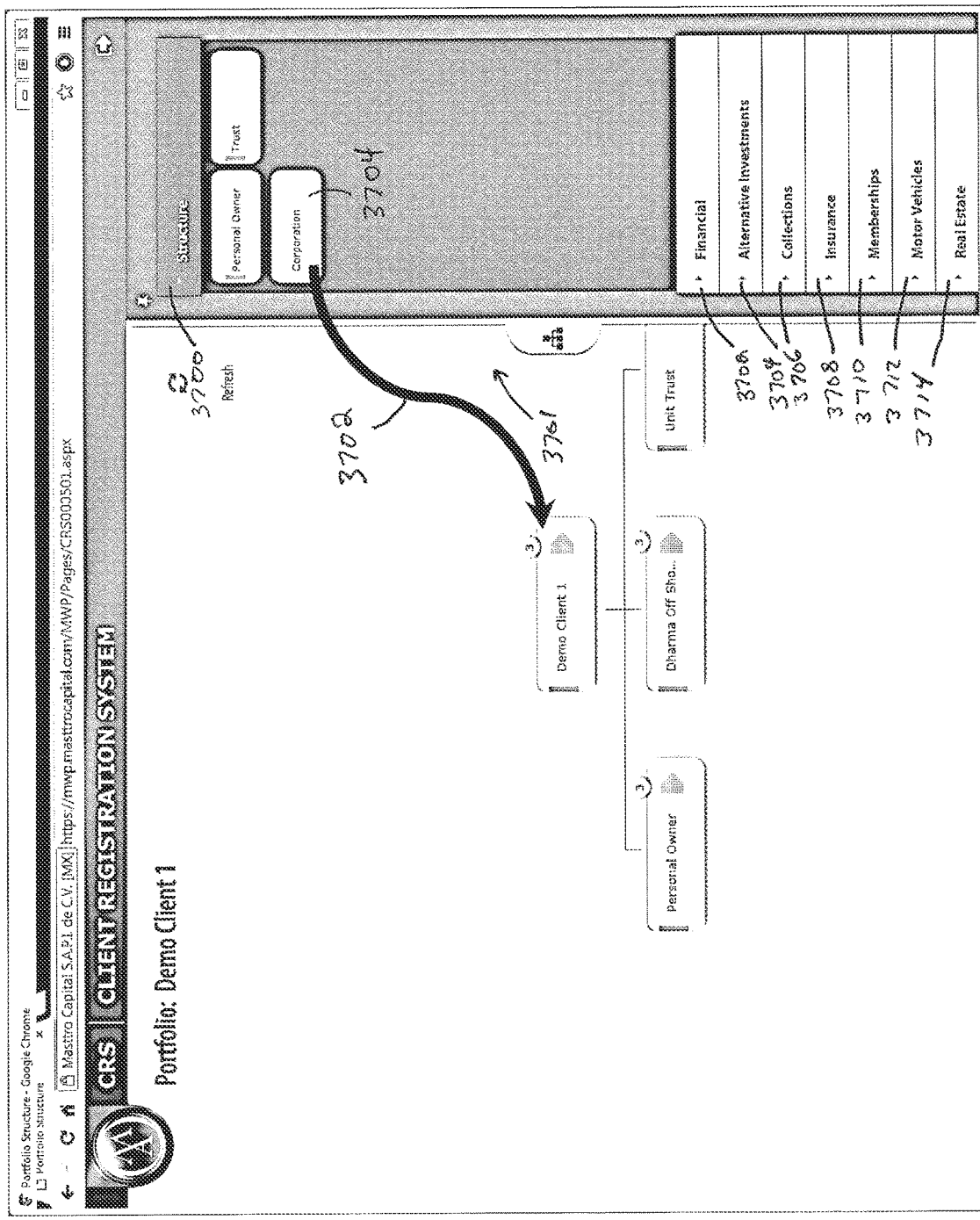
Figure 38:
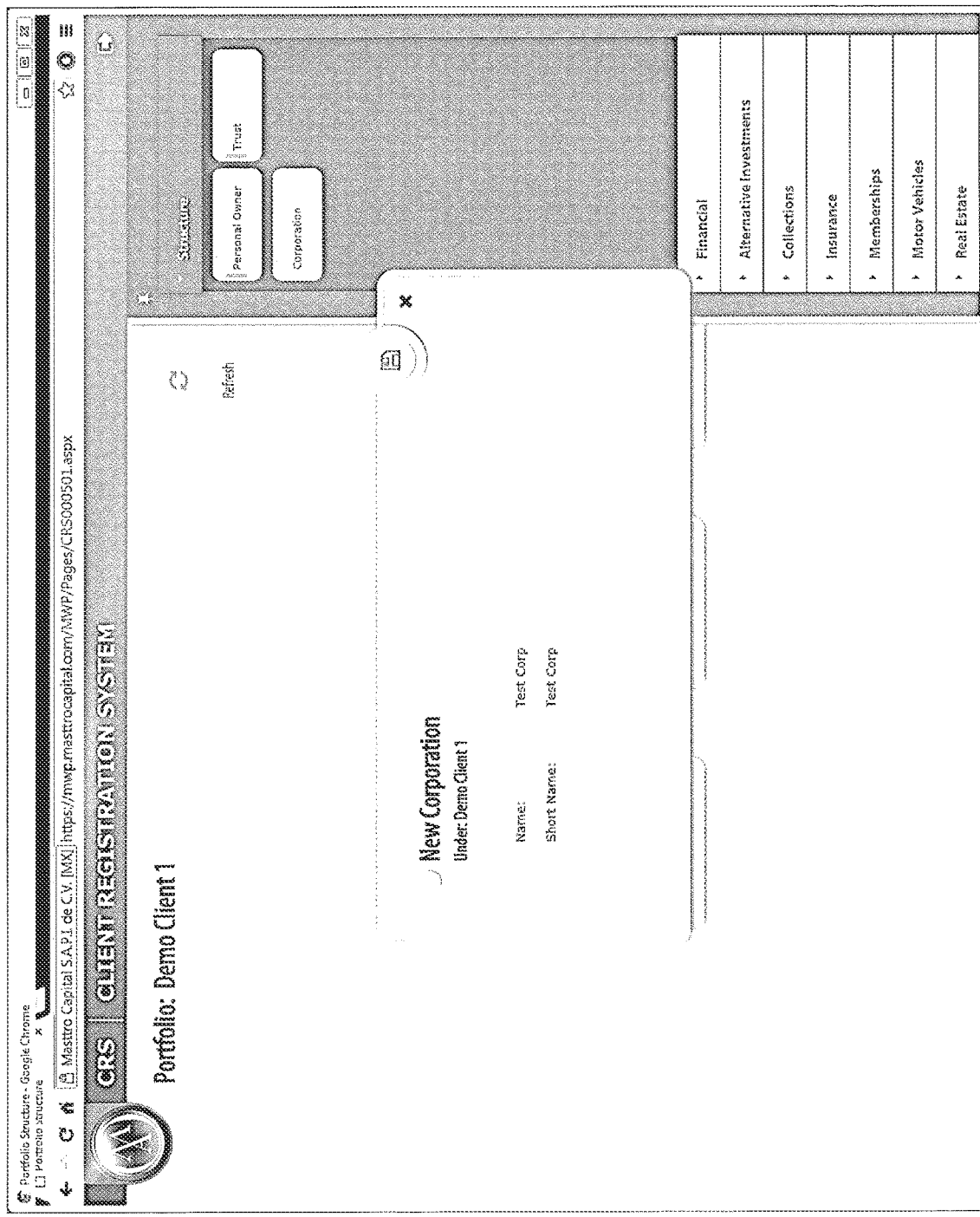
Figure 39:
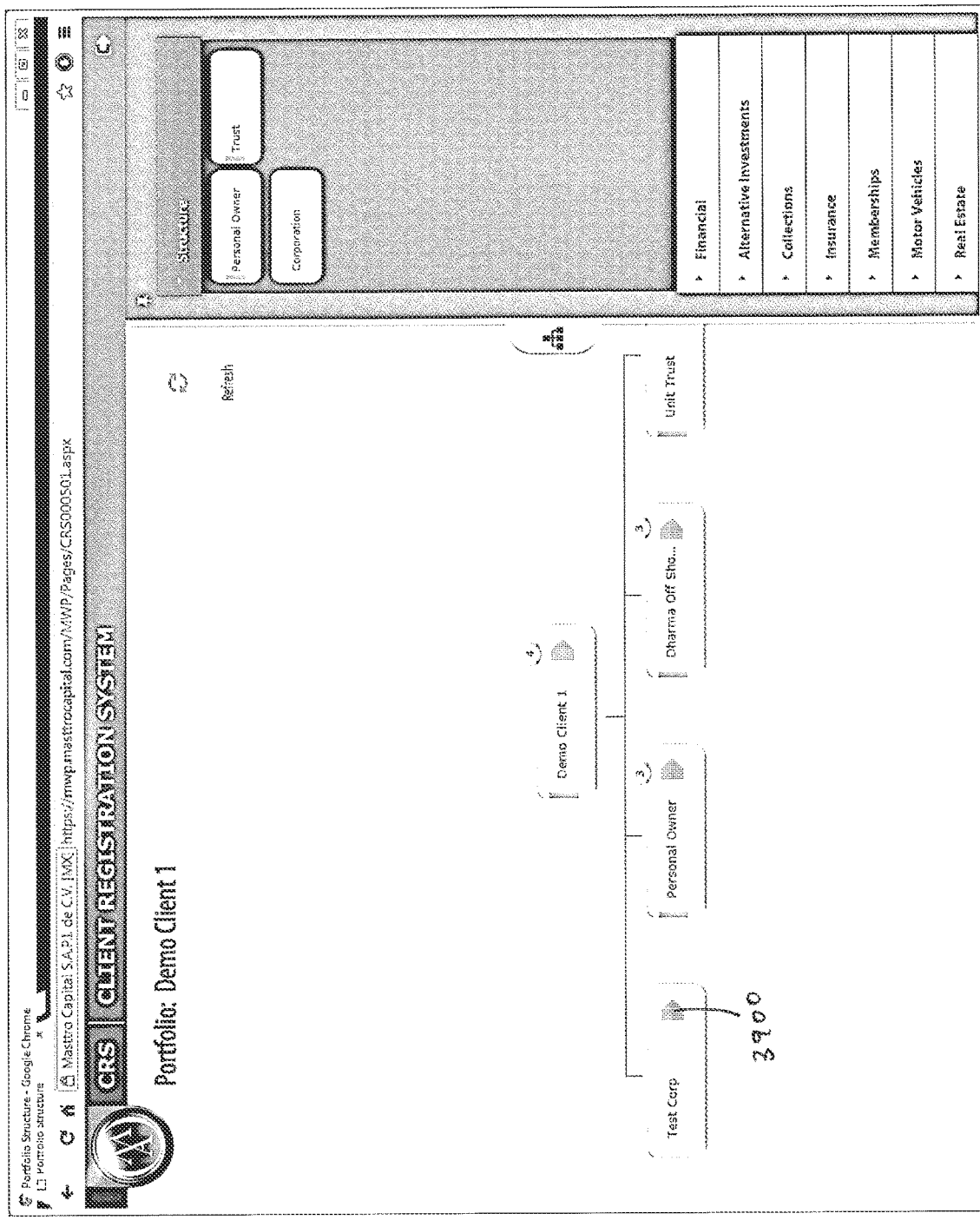
Figure 40:
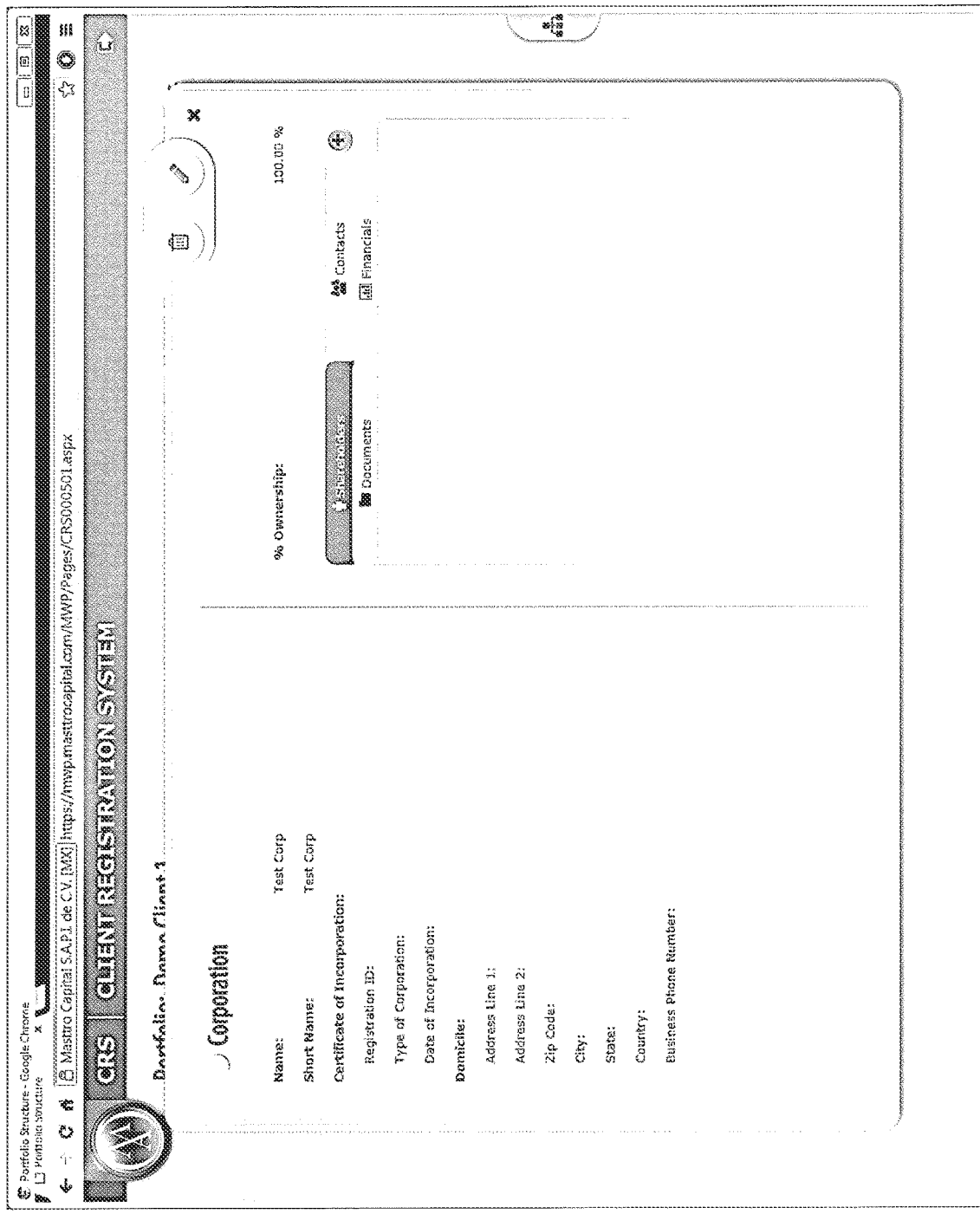
Figure 45:
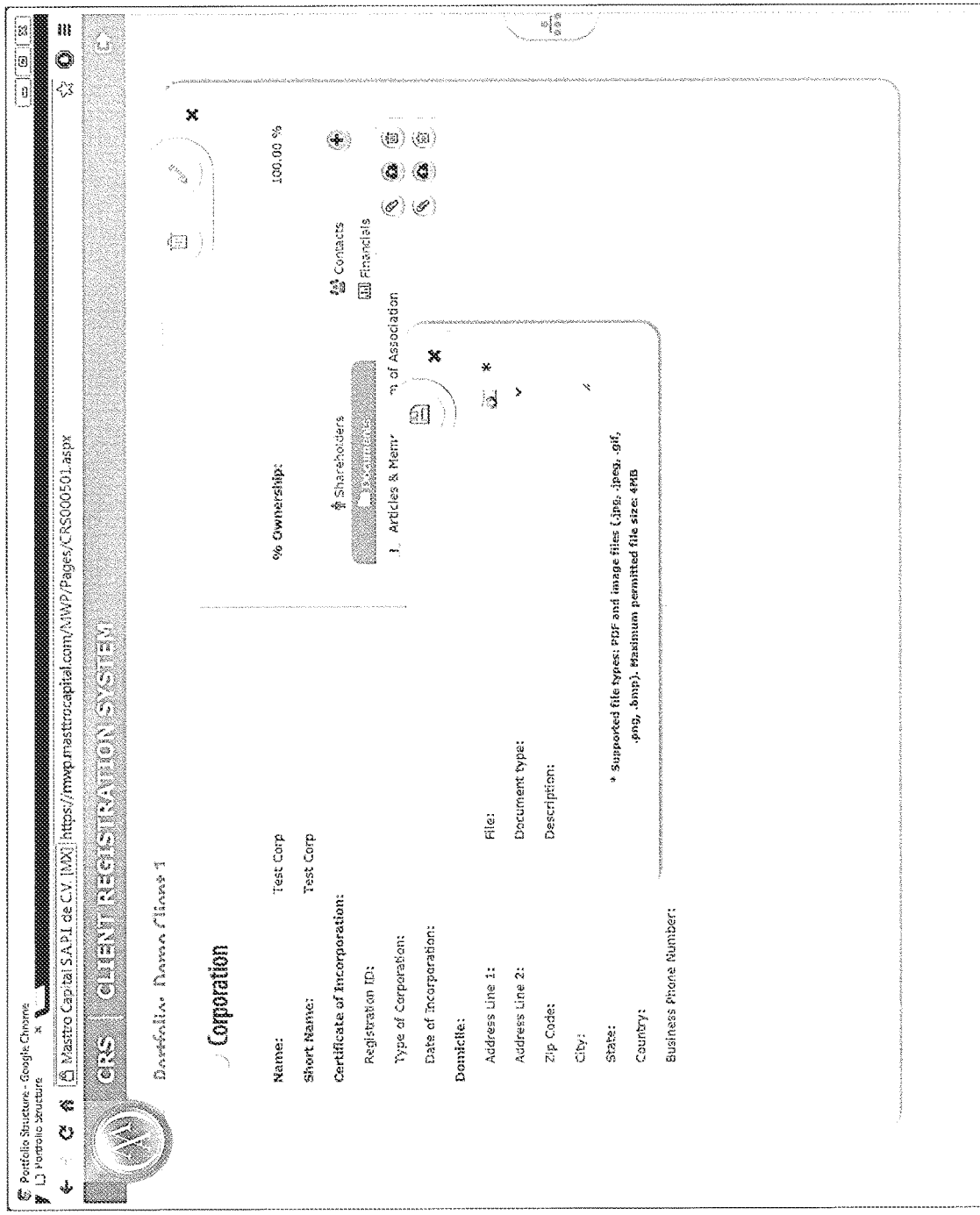

The client registration system 220 allows the user to set up the tree structure of the portfolio and populate information about the nodes in the portfolio. FIGS. 37 through 55 show an example user interface in which a tree structure and information about the portfolio can be built and populated by a user. FIG. 37 shows the example interface with a new node pane 3701 showing categories of nodes that can be added to the portfolio tree structure. As shown, there are several types of nodes that can be added to the portfolio, including but not limited to structure 3700, financial 3702, alternative investments 3704, collections 3706, insurance 3708, memberships 3710, motor vehicles 3712, and real estate 3714. Upon selecting a type of node to insert into the portfolio, the user may select a type of node to be inserted into the portfolio. As shown, the user has selected the structure 3700 type for insertion into the portfolio, which allows the user to potentially add a personal owner node, a corporation node and/or a trust node. In some embodiments, the user inserts new nodes into the portfolio by dragging nodes from the new node pane 3701 onto a node in the portfolio that is intended to be a parent to the new node. For example, the arrow 3702 indicates that the user is dragging the corporation node 3704 onto the root node in FIG. 37. Upon taking that action, the module presents the user with an interface to name the new node that will be inserted into the portfolio, as shown in FIG. 38. FIG. 39 shows the "Test Corp" node added to the tree structure as a child of the root node. Upon selecting the more information portion 3900, the user is presented with an interface for entering information about the node as shown in FIG. 40, which is specific to a corporation in this example, since the added node represents a corporation. FIG. 41 shows an example interface for adding shareholders to the newly added corporation node. FIG. 42 shows an example interface for adding contacts to the newly added corporation node. FIG. 43 shows the selection of a "champion" contact type of the contact shown in FIG. 42. FIG. 44 shows an example contact interface for adding information about a contact to be associated with the newly added corporation node. FIG. 45 shows an example interface for adding documents concerning the newly added corporation node.

Figure 46:
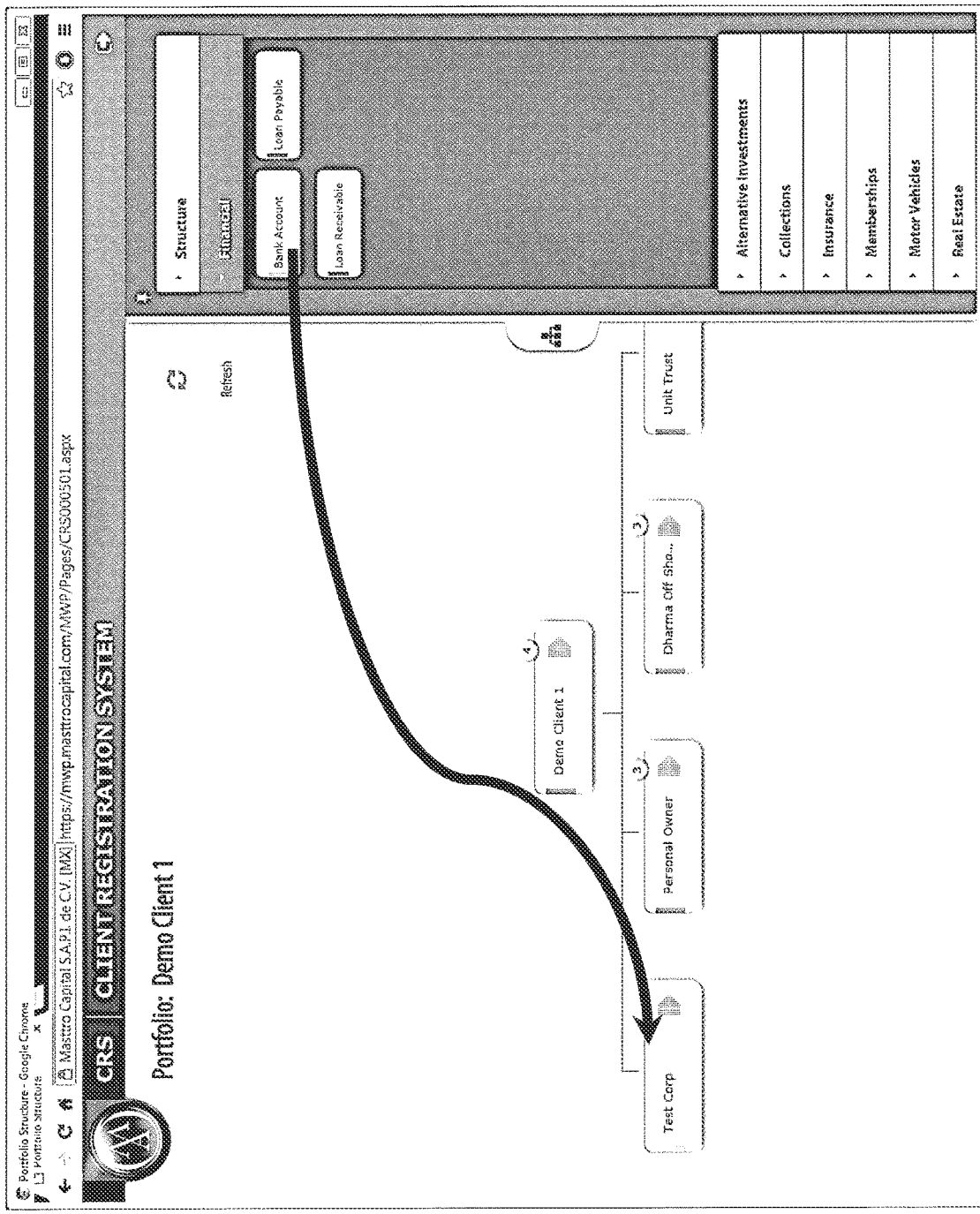
Figure 47:
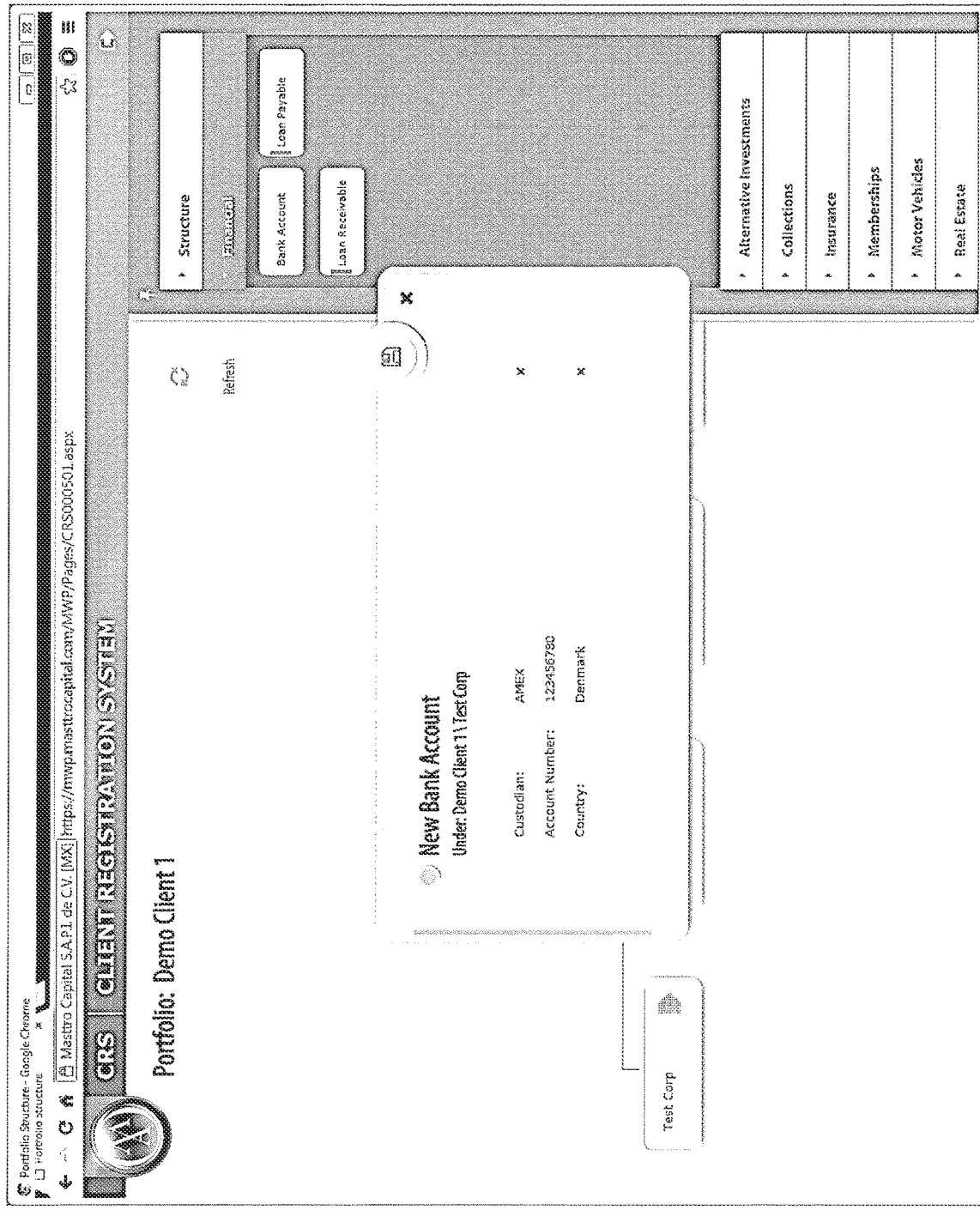
Figure 48:
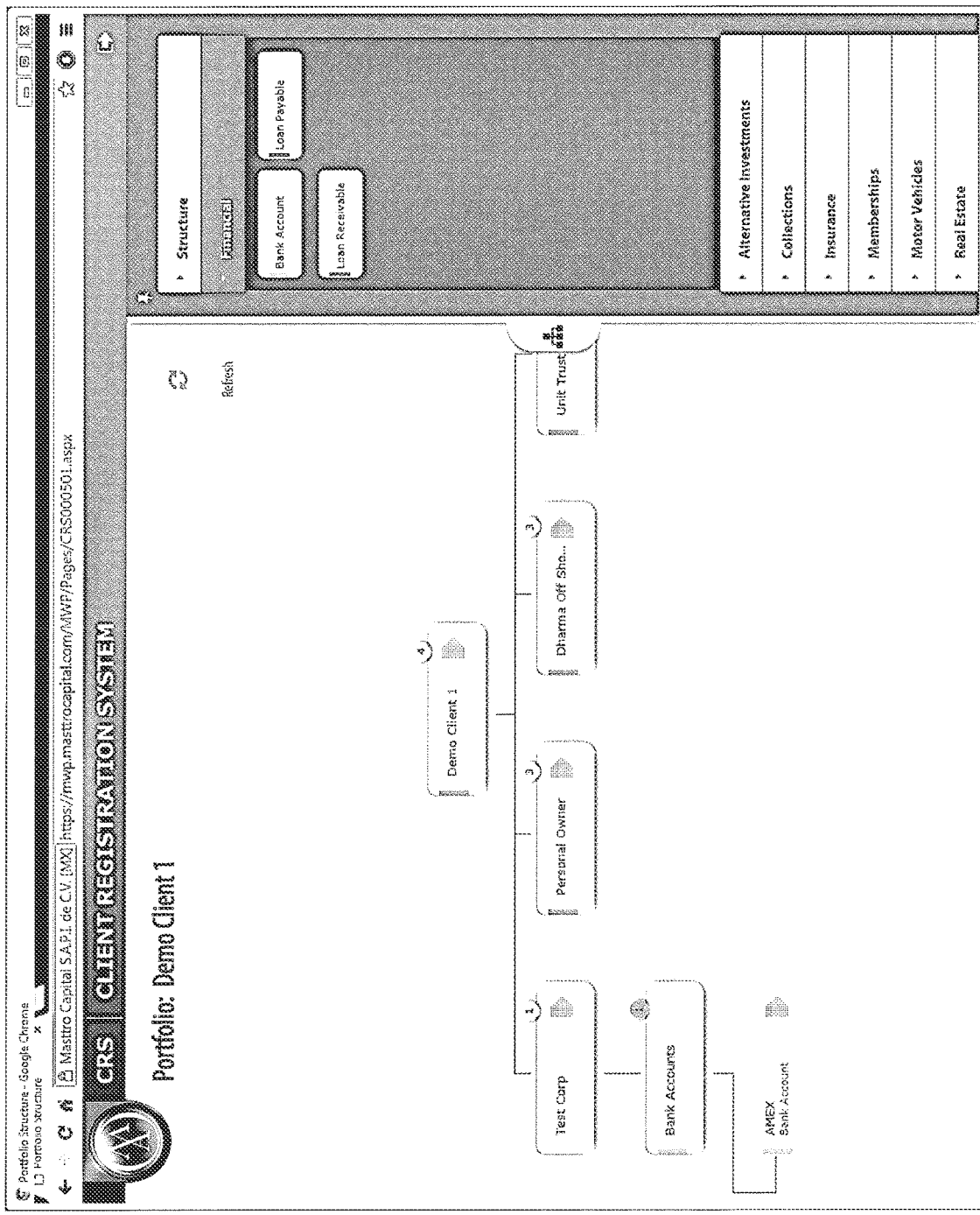
Figure 49:
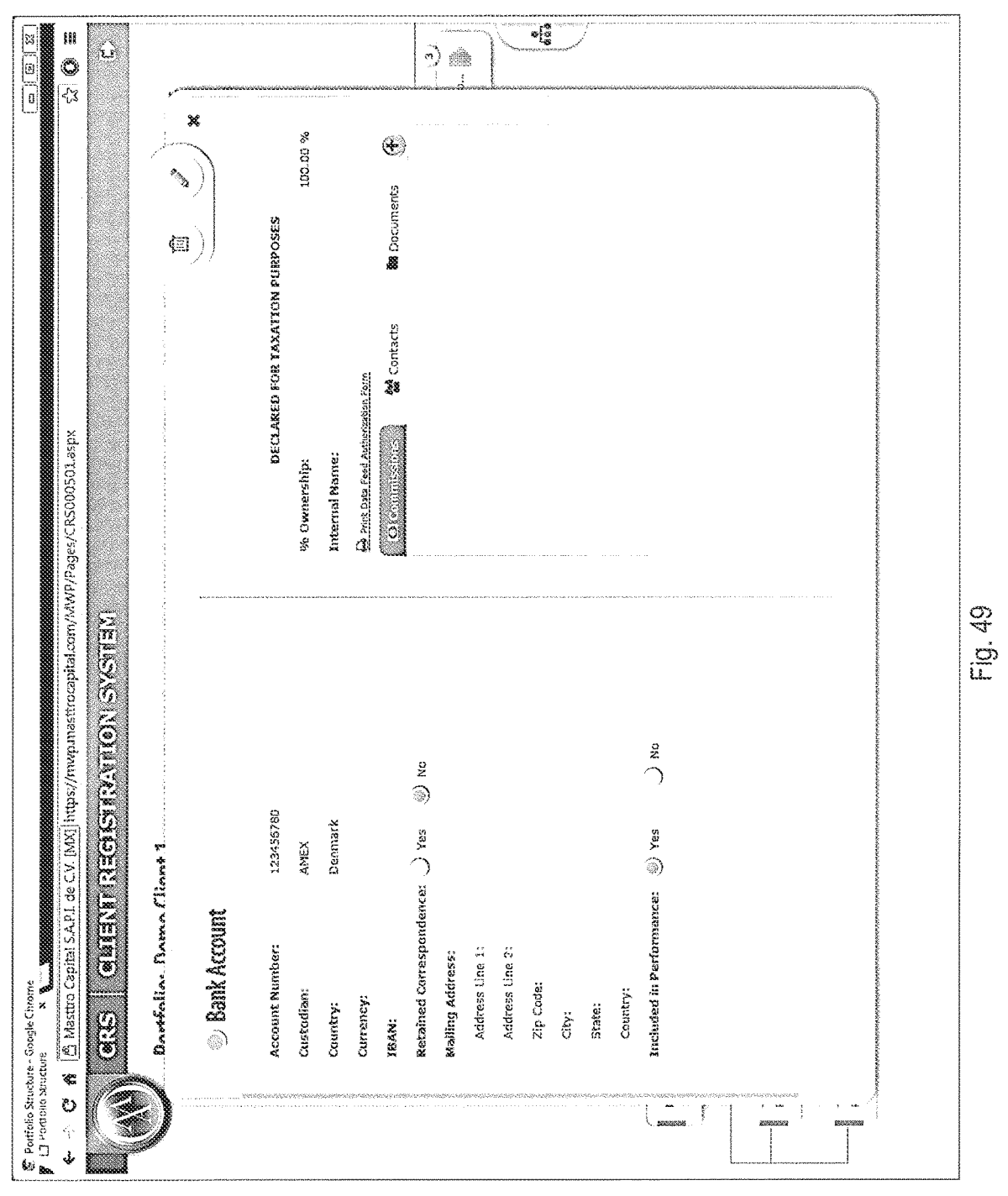
Figure 50:
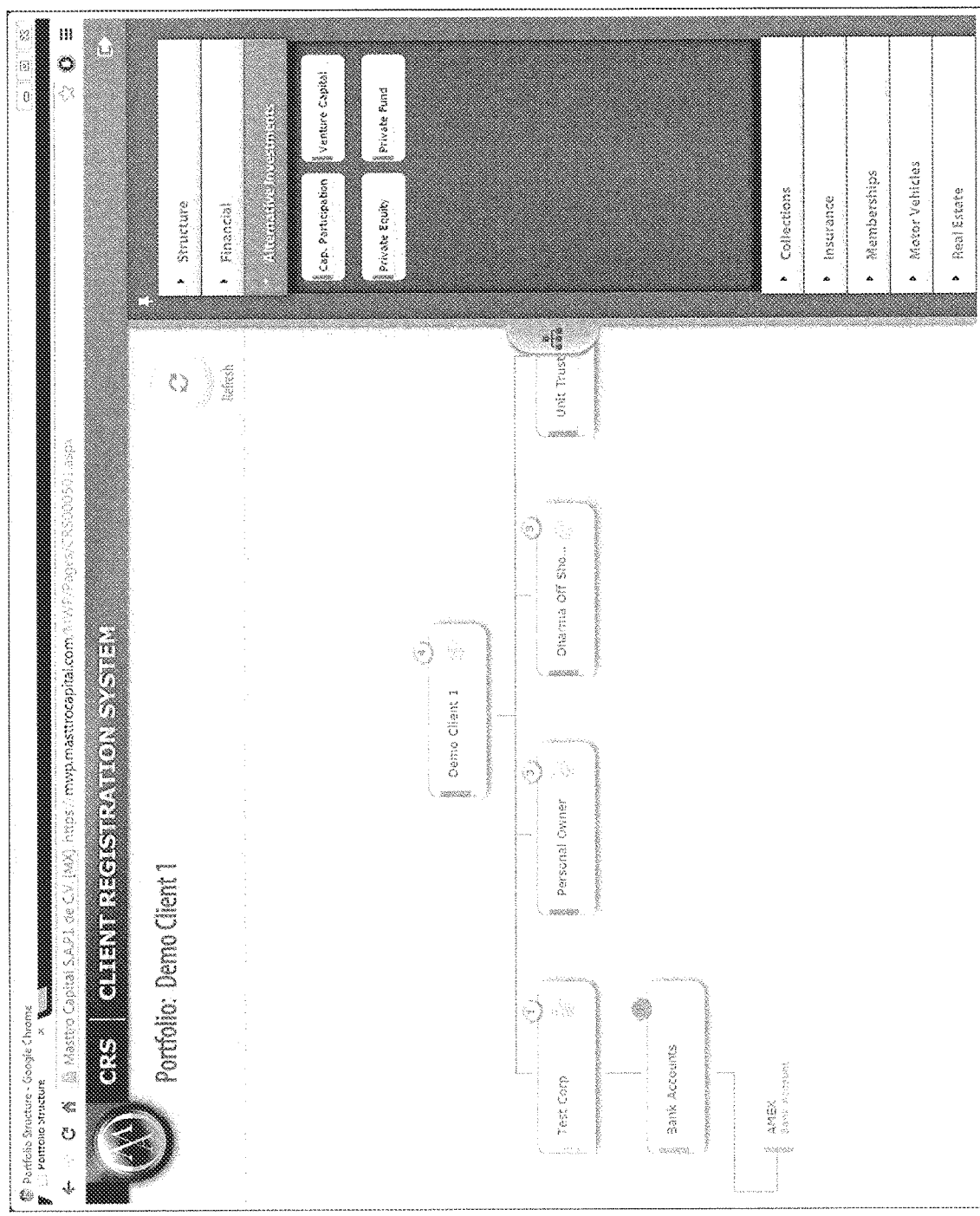
Figure 51:
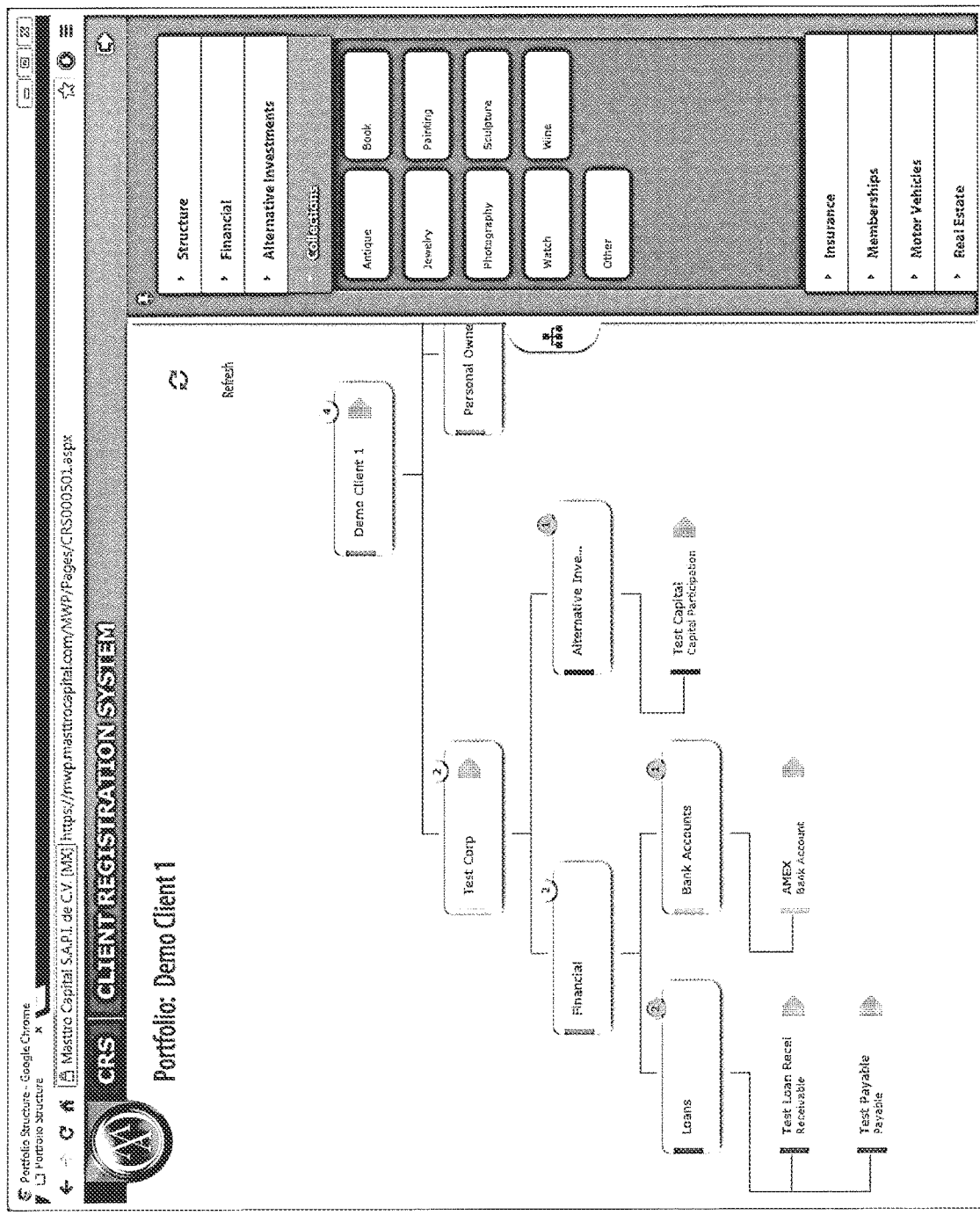
Figure 52:
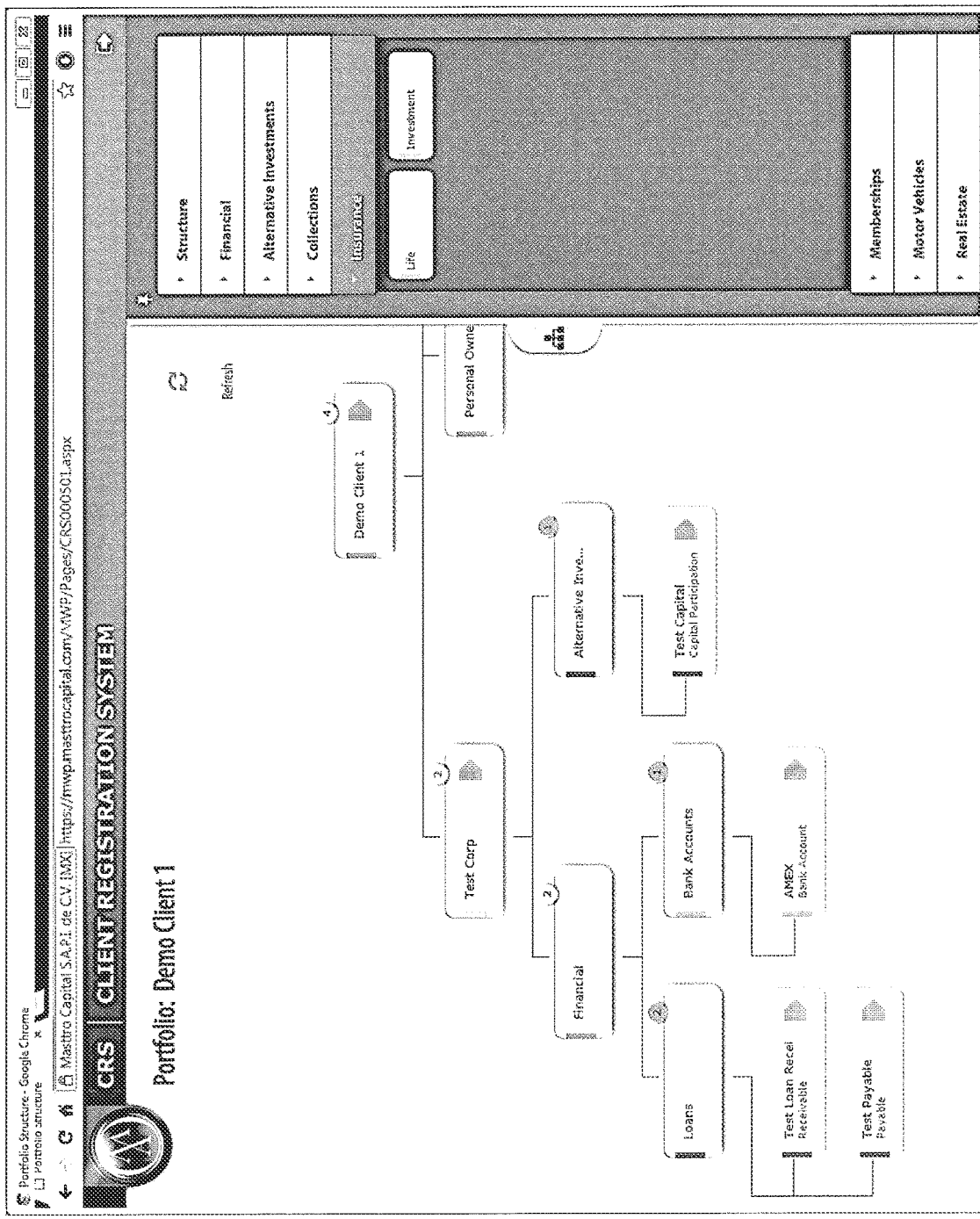
Figure 53:
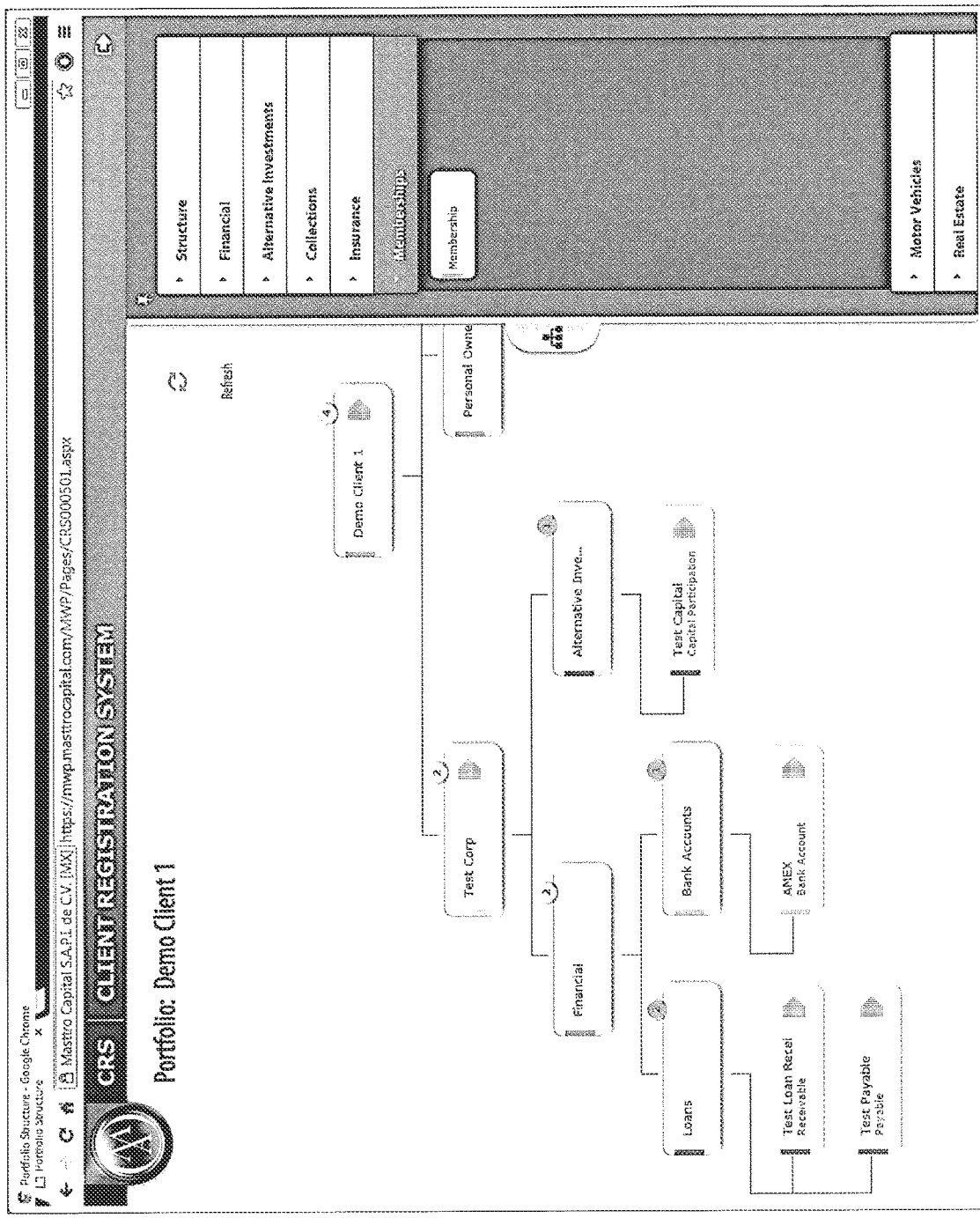
Figure 54:
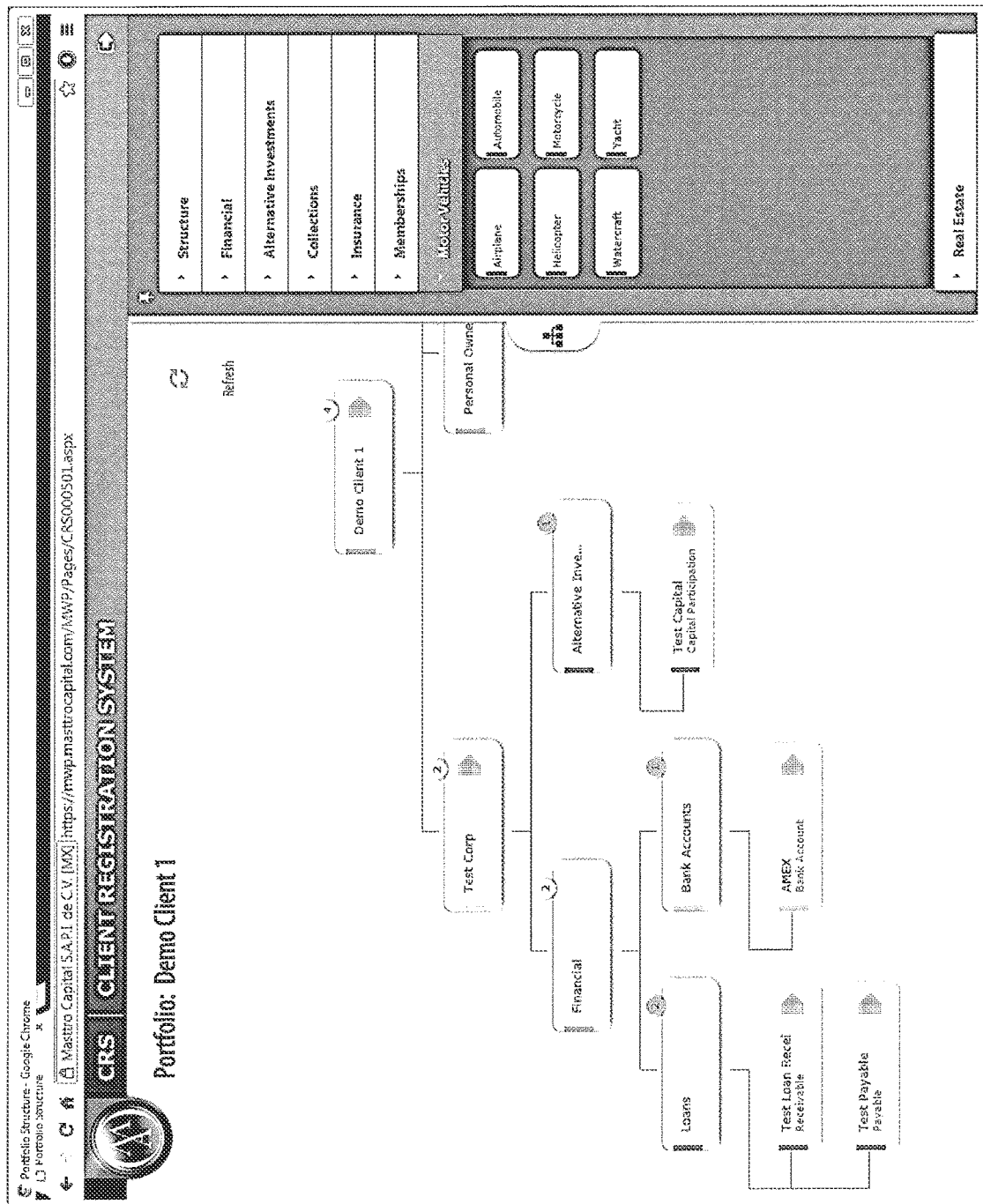
Figure 55:
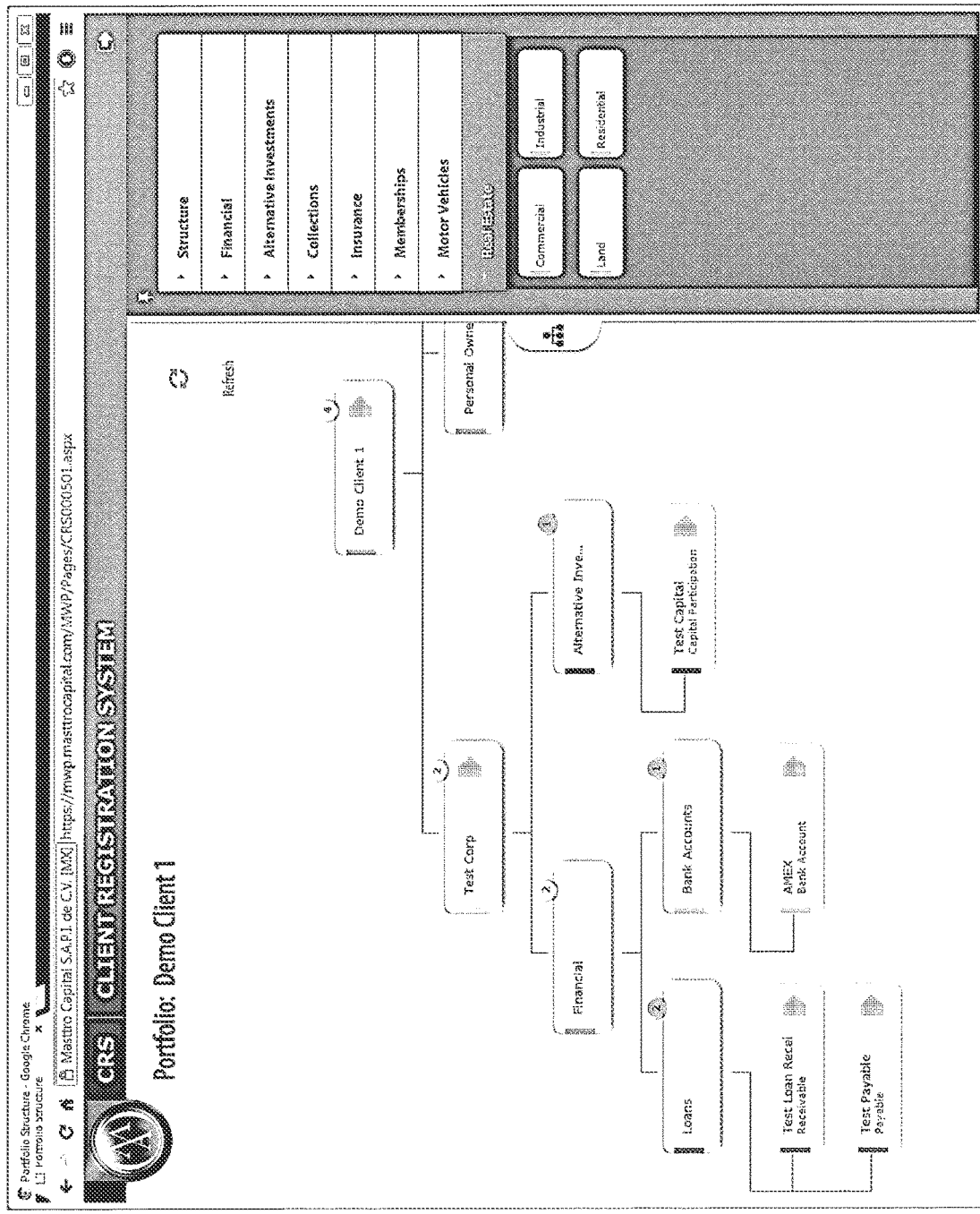

FIG. 46 shows an example in which the financial type of node is selected and the user drags a bank account node onto the newly added Test Corp to add a bank account to the newly added corporation node. FIG. 47 shows an example interface in which the information concerning the added bank account node may be entered by a user. FIG. 48 shows the newly added bank account node. FIG. 49 shows an example interface for adding information concerning the bank account upon selection of the more information portion of the bank account node. FIG. 50 shows an example interface upon selection of alternative investments type of nodes. In this example, example nodes for insertion into the portfolio are capital participation, venture capital, private equity, and private fund. FIG. 51 shows an example in which the user has selected the collections type of nodes. In this example, the example nodes that could be added to the portfolio include antique, jewelry, photography, watch, other, book, painting, sculpture, and wine. FIG. 52 shows an example in which the user has selected insurance type of nodes. In this example, the user may select from life insurance node and investment node. FIG. 53 shows an example interface in which the user has selected memberships type of nodes which shows an example membership node that could be added to the portfolio. FIG. 54 shows an example interface in which the user has selected motor vehicles type of nodes. In the example shown, the user may add the following example nodes: airplane, helicopter, water craft, automobile, motor cycle, and yacht. FIG. 55 shows an example interface in which the user has selected real estate as the type of node. In the example shown, the user may select from commercial, land, industrial, and residential nodes under this category. One skilled in the art should appreciate that additional categories and types of nodes could be provided depending on the circumstances and this disclosure should not be limited to the specific nodes described herein.

Figure 57:

Referring again to FIG. 2, the cash order management system allows the user to categorize various transactions. FIG. 56 shows an example interface for the cash order management 222. FIG. 57 shows an example interface in which the user has selected one of the transactions and is presented with a category in which to assign to that transaction.

The legacy distribution manager 224 allows the user to distribute funds as needed.

The activation notification center 226 allows the owner to receive notifications based on certain triggering events. For example, if an amount of money withdrawn from an account exceeds a predetermined amount, the activation notification center 226 may send a notification, such as a text or email, to the owner (and/or delegated person). This allows the owner to remain aware of activities in the portfolio that may be outside of the desired scope.

The settings module 228 allows a user to, among other things, select the modules and nodes in the tree structure to which users have access. This allows the owner to segment access rights so various persons involved in the management of his/her assets only see a piece of the portfolio for which he/she manages. The advantage is that the owner has access to the entire portfolio without being dependent on various managers to provide information. FIG. 58 shows an example interface in which an owner or manager of the portfolio can select users and modify the permissions granted by module 5800 or by selecting a portion 5802 in modules to which the user should not be allowed access. In some cases, the user may only be granted rights to scan in information to populate nodes without being given access to the underlying information about assets. In some embodiments, the selection of a node to which a user is not allowed to access could deselect each descendant node as well. In the example shown in FIG. 58, the owner could restrict a user's access the "Goldman Sachs" bank account by deselecting the node.

Although the present disclosure has been described with reference to particular means, materials, and embodiments, from the foregoing description, one skilled in the art can easily ascertain the essential characteristics of the invention and various changes and modifications may be made to adapt the various uses and characteristics without departing from the spirit and scope of the invention.

What is claimed is:

1. A system comprising:
a storage device; and
at least one processor coupled to the storage device, wherein the storage device stores (i) financial portfolio data representing financial and non-financial assets of an owner, (ii) node structure data representing a relationship of the assets in a hierarchical tree structure, and (iii) a program for controlling the at least one processor, and wherein the at least one processor, being operative with the program, is configured to:
add a new asset of the owner to the financial portfolio data by:
  displaying within a graphical user interface on a computer a first pane comprising a plurality of objects each representative of a different asset type comprising at least a bank account asset type and a physical object asset type and a second pane comprising a hierarchical tree arrangement of the financial portfolio data based on the node structure data, wherein the hierarchical tree arrangement comprises a plurality of nodes including a root node and a plurality of descendant nodes of the root node, wherein the root node represents substantially the entire portfolio of the owner as identified in the financial portfolio data and the plurality of descendant nodes represent respective portions of the portfolio;
  receiving a selection of a selected object from the plurality of objects in the first pane, wherein the selected object is movable between the first pane and the second pane;
  dragging the selected object from the first pane to the second pane in response to receiving a selection input to drag the selected object from the first pane to the second pane;
  dropping the selected object on an existing node from the plurality of nodes in the second pane in response to a dropping input of the selected object on the existing node in the second pane;
  in response to dropping the selected object on the existing node, (1) adding the selected object to the node structure data such that the selected object is a node descendent from the existing node onto which the object node was dropped and (2) prompting input of information regarding the selected object as a function of an asset type and updating the financial portfolio data to reflect the new asset with the information, wherein to prompt for the bank account asset type comprises (i) prompting for a bank account number and authentication credentials to electronically access the bank account, wherein in response to receiving the input for information regarding the bank account asset type and (ii) updating the financial portfolio data to include the authentication credentials providing electronic access to the bank account associated with the selected object, wherein to prompt for the physical object asset type comprises (i) prompting for input of one or more photographs and (ii) updating the financial portfolio data with the photographs;
modify segmented user access rights of a plurality of users to update access permissions to different segments of the financial portfolio data based on respective user access rights of each respective user by:
  displaying within a graphical user interface on a computer a visual representation of the financial portfolio data in a hierarchical tree arrangement based on the node structure data;

changing permission rights for a first user from solely allowing the first user to add new assets through the graphical user interface to allowing access to one or more nodes of the financial portfolio data through selection and/or deselection the one or more nodes in the hierarchical tree arrangement;

changing permission rights for a second user by receiving a selection and/or deselection of one or more nodes from the plurality of nodes in the hierarchical tree arrangement to configure which nodes corresponding with the financial portfolio data the second user is: (1) al lowed access; or (2) denied access, wherein the first user is different than the second user and user access rights for the first user allows access to a different portion of the financial portfolio data than user access rights for the second user;

enforce user access rights of the first user and the second user by:

determining which of the first user or the second user is a current user;

displaying within a graphical user interface on a computer a visual representation of the financial portfolio data in a hierarchical tree arrangement based on the node structure data;

monitoring for selection of a node of the plurality of nodes;

in response to selection of a node, automatically determine which of the descendant nodes of the selected object to hide based on the user access rights data associated with the current user; and automatically expand the selected object to: (1) identify on the graphical user interface one or more descendant nodes of the selected object to which the current user has access based on the user access rights data, and (2) hide on the graphical user interface one or more of the descendant nodes of the selected object based on the user access rights data so that the visual representation of the financial portfolio data hides any nodes to which the current user does not have access; and update the new asset of the owner by:

monitoring in real time for new transactions involving the new asset using the authentication credentials for the bank account and updating the new asset as a function of any new transactions.

2. The system of claim 1, wherein the selected object represents a corporation and in response to dropping the selected object, the system presents a graphical user interface from which: (1) shareholder information of the corporation can be inputted; and/or (2) one or more documents regarding the corporation can be added and updates the financial portfolio data with the shareholder information and/or documents.

3. The system of claim 1, wherein the storage device includes positional data representing real-time position information regarding at least a portion of the physical objects in the collection of the owner that are equipped with global positioning sensors.

4. The system of claim 3, wherein in response to dropping the selected object, the system presents an interface for linking one or more global positioning sensors installed on one or more of the physical objects in the collection with the system.

5. The system of claim 3, wherein the at least one processor is configured to track in real time the global positioning sensors installed on one or more of the physical objects in the collection and update the positional data accordingly.

6. The system of claim 1, wherein, responsive to renewed selection of the selected object, the at least one processor is configured to collapse the selected object to hide one or more descendant nodes of the selected object.

7. The system of claim 6, wherein the at least one processor is configured to generate a count flag associated with one or more nodes that identifies an aggregate count of descendant nodes for each respective node.

8. The system of claim 7, wherein the at least one processor is configured to generate a value flag associated with one or more nodes that identifies an aggregate monetary value of descendant nodes for each respective node.

9. The system of claim 8, wherein the graphical user interface includes an object that is configured to switch between display of the count flag and display of the value flag responsive to selection of the object.

10. The system of claim 1, wherein the at least one processor is configured to prompt for a search query, search the financial portfolio data for the search query and generate a visual representation of the financial portfolio data that includes the search query in a hierarchical tree arrangement based on the node structure data in which only nodes associated with the search query are identified.

11. The system of claim 1, wherein, responsive to selection of a node, the at least one processor is configured to provide additional information concerning the selected object, including one or more of textual information, graphic information, or documents regarding the asset represented by the selected object.

12. A non-transitory computer-readable medium that stores computer executable instructions for causing one or more processors to facilitate tree structure visualization of data comprising:

adding a new asset of an owner of financial portfolio data representing financial and non-financial assets of an owner by:

displaying within a graphical user interface on a computer a first pane comprising a plurality of objects each representative of a different asset type comprising at least a bank account asset type and a physical object asset type and a second pane comprising a hierarchical tree arrangement of the financial portfolio data based on node structure data representing a relationship of the assets in a hierarchical tree structure, wherein the hierarchical tree arrangement comprises a plurality of nodes including a root node and a plurality of descendant nodes of the root node, wherein the root node represents substantially the entire portfolio of the owner as identified in the financial portfolio data and the plurality of descendant nodes represent respective portions of the portfolio;

receiving a selection of a selected object from the plurality of objects in the first pane, wherein the selected object is movable between the first pane and the second pane;

dragging the selected object from the first pane to the second pane in response to receiving a selection input to drag the selected object from the first pane to the second pane;

dropping the selected object on an existing node from the plurality of nodes in the second pane in response to a dropping input of the selected object on the existing node in the second pane;

in response to dropping the selected object on the existing node, (1) adding the selected object to the node structure data such that the selected object is a node descendent from the existing node onto which the object node was dropped and (2) prompting input of information regarding the selected object as a function of an asset type and updating the financial portfolio data to reflect the new asset with the information, wherein to prompt for the bank account asset type comprises (i) prompting for a bank account number and authentication credentials to electronically access the bank account, wherein in response to receiving the input for information regarding the bank account asset type and (ii) updating the financial portfolio data to include the authentication credentials providing electronic access to the bank account associated with the selected object, wherein to prompt for the physical object asset type comprises (i) prompting for input of one or more photographs and (ii) updating the financial portfolio data with the photographs;

modifying segmented user access rights of a plurality of users to update access permissions to different segments of the financial portfolio data based on respective user access rights of each respective user by:
  displaying within a graphical user interface on a computer a visual representation of the financial portfolio data in a hierarchical tree arrangement based on the node structure data;
  changing permission rights for a first user from solely allowing the first user to add new assets through the graphical user interface to allowing access to one or more nodes of the financial portfolio data through selection and/or deselection the one or more nodes in the hierarchical tree arrangement;
  changing permission rights for a second user by receiving a selection and/or deselection of one or more nodes from the plurality of nodes in the hierarchical tree arrangement to configure which nodes corresponding with the financial portfolio data, the second user is: (1) allowed access; or (2) denied access, wherein the first user is different than the second user and user access rights for the first user allows access to a different portion of the financial portfolio data than user access rights for the second user;

enforce user access rights of the first user and the second user by:
  determining which of the first user or the second user is a current user;
  displaying within a graphical user interface on a computer a visual representation of the financial portfolio data in a hierarchical tree arrangement based on the node structure data:
  monitoring for selection of a node of the plurality of nodes;
  in response to selection of a node, automatically determine which of the descendant nodes of the selected object to hide based on the user access rights data associated with the current user; and
  automatically expand the selected object to: (1) identify on the graphical user interface one or more descendant nodes of the selected object to which the current user has access based on the user access rights data, and (2) hide on the graphical user interface one or more of the descendant nodes of the selected object based on the user access rights data so that the visual representation of the financial portfolio data hides any nodes to which the current user does not have access; and updating the new asset of the owner by:
  monitoring in real time for new transactions involving the new asset using the authentication credentials for the bank account and updating the new asset as a function of any new transactions.

13. The non-transitory computer-readable medium of claim 12, wherein the selected object represents a corporation and in response to dropping the selected object, the system presents a graphical user interface from which: (1) shareholder information of the corporation can be inputted; and/or (2) one or more documents regarding the corporation can be added and updates the financial portfolio data with the shareholder information and/or documents.

14. The non-transitory computer-readable medium of claim 12, wherein the storage device includes positional data representing real-time position information regarding at least a portion of the physical objects in the collection of the owner that are equipped with global positioning sensors.

15. The non-transitory computer-readable medium of claim 14, wherein in response to dropping the selected object, the system presents an interface for linking one or more global positioning sensors installed on one or more of the physical objects in the collection with the system.

16. The non-transitory computer-readable medium of claim 14, wherein the at least one processor is configured to track in real time the global positioning sensors installed on one or more of the physical objects in the collection and update the positional data accordingly.

17. The non-transitory computer-readable medium of claim 12, wherein, responsive to renewed selection of the selected object, the at least one processor is configured to collapse the selected object to hide one or more descendant nodes of the selected object.

18. The non-transitory computer-readable medium of claim 17, wherein the at least one processor is configured to generate a count flag associated with one or more nodes that identifies an aggregate count of descendant nodes for each respective node.

19. The non-transitory computer-readable medium of claim 18, wherein the at least one processor is configured to generate a value flag associated with one or more nodes that identifies an aggregate monetary value of descendant nodes for each respective node.

20. The non-transitory computer-readable medium of claim 19, wherein the graphical user interface includes an object that is configured to switch between display of the count flag and display of the value flag responsive to selection of the object.

21. The system of claim 12, wherein the at least one processor is configured to prompt for a search query, search the financial portfolio data for the search query and generate a visual representation of the financial portfolio data that includes the search query in a hierarchical tree arrangement based on the node structure data in which only nodes associated with the search query are identified.

* * * * *